United States Patent
De Jong

(10) Patent No.: US 9,769,162 B2
(45) Date of Patent: Sep. 19, 2017

(54) METHOD FOR USING AND MAINTAINING USER DATA STORED ON A SMART CARD

(71) Applicant: Oracle America, Inc., Redwood Shores, CA (US)

(72) Inventor: Eduard K. De Jong, Amsterdam (NL)

(73) Assignee: ORACLE AMERICA, INC., Redwood Shores, CA (US)

(*) Notice: Subject to any disclaimer, the term of this patent is extended or adjusted under 35 U.S.C. 154(b) by 0 days.

(21) Appl. No.: 14/330,672

(22) Filed: Jul. 14, 2014

(65) Prior Publication Data

US 2014/0325632 A1    Oct. 30, 2014

Related U.S. Application Data

(63) Continuation of application No. 12/079,895, filed on Mar. 28, 2008, now Pat. No. 8,789,753.

(51) Int. Cl.
   *G06Q 20/34*     (2012.01)
   *H04L 29/06*    (2006.01)
   (Continued)

(52) U.S. Cl.
   CPC .... *H04L 63/0853* (2013.01); *G06K 19/07716* (2013.01); *G06F 21/77* (2013.01); *G06Q 20/105* (2013.01); *G06Q 20/341* (2013.01); *G06Q 20/3574* (2013.01); *G06Q 20/35765* (2013.01); *G06Q 20/3674* (2013.01); *G06Q 20/4012* (2013.01); *G07F 7/10* (2013.01);
   (Continued)

(58) Field of Classification Search
   CPC .. G06Q 20/341; G06Q 20/355; G06Q 20/105; G06Q 20/3552; G06Q 20/35765; G06Q 20/4097; G07F 7/1008; G07F 7/0886; G07F 7/1016
   See application file for complete search history.

(56) References Cited

U.S. PATENT DOCUMENTS 4,849,614 A * 7/1989 Watanabe et al. ............ 235/379
4,864,542 A * 9/1989 Oshima ............... G06F 12/1466
                                                       235/382

(Continued)

OTHER PUBLICATIONS

L. Lamport, "Password Authentication with Insecure Communications", Nov. 1981, Communications of the ACM, vol. 24 No. 11, pp. 770-772.*

(Continued)

*Primary Examiner* — Christopher Stanford
(74) *Attorney, Agent, or Firm* — Tucker Ellis LLP

(57) ABSTRACT

In a method for using and maintaining user data stored on a smart card, a smart card receives a user data request for the user data stored on the smart card. The smart card determines whether the user data request is a data maintenance request or a data use request. A data maintenance request is for modifying user data stored on the smart card. A data use request is for read only access to user data stored on the smart card. The smart card uses a first process to determine whether to allow the user data request when the user data request is determined to be a data maintenance request. The smart card uses a second process, different from the first method, to determine whether to allow the user data request when the user data request is determined to be a data use request.

20 Claims, 54 Drawing Sheets

(51) Int. Cl.
*G06K 19/077* (2006.01)
*G06F 21/77* (2013.01)
*G06Q 20/40* (2012.01)
*G07F 7/10* (2006.01)
*G06Q 20/10* (2012.01)
*G06Q 20/36* (2012.01)

(52) U.S. Cl.
CPC .......... *G07F 7/1008* (2013.01); *G07F 7/1016* (2013.01); *G07F 7/1025* (2013.01)

(56) References Cited

U.S. PATENT DOCUMENTS

| | | | |
|---|---|---|---|
| 5,473,690 A * | 12/1995 | Grimonprez | G06Q 20/341 235/380 |
| 5,729,717 A * | 3/1998 | Tamada | G06Q 20/341 235/380 |
| 5,802,519 A | 9/1998 | De Jong | |
| 5,930,363 A | 7/1999 | Stanford | |
| 5,987,438 A * | 11/1999 | Nakano et al. | 705/41 |
| 6,052,690 A | 4/2000 | De Jong | |
| 6,094,656 A | 7/2000 | De Jong | |
| 6,367,011 B1 | 4/2002 | Lee | |
| 6,402,028 B1 | 6/2002 | Graham | |
| 6,622,914 B2 | 9/2003 | Hosogoe | |
| 6,659,354 B2 | 12/2003 | Everett | |
| 6,986,458 B2 | 1/2006 | Flugge | |
| 7,117,369 B1 | 10/2006 | Burns | |
| 7,191,288 B2 | 3/2007 | De Jong | |
| 7,367,047 B2 * | 4/2008 | Irisawa | G06F 21/31 235/487 |
| 7,508,946 B2 * | 3/2009 | Yamagata | G06F 12/1433 380/270 |
| 8,152,074 B1 | 4/2012 | De Jong | |
| 8,225,386 B1 | 7/2012 | De Jong | |
| 8,789,753 B1 | 7/2014 | De Jong | |
| 2001/0003842 A1 * | 6/2001 | Schaeck et al. | 713/169 |
| 2004/0256451 A1 | 12/2004 | Goman | |

OTHER PUBLICATIONS

Leslie Lamport, "Password Authentication With Insecure Communication" Communications of the ACM, Nov. 1981 vol. 24 No. 11, pp. 770-772.

* cited by examiner

METHOD FOR USING AND MAINTAINING USER DATA STORED ON A SMART CARD

CLAIM OF PRIORITY

This application claims priority to U.S. patent application Ser. No. 12/079,895, filed Mar. 28, 2008, now U.S. Pat. No. 8,789,753, issued Jul. 29, 2014, entitled "METHOD FOR USING AND MAINTAINING USER DATA STORED ON A SMART CARD" which application is herein incorporated by reference in its entirety.

BACKGROUND OF THE INVENTION

Field of the Invention

The present invention relates to the field of smart cards. More particularly, the present invention relates to personalizing multi-application smart cards.

Description of Related Art

The challenge of identifying or authenticating a person on a local computer, or on the other end of a communication session, or in the role of the sender of a message, is a recurring theme in e-business. A typical solution uses user authentication methods based at least in part on passwords or personal identification numbers (PINs). A password or PIN is a word or code used as a security measure against unauthorized access to data.

Typically, a user obtains a PIN as part of an enrollment process with a service provider. In this enrollment process, the service provider assesses user-supplied information and decides whether to provide the service to the user. If the service provider decides to provide service, the service provider issues a PIN to the user.

After enrolling with the service provider, the user uses the PIN to obtain access to the service. The user interface in this case consists of a prompt for a PIN. The user is typically allowed a fixed number of unsuccessful PIN attempts before user access is blocked.

A PIN or password is typically the primary means by which an individual user indicates authorization based at least in part on an intelligent thought process performed by the user. The user must recall the PIN from the user's memory and enter the digits corresponding to the PIN to obtain access to a service.

PINs are often difficult to remember, especially when a user uses more than one PIN to access different services. A user may create a written copy of the PIN or PINs in an attempt to remember them. However, such a practice degrades security because the paper containing the PIN or PINs can be stolen or forwarded freely. Thus, static PIN-based user authentication mechanisms alone provide a relatively low level of security.

An improved form of user authentication is made possible by using a smart card or a magnetic stripe card in conjunction with a PIN. This is sometimes referred to as "two-factor" user authentication, combining "what you have" (the physical smart card) with "what you know" (the password needed to use the smart card). Because both possession of the smart card and knowledge of the PIN are required, two-factor user authentication can provide a higher level of security than user authentication based at least in part on a PIN or on a card alone.

FIG. 1 is a block diagram that illustrates a typical mechanism for PIN management using a magnetic stripe card. A service provider 150 maintains a centralized cardholder database 110 that includes a primary account number (PAN) and an associated PIN for each cardholder. A cryptographic algorithm is typically used to generate the PIN based at least in part on a cryptographic key 140, PAN 120 and possibly other data 135. The PAN for a user 100 is written on a magnetic stripe 115 of a magnetic stripe card 105, and magnetic stripe card 105 is provided to user 100.

User 100 gains access to the account associated with card 105 by presenting magnetic stripe card 105 to a card reader (also known as a card acceptance device (CAD) or terminal) 155 in communication with centralized cardholder database 110 and by entering a PIN 145. Terminal 155 is referred to as an "untrusted" terminal because user 100 has little effective control of terminal 155. Terminal 155 may be implemented using a PC or as a standalone device.

Centralized cardholder database 110 grants user 100 access to the account if the PAN on magnetic stripe card 105 matches a PAN 120 in the database 110 and if PIN 145 entered by user 100 matches PIN 125 that is associated with PAN 120 in database 110.

FIG. 2 is a block diagram that illustrates a typical mechanism for personal identification number (PIN) management using a smart card 205. Unlike magnetic strip card 105, smart card 205 may include a CPU (central processing unit). Such a smart card can process data such as a PIN locally on the smart card. This processing may include PIN verification. Once a user is authenticated to the smart card, the smart card can be used to obtain access to a service.

As shown in FIG. 2, smart card 205 includes multiple vendor applications 235, 240, 290, each of which may use the same PIN to control access to a service. Smart card 205 also includes an issuer applet 215 provided by the smart card issuer, an agent of the smart card issuer, or a commercially-agreed provider of the applet. Issuer applet 215 includes PIN comparator 220 that compares PIN 270 entered by an end-user 200 with a validated PIN 230. Typically, PIN comparator 220 allows a fixed number of unsuccessful PIN tries before access is blocked. This is illustrated below with reference to FIG. 3. Once access is blocked, end-user 200 must present smart card 205 to service provider 280. Service provider 280 maintains information about smart card 205 that allows smart card 205 to be reset. In one solution, service provider 280 maintains a super PIN 290 that allows smart card 205 to be reset typically based at least in part on cryptographic protocols.

Turning now to FIG. 3, a flow diagram that illustrates a method for personal identification number (PIN) management is presented. The processes illustrated in FIG. 3 may be implemented using hardware, software, firmware, or a combination thereof.

At check operation 300, a PIN from a user is received. At check operation 305, a determination is made whether a try counter has exceeded a maximum number of try attempts. If the maximum number of try attempts has been exceeded, the smart card is set to block access at operation 310. If the maximum number of try attempts has not been exceeded, the try counter is incremented at operation 315 and a determination whether the user-entered PIN matches a validated PIN is made in check operation 320. If the user-entered PIN matches the stored PIN, access is allowed at operation 325. If the user-entered PIN does not match the validated PIN, additional PIN tries are accepted beginning at operation 300. This process continues until the maximum number of try attempts has been exceeded.

Unfortunately, maintaining a PIN in a centralized database 110, 210 that is beyond user control makes PINs vulnerable to misuse by a service provider 150, 280 or vulnerable to interception while in transit between terminal 155, 285 and service provider 150, 280. Such misuse and/or interception will be come a greater problems as use of smart cards becomes more widespread.

Referring again to FIG. 2, a generic smart card 205 is bound to an individual end-user 200 in a process called "Personalization". Smart card 205 may have surface applications, which are sometimes referred to as external applications. Smart card 205 may also have internal applications 235, 240, 290.

A surface application, sometimes called an external application, is an application including data on an outer surface of smart card 205 that binds smart card 205 to individual end-user 200. Exemplary external applications include a printed name and a picture of end-user 200.

An internal application 235, 240, 290 is an applet that performs a function based at least in part on data stored on or outside smart card 205. One of the functions may be to bind smart card 205 to an individual user 200, for example by storing information such as a user name, a password or PIN, an address, or a social security number.

If the name of the end-user stored inside smart card 205 is not the same as the name on the outside of smart card 205, smart card 205 is rendered practically useless because credentials for different users—the name on the outside and the name on the inside—do not match when smart card 205 is presented for access to a service. This is a potential source of loss of smart card 205.

Additionally, the personalization of multi-application smart cards differs from traditional smart card personalization in that privacy and commercial considerations require no single application be responsible for the entry and control of personal data, and in that such personalization can happen after the smart card has been issued to a user. Allowing an applet from one commercial entity to control more aspects of the user than an applet from another commercial entity makes business relationships between the other commercial entities having applets on the smart card asymmetric; the entity that controls the user of data is more important and has more control over the user than the other units who have only the customer in common.

SUMMARY OF THE INVENTION

A multi-application smart card may be personalized by receiving a smart card request, preparing an anonymous smart card having multiple user applications that are disabled for uses requiring a link to an identified user and enabled for uses not requiring a link to an identified user, and issuing the anonymous smart card to a user.

In one embodiment, a method for personalizing a multi-application smart prepares, by a smart card issuer, an anonymous smart card for issuance to an end-user. The anonymous smart card includes one or more anonymous end-user applications; at least one anonymous external application; and an end-user-controlled partition including a plurality of empty fields. The plurality of empty fields is for storing user data for the identified end-user. Each of the one or more anonymous end-user applications is disabled for uses requiring a link to an identified end-user. Also, each of the one or more anonymous end-user applications is enabled for uses not requiring a link to the identified end-user. The smart card issuer upon receiving a smart card request issues the prepared anonymous smart card to the end-user.

The preparation of the anonymous smart card includes choosing, by the smart card issuer, a unique internal identifier for the anonymous smart card, and installing, by the smart card issuer, an internal identifier, in the anonymous smart card, based at least in part on the unique internal identifier. In one embodiment the unique internal identifier is in an internal application of the anonymous smart card.

The preparation also includes determining, by the same card issuer, a unique external identifier for the anonymous smart card and installing, by the smart card issuer, an external identifier based at least in part on the unique external identifier. In one embodiment, the unique external identifier is either included in an external application of the anonymous smart card. The preparation further includes creating, by the smart card issuer, a database record for the anonymous smart card. The database record includes the internal identifier and the external identifier. The preparation still further includes personalizing the exterior of the anonymous smart card including basing one or more external applications of the smart card at least in part on the external identifier.

The method also includes receiving, by the smart card issuer from an application provider, initial application data for one of the plurality of applications. The smart card issuer stores the initial application data on the anonymous smart card to initialize the one of the plurality of applications. The smart card issuer also confirms to the application provider initialization of the one of the plurality of applications.

Thus, an anonymous smart card includes a processor and a memory having stored therein: one or more anonymous internal end-user applications; an end-user-controlled partition including a plurality of empty fields; and at least one external anonymous application. The plurality of empty fields is for storing user data for the identified end-user. At least one of the one or more internal end-user applications is disabled for uses requiring a link to an identified end-user. Also, the one or more of end-user applications are enabled for uses not requiring a link to the identified end-user.

The anonymous smart card includes an internal identifier stored in the memory. The internal identifier is based at least in part on a unique internal identifier of the anonymous smart card and an external identifier. The external identifier is based at least in part on a unique external identifier of the anonymous smart card.

A computer program product comprising a tangible computer readable storage medium having embodied therein computer program instructions for a method comprising:
preparing, by a smart card issuer, an anonymous smart card for issuance to an end-user, the anonymous smart card comprising:
one or more anonymous end-user applications,
wherein each of the one or more anonymous end-user applications is disabled for uses requiring a link to an identified end-user; and
each of the one or more anonymous end-user applications is enabled for uses not requiring a link to the identified end-user;
at least one anonymous external application; and
an end-user-controlled partition including a plurality of empty fields, the plurality of empty fields for storing user data for the identified end user; and
receiving, by the smart card issuer, a smart card request.

A method for personalizing multi-application smart cards includes receiving, by an end-user, an anonymous smart card. The anonymous smart card includes one or more anonymous end-user applications; at least one personalized external application; and an end-user-controlled partition including a plurality of empty fields. The plurality of empty fields is for storing user data for the identified end-user. Each of the one or more anonymous end-user applications is disabled for uses requiring a link to an identified end-user. Also, each of the one or more anonymous end-user applications is enabled for uses not requiring a link to the identified end-user. The end user personalizes the anonymous smart card by storing user data in the end-user-controlled partition of the smart card. The user data includes identifying information for the end-user.

For example, the user data includes a user name and a first PIN to authenticate the user to the smart card. The first PIN complies with a first PIN policy. The user data further includes a second PIN to authenticate the user to the smart card. The second PIN complying with a second PIN policy. The second PIN policy provides a different security level with respect to the first PIN policy. The user data still further includes a third PIN for enabling a user transaction that exceeds a threshold.

The end user personalizes at least one of the one or more anonymous end-user applications to obtain a personalized end-user application. The end-user uses the personalized end-user application in the smart card to obtain a service.

A computer program product comprising a tangible computer readable storage medium having embodied therein computer program instructions for a method comprising:
personalizing, by an end-user, an anonymous smart card by storing user data in an end-user-controlled partition of the anonymous smart card, the user data including identifying information for the end-user,
wherein the anonymous smart card comprises:
one or more anonymous end-user applications,
wherein each of the one or more anonymous end-user applications is disabled for uses requiring a link to an identified end-user; and
each of the one or more anonymous end-user applications is enabled for uses not requiring a link to the identified end-user;
at least one personalized external application; and
the end-user-controlled partition including a plurality of empty fields, the plurality of empty fields for storing the user data for the identified end user.

In another embodiment, a method for maintaining and using user data stored on a smart card includes receiving, by a smart card from a terminal, a data request for data stored on the smart card. The data includes information relating to an individual end-user of the smart card. In response to the data request, the smart card determines whether the data request was from a home terminal and an authorized end user. If the data request was from a home terminal and an authorized end user, the smart card authorizes the data request.

Also, the smart card receives instructions to make the terminal a home terminal. In response, the smart card provides the terminal with data indicating that the terminal is the home terminal.

In determining whether to authorize the request, the smart card determines whether the data request is a maintenance request or a data use request. Upon finding the data request is a maintenance request, the smart card determines whether the terminal is a home terminal for the smart card. The determination of whether the terminal is a home terminal includes a cryptographic terminal recognition interaction.

In another embodiment, a method for using and maintaining user data stored on a smart card, a smart card receives a user data request for the user data stored on the smart card. The smart card determines whether the user data request is a data maintenance request or a data use request. A data maintenance request is for modifying user data stored on the smart card. A data use request is for read only access to user data stored on the smart card. The smart card uses a first process to determine whether to allow the user data request when the user data request is determined to be a data maintenance request. The smart card uses a second process, different from the first method, to determine whether to allow the user data request when the user data request is determined to be a data use request.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

The same reference indicators are used throughout the drawings and the following detailed description to refer to the same or like parts.

DETAILED DESCRIPTION

Figure 1:
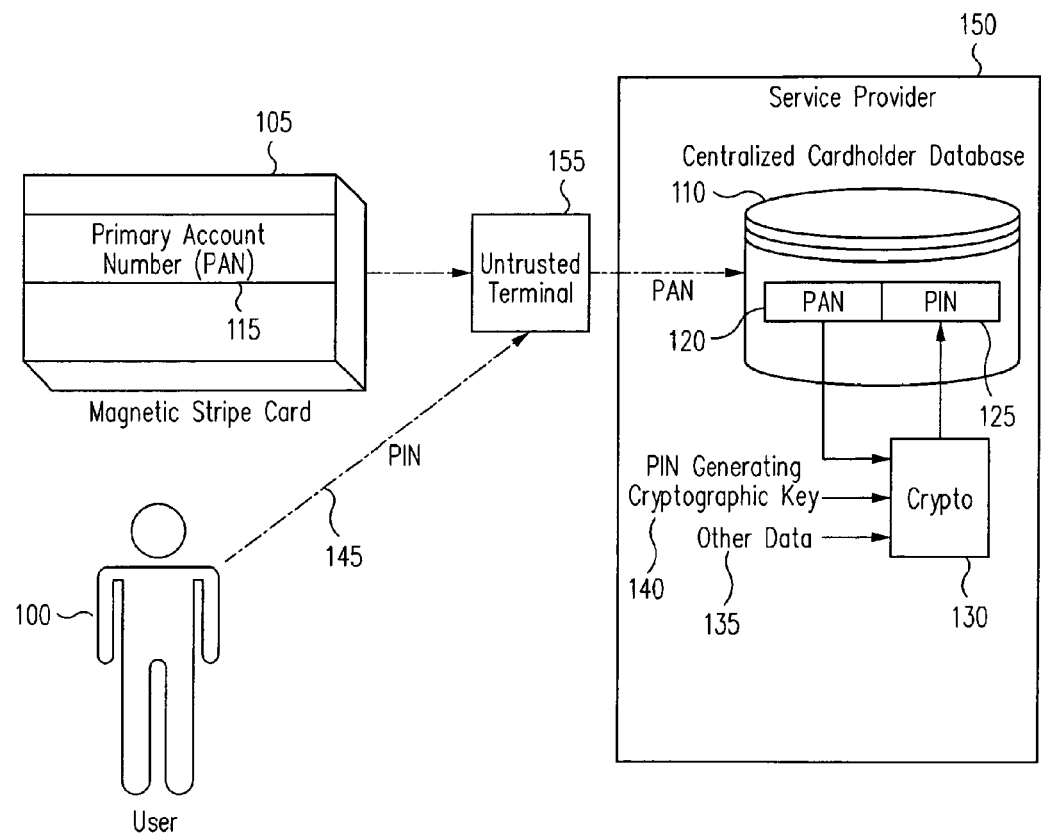
FIG. 1 is a block diagram that illustrates a typical mechanism for personal identification number (PIN) management using a magnetic stripe card.
Figure 2:
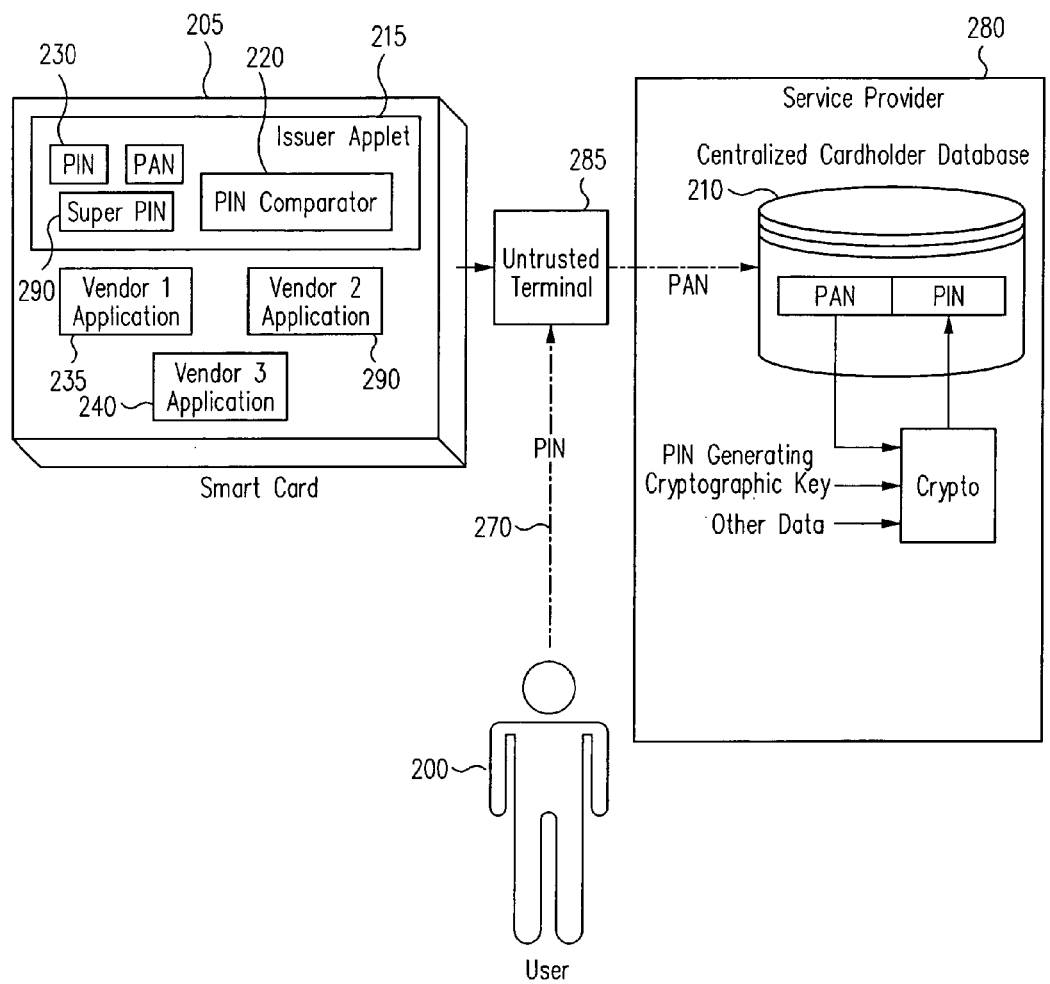
FIG. 2 is a block diagram that illustrates a typical mechanism for PIN management using a smart card.
Figure 3:
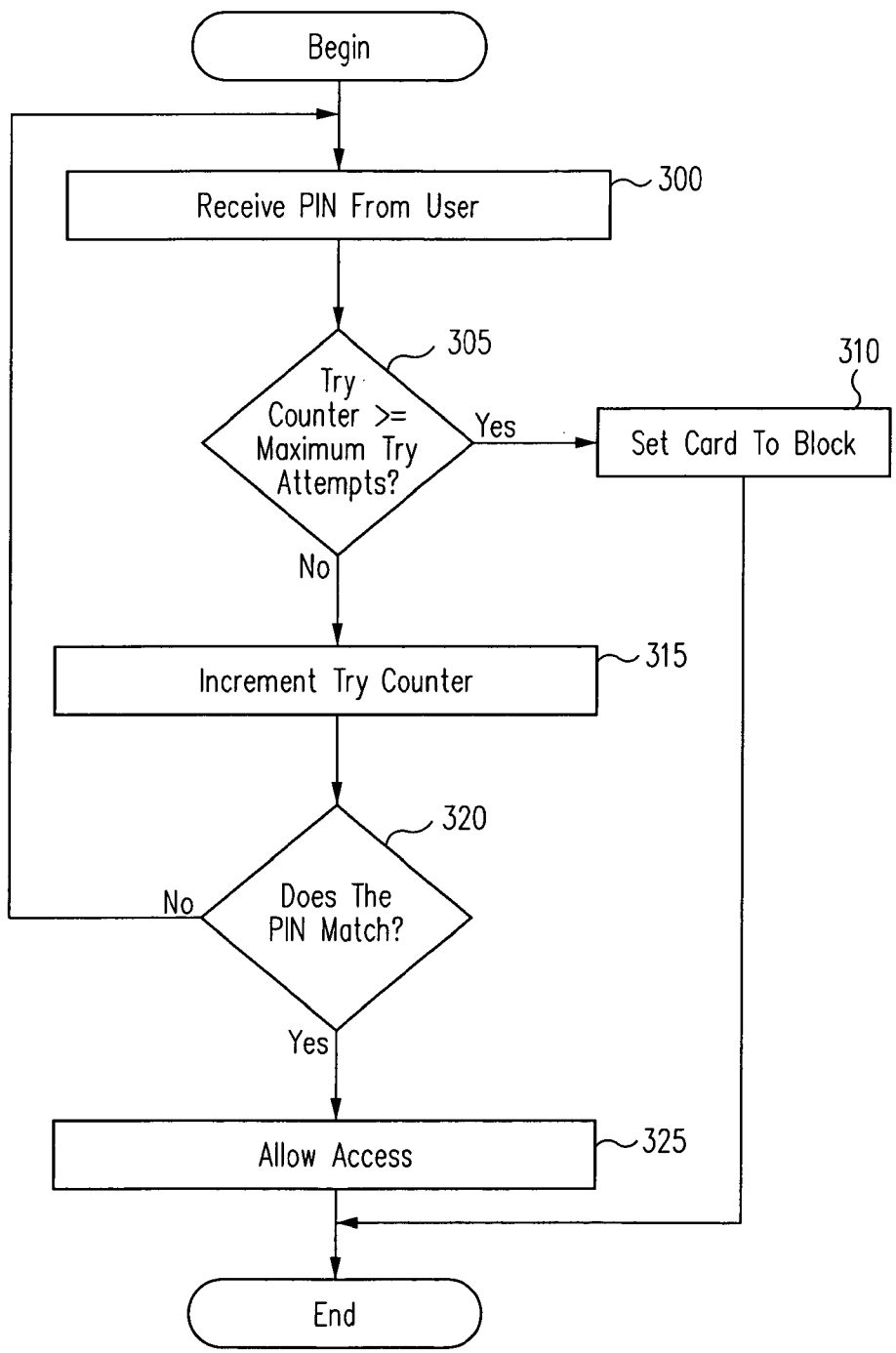
FIG. 3 is a flow diagram that illustrates a method for PIN management.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "randomized" means the result of a random or pseudo-random number generation process. A "randomized process" means the application of such a result to a process. Methods of generating random and pseudo-random numbers are known by those skilled in the relevant art.

In the context of the present invention, the term "identifier" means one or more numbers, characters, symbols, or the like. More generally, an "identifier" describes any entity that can be represented by one or more bits.

In the context of the present invention, the term "cryptographic one-way function" means any cryptographic process that produces an output based upon an input, such that it is computationally infeasible to compute the input based upon the output. Exemplary cryptographic one-way functions include the Message-Digest 4 (MD4) algorithm, the Message-Digest 5 (MD5) algorithm, and the Secure Hash Algorigth-1 referred to as the SHA-1 algorithm. The MD4 algorithm is described in R. Rivest, "The MD4 Message Digest Algorithm", Request for Comments (RFC) 1320, R. Rivest, MIT Laboratory for Computer Science and RSA Data Security, Inc., April 1992. The MD5 algorithm is described in Rivest, "The MD5 Message-Digest Algorithm", Request for Comments (RFC) 1321, R. Rivest, MIT Laboratory for Computer Science and RSA Data Security, Inc., April 1992. The SHA-1 algorithm is described in Secure Hash Standard, Federal Information Processing Publication 180-1, Apr. 17, 1995.

In the context of the present invention, the term "authenticate" means cryptographic authentication.

In the context of the present invention, the term "data request" means a data maintenance request or a data use request.

In the context of the present invention, the term "personal identification number" (PIN) means a password that complies with a password policy that is relatively insecure. A PIN is used to control use of user data stored on a smart card. A PIN may include a picture PIN. Picture PINs are described in U.S. Patent Application Publication No. 2003/01773366 A1 entitled "Method and Apparatus for Dynamic Personal Identification Number Management", of Eduard K. de Jong, filed Mar. 18, 2002 and incorporated herein by reference to demonstrate the level of skill in the art with respect to Picture PINs.

In the context of the present invention, the term "passphrase" means a phrase that complies with a password policy that is relatively secure. The term "passphrase" also describes a compressed form (such as a hash value) of such a password. A passphrase may include a PIN, including a picture PIN. A passphrase is used to control maintenance of user data stored on a smart card. The user data may include a PIN and the passphrase itself.

In the context of the present invention, the term "password" is used collectively to describe a personal identification number (PIN) or a passphrase.

In the context of the present invention, a "surface application," sometimes called an external application, means an application including data on an outer surface of a smart card that binds the smart card to an individual end-user. Exemplary external applications include a printed name, a picture of end-user, or a unique identifier for binding to an individual end-user. If a surface application only includes a unique identifier, the surface application is anonymous.

In the context of the present invention, the term "nonce" means a time-variant parameter that is used only once. A nonce can be, for example, a number or bit string.

In the context of the present invention, the term "user-controlled partition" describes a collection of data stored on a smart card, where control of at least part of the data by a smart card end-user application is independent of the control of that data by a smart card end-user application of another entity.

In the context of the present invention, the term "Enablement" means linking at least an identity or other information of an end-user with an applet in a smart card.

In the context of the present invention, the term "application provider back office" means an entity that provides one or more applications on a smart card. Different applications on a smart card may be associated with different application provider back offices.

In the context of the present invention, the term "identified user" means an end-user that is known to an application provider back office.

In the context of the present invention, the term "enrollment" means linking information associated with an end-user with a smart card application back office.

In the context of the present invention, an end-user is a human being and is sometimes referred to simply as a user.

In the context of the present invention, the term "card session rights flag" means one or more values for maintaining state information regarding rights a user has to user data stored on a smart card. A card session rights flag is based at least in part on a card session identifier that identifies a particular card session that begins when the card is inserted into a terminal and ends when the card is removed from the terminal.

Figure 4:
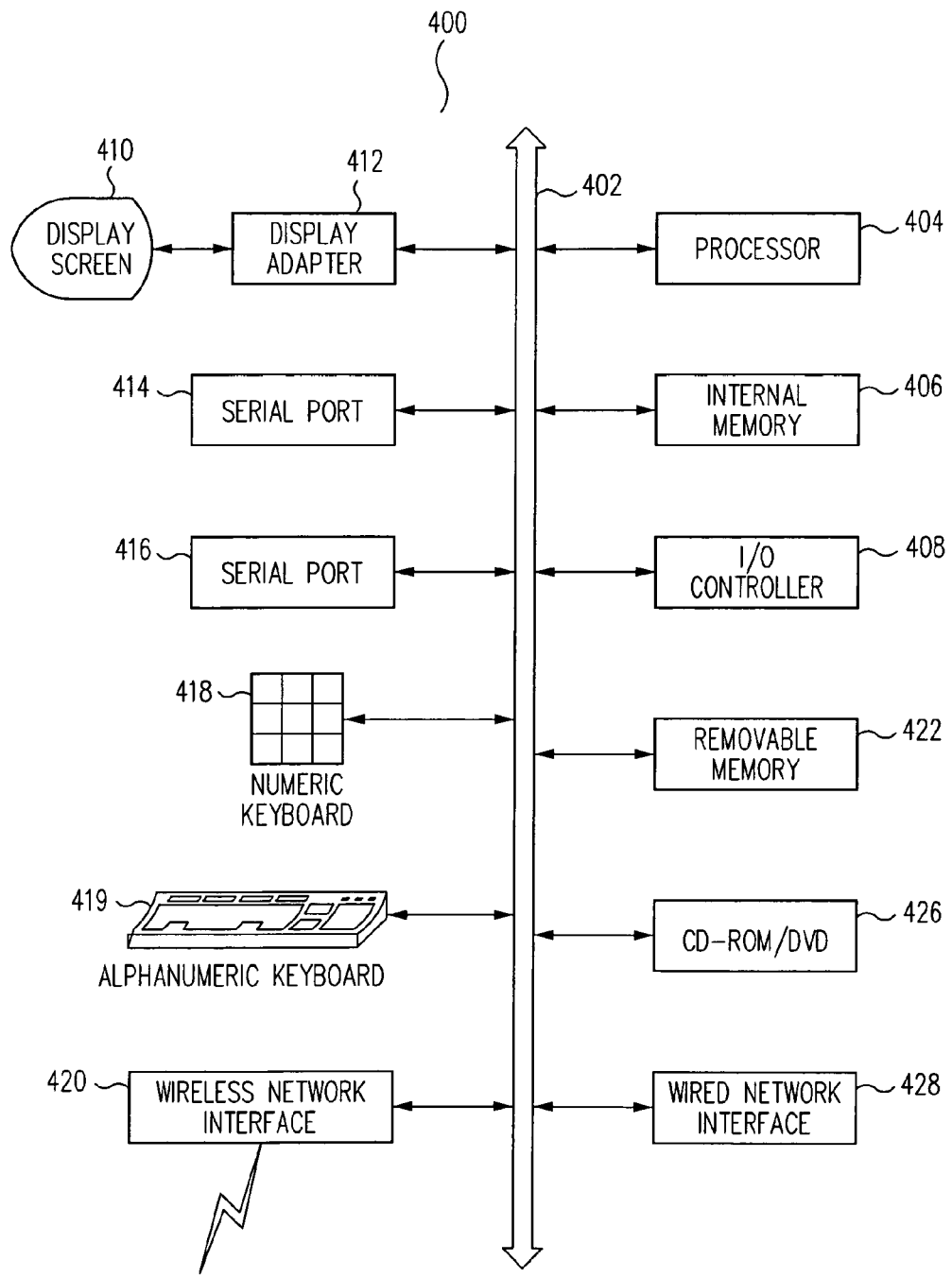
FIG. 4 is a block diagram of a computer system suitable for implementing aspects of the present invention.

FIG. 4 depicts a block diagram of a computer system 400 suitable for implementing aspects of the present invention. As shown in FIG. 4, computer system 400 includes a bus 402 which interconnects major subsystems such as a central processor 404, a system memory 406 (typically RAM), an input/output (I/O) controller 408, an external device such as a display screen 410 via display adapter 412, serial ports 414 and 416, a numeric keyboard 418, a keyboard 419, a wireless network interface 420, a fixed disk drive, removable memory 422 such as a flash-memory stick, a flash-memory card, a floppy disk, etc., a CD-ROM/DVD player 426 operative to receive a CD-ROM or DVD and a wired network interface 428.

Many other devices can be connected, such as a pointing device (e.g., a mouse) connected via serial port 414 and a modem connected via serial port 416 or a network port. The modem may provide a direct connection to a remote server via a telephone link or to the Internet via a POP (point of presence). Alternatively, a network interface adapter 420, 428 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 4 to be present to practice the present invention, as discussed below. Furthermore, the devices and subsystems may be interconnected in different ways from that shown in FIG. 4. The operation of a computer system such as that shown in FIG. 4 is readily known in the art and is not discussed in detail in this application, so as not to overcomplicate the present discussion. Code to implement the present invention may be operably disposed in system memory 406 or stored on storage media such as tape, fixed disk, floppy disk, flash memory, DVD or CD-ROM.

FIGS. 5 to 11 illustrate smart card personalization by binding personalization of a surface application with personalization of an internal application, in accordance with embodiments of the present invention. Before issuance of a smart card, a unique identifier is installed in an internal application of the smart card. Alternatively, a unique external identifier and a unique internal identifier can constitute the unique identifier.

Upon personalization of a surface application of the smart card, the unique identifier installed in the internal application is used as a credential for the smart card so that the outside application has knowledge about the unique identifier in the smart card. Reading the unique identifier is disabled once the smart card is claimed by an end-user, i.e., when the smart card PIN is enabled. This is explained in more detail below with reference to the various embodiments illustrated in FIGS. 5 to 11.

Figure 5:
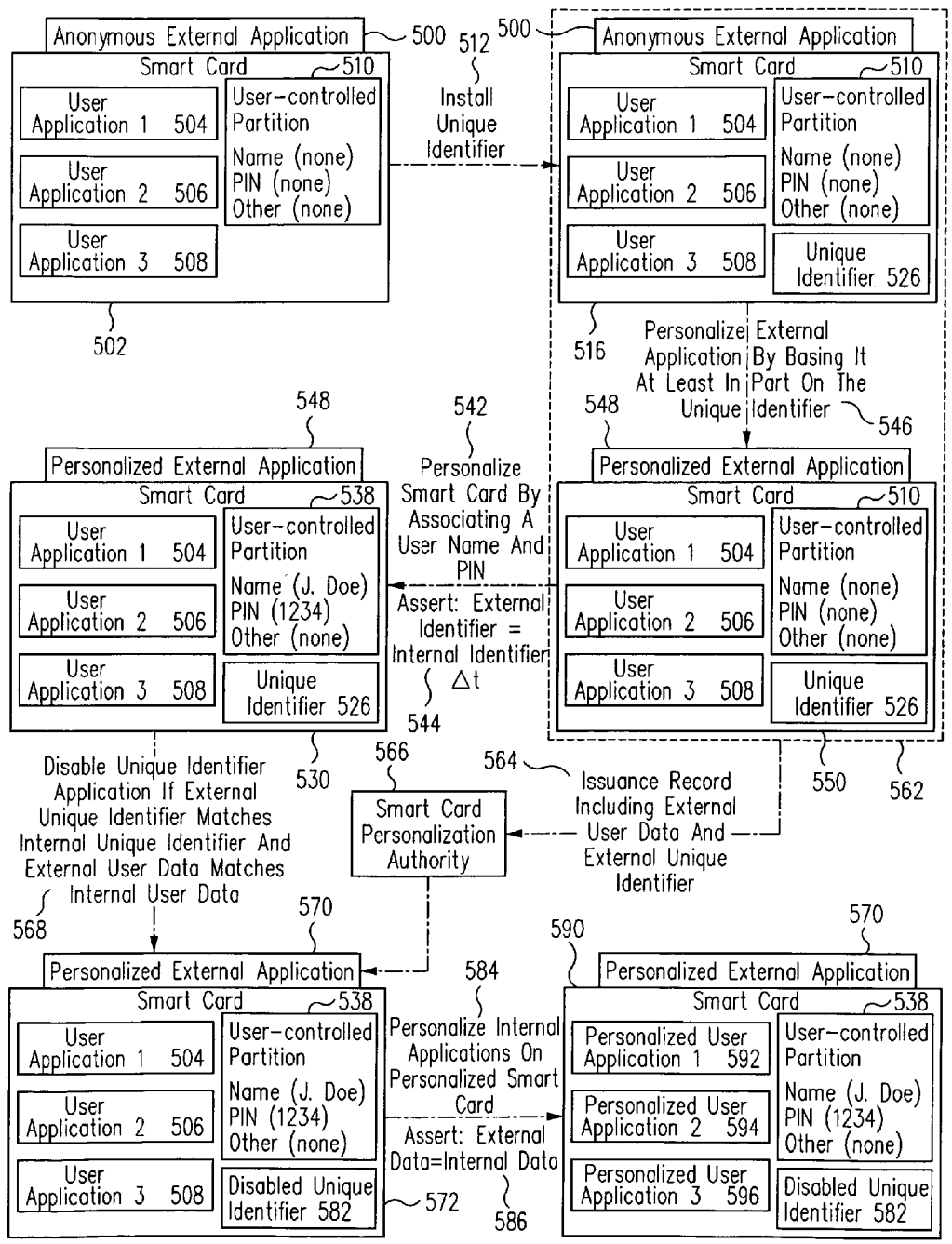
FIG. 5 is a block diagram that illustrates smart card personalization in accordance with one embodiment of the present invention.

Turning now to FIG. 5, a block diagram illustrates smart card personalization in accordance with one embodiment of the present invention. FIG. 5 illustrates several stages of smart card personalization. Each stage is represented by a different smart card configuration 502, 516, 530, 550, 572, and 590, sometimes referred to as smart card 502, 516, 530, 550, 572, and 590, respectively.

As shown in FIG. 5, smart card 502 has user application one 504, user application two 506, user application three 508, and user-controlled partition 510. Each of applications 504, 506, 508 is executable code stored in a memory of the smart card. Proper functioning of each application requires an indication that smart card 502 is associated with an identified end-user and possibly other user data.

Applications 504, 506, 508 may be pre-initialized by providing the applications with items that do not relate to an identified end-user of smart card 502, e.g., cryptographic keys, numbers, etc., but that are nevertheless required for proper functioning of user applications 504, 506, 508. User applications 504, 506, 508 are prevented from being associated with an end-user identity before smart card 502 has logged an identity of an end-user. Initially, the surface of smart card 502 includes an anonymous external application 500. User-controlled partition 510 includes empty fields for an end-user name, a PIN and possibly other data.

In operation 512, a unique identifier is installed on smart card 502, resulting in a smart card 516 having a unique identifier 526. Unique identifier 526 can be a single identifier, an internal identifier or an external identifier, or some combination of these identifiers.

According to one embodiment of the present invention, unique identifier 526 includes user-controlled partition 510. According to another embodiment of the present invention, unique identifier 526 includes an application such as an applet. According to yet another embodiment of the present invention, the applet forms part of a smart card issuer application that is used to load applications on smart card 516.

Still referring to FIG. 5, at operation 546, the anonymous external application 500 of smart card 516 is personalized by basing the external application at least in part on unique identifier 526 to create a smart card 550 having a personalized external application 548. In operation 564, smart card 550 issues an issuance record including external user data and a unique external identifier. A smart card personalization authority 566 may receive and store the issuance record for subsequent use in determining whether the unique external identifier matches an internal unique identifier and whether the external user data matches internal user data.

In operation 542, smart card 550 is personalized by associating an end-user name and a PIN with smart card 550, resulting in smart card 530 having nonempty fields for end-user name and PIN in user-controlled partition 538. In operation 568, unique identifier 526 of smart card 530 is disabled (a) if the external unique identifier in personalized external application 548 matches an internal unique identifier of unique identifier 526, and (b) if the external user data matches internal user data.

Thus, smart card 572 has a disabled unique identifier 582. According to one embodiment of the present invention, the unique identifier 526 is comprised by an application and is disabled by blocking the application from revealing the unique identifier. According to another embodiment of the present invention, unique identifier 526 is disabled by erasing the internal unique identifier from memory.

In operation 584, one or more user applications 504, 506, 508 of smart card 572 are personalized by associating end-user identification information from user-controlled partition 538 with the one or more user applications 504, 506, 508 to create a smart card 590 including personalized user applications 592, 594, 596.

While the operations shown in FIG. 5 are illustrated in a specific order, other sequences of the operations are conceivable, for example installing a unique identifier application 512 could be carried out after or simultaneously with personalizing an external application by basing the personalizing at least in part on the unique identifier 526.

According to one embodiment of the present invention, a user device includes smart card 530, 572, 590 and is adapted to execute a program. By way of example, the user device may be a personal digital assistant (PDA), a personal computer (PC), a mobile phone, a digital audio player (such as an MP3 player), a game console, a computer in communication with an end-user display, or the like.

According to another embodiment of the present invention, unique identifier application 526 is configured to determine a unique identifier based at least in part on the result of applying a hash function to data representing one or more surface applications. By way of example, the unique identifier may be based at least in part on the result of applying a hash function to one or more pictures or names installed on the surface of a smart card. Thus, unique identifier 526 is initially installed without including an identifier.

According to one embodiment of the present invention, smart card 502, 516, 530, 550, 572, 590 includes a Java Card™ technology-enabled smart card. Java Card™ technology is described in Z. Chen, Java Card™ Technology for Smart Cards—Architecture and Application programmer's Guide, Boston, Addison-Wesley, (2000).

According to one embodiment of the present invention, smart card 502, 516, 530, 550, 572, 590 includes a CDMA technology-enabled smart card. Code Division Multiple Access (CDMA) technology-enabled smart cards are described in Smart Card Stage I Description, Version 1.1, CDMA Development Group—Smart Card Team Document (May 22, 1996).

According to another embodiment of the present invention, smart card 502, 516, 530, 550, 572, 590 includes a Subscriber Identity Module (SIM) card. The term "SIM card" describes the smart card used in Global System for Mobile Communications (GSM) mobile telephones. The SIM includes the subscriber's personal cryptographic identity key and other information about the end-user, such as the current location of the phone and an address book of frequently called numbers. The SIM is described in Digital cellular telecommunications system (phase 2+); Specification of the Subscriber Identity Module—Mobile Equipment (SIM-ME) interface, ETSI, GSM 11.11 version 7.4.0, Release 1998.

According to another embodiment of the present invention, smart card 502, 516, 530, 550, 572, 590 includes a Wireless Interface Module (WIM). A WIM is a smart card in a Wireless Application Protocol (WAP) phone. It is described in Wireless Identity Module Part Security, WAP-260-WIM-20010712-a, Wireless Application Protocol Forum, Jul. 12, 2001.

According to another embodiment of the present invention, smart card 502, 516, 530, 550, 572, 590 includes a USIM (Universal Subscriber Identity Module). A USIM is a smart card for a 3GPP (3rd Generation Partnership Project) mobile phone. It is described in 3rd Generation Partnership Project; Technical Specification Terminals; USIM and IC card requirements, Release 4, 3GPP TS 21.111 V4.0.0 (2001-03).

According to another embodiment of the present invention, smart card 502, 516, 530, 550, 572, 590 includes a User Identity Module (UIM). A UIM is a smart card for a 3GPP Project 2 (3GPP2) mobile phone. The term "R-UIM" is used when the smart card is removable. A UIM is a super set of the SIM and allows CDMA (Code Division Multiple Access)-based cellular subscribers to roam across geographic and device boundaries. The R-UIM is described in a specification issued by the 3rd Generation Partnership Project 2 (3GPP2) and entitled 3rd Generation Partnership Project 2; Removable User Identity Module (R-UIM) for cdma2000 Spread Spectrum Systems, 3GPP2 C.S0023-0, Jun. 9, 2000.

The above description regarding various mobile phone technologies related to smart cards is not intended to be limiting in any way. Those of ordinary skill in the art will recognize that other devices may be used.

Figure 6A:
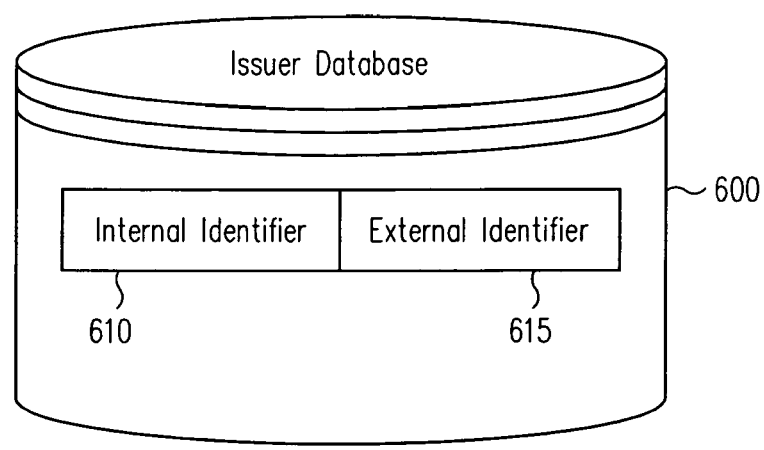
FIG. 6A is a block diagram that illustrates a data structure for storing one or more association between a smart card internal identifier and a smart card external identifier, in accordance with one embodiment of the present invention.

Turning now to FIG. 6A, a block diagram illustrates one embodiment of an issuer database 600 is presented. Issuer database 600 includes a data structure for storing one or more associations between a smart card internal identifier and a smart card external identifier, in accordance with one embodiment of the present invention.

As shown in FIG. 6A, issuer database 600 includes one or more entries. Each entry includes an internal identifier field 610 for storing an internal identifier and an external identifier field 615, associated with internal identifier 610, for storing an external identifier.

Figure 6B:
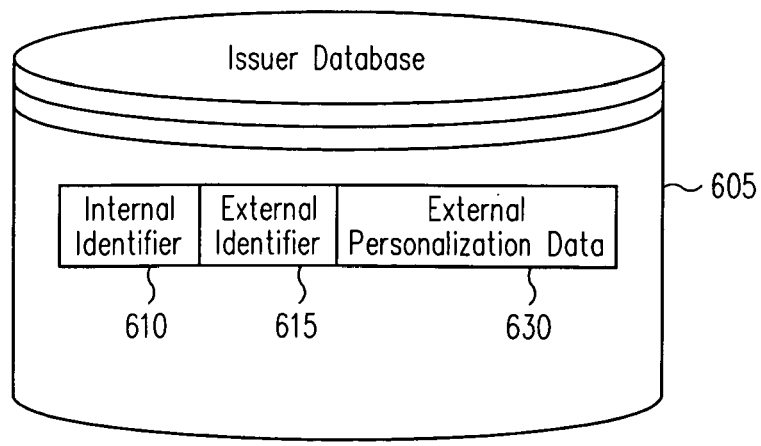
FIG. 6B is a block diagram that illustrates a data structure for storing one or more association between a smart card internal identifier, a smart card external identifier, and external personalization data, in accordance with one embodiment of the present invention.

Turning now to FIG. 6B, another block diagram illustrates another embodiment of an issuer database 605. Issuer database 605 includes a data structure for storing one or more associations between a smart card internal identifier, a smart card external identifier, and external personalization data, in accordance with one embodiment of the present invention.

As shown in FIG. 6B, issuer database 605 includes one or more entries. Each entry includes an internal identifier field 610 for storing an internal identifier; an external identifier field 615, associated with internal identifier 610, for storing an external identifier; and an external personalization data field 630, also associated with internal identifier 610, for storing external personalization data.

Figure 7:
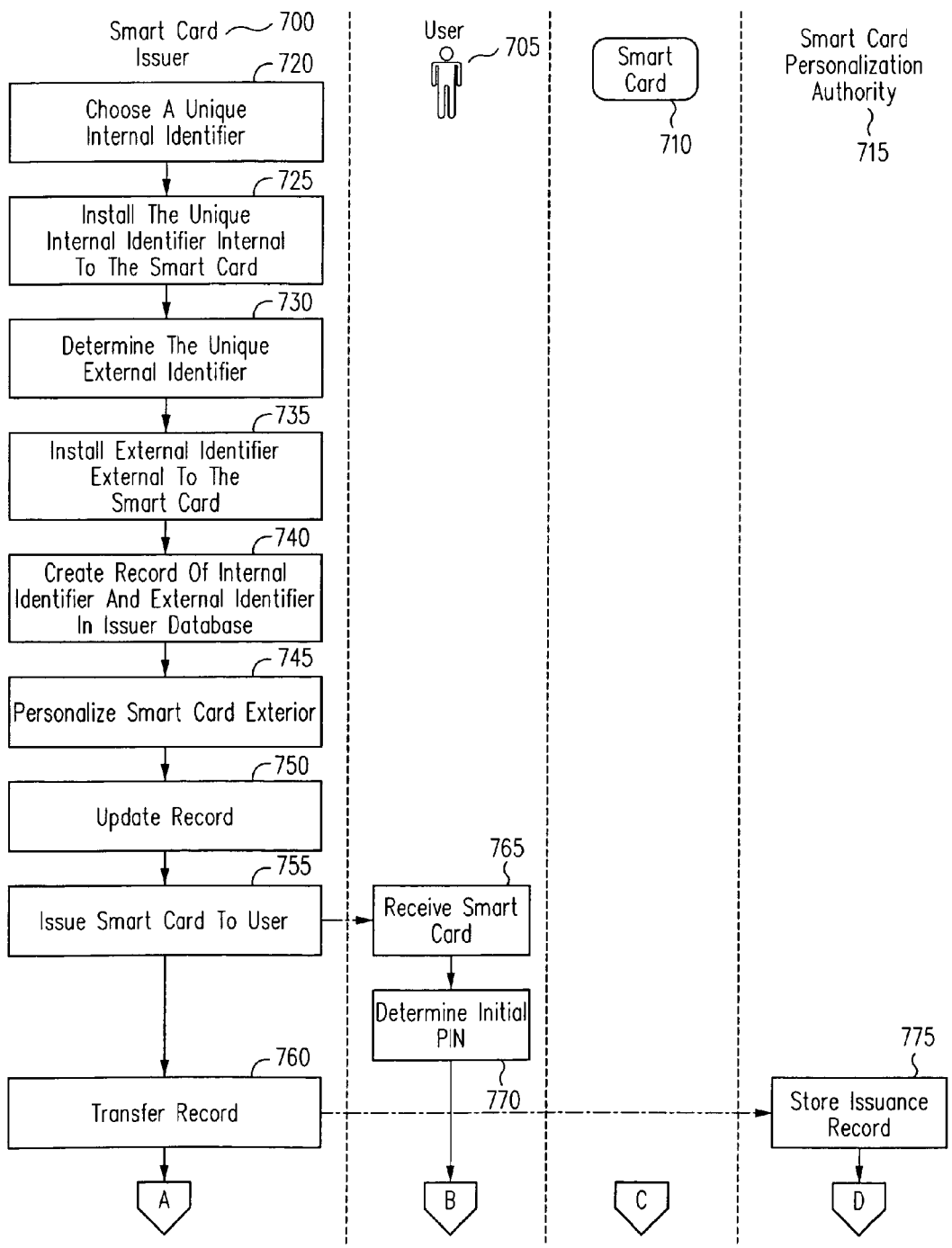
FIGS. 7, 8, and 9 are flow diagrams that illustrate a method for smart card personalization in accordance with one embodiment of the present invention.
Figure 8:
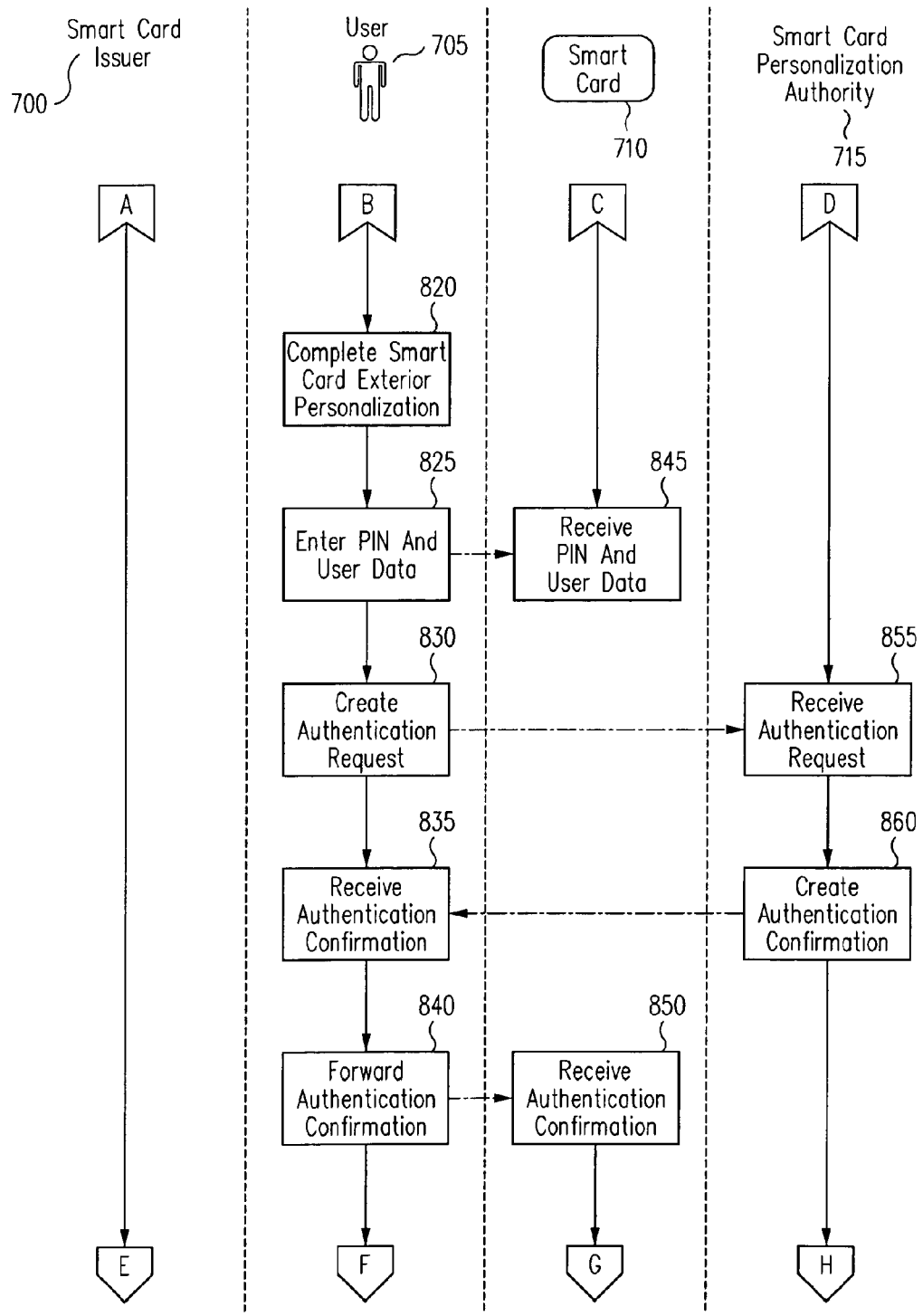
Figure 9:
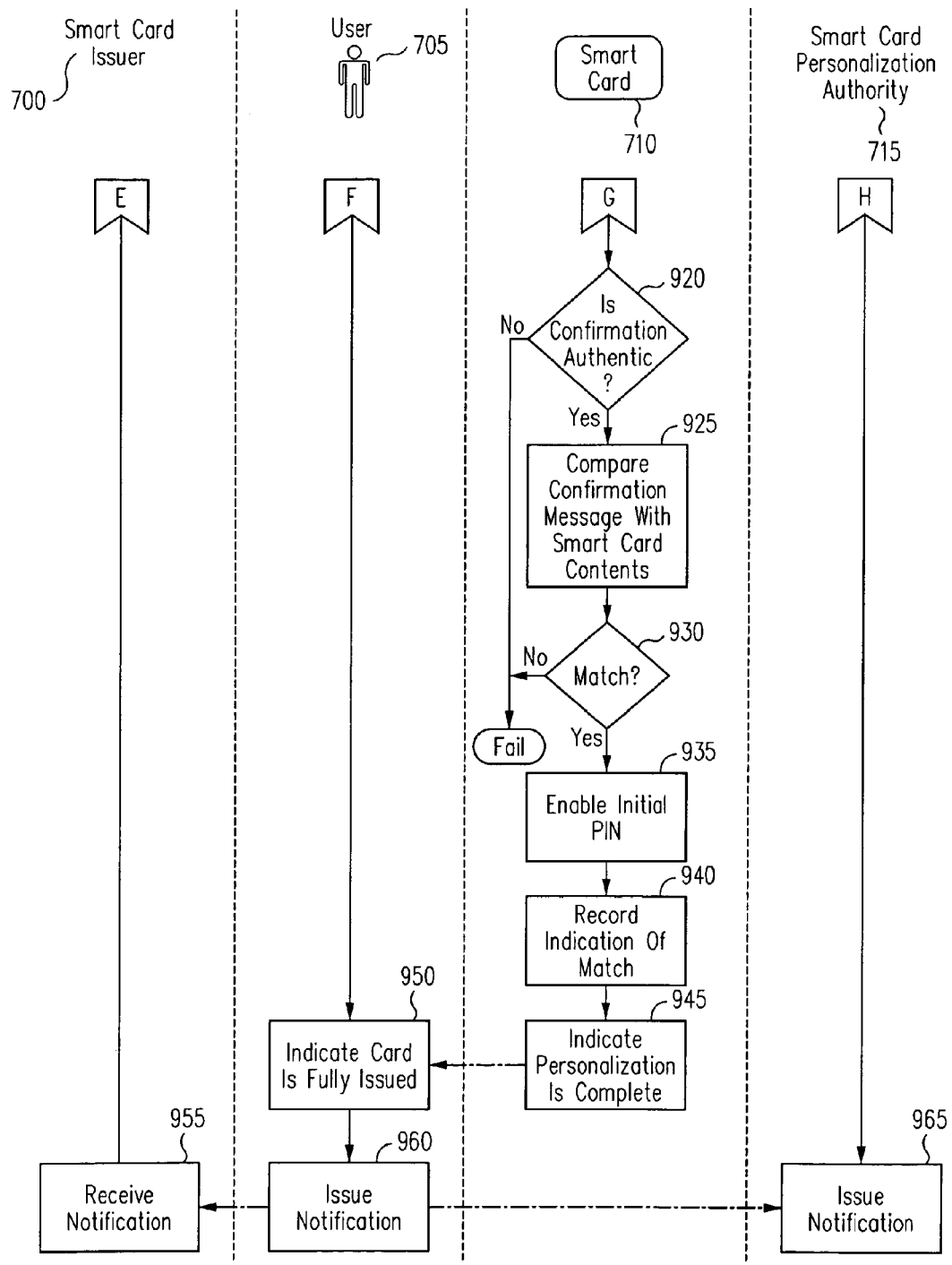

FIGS. 7, 8, and 9 are a process flow diagram for one embodiment of a method for smart card personalization. FIGS. 7, 8, and 9 provide more detail for one embodiment of the process described above with respect to FIG. 5. FIG. 8 is a continuation of FIG. 7, and FIG. 9 is a continuation of FIG. 8.

Referring to FIG. 7, a smart card issuer 700 chooses an internal unique identifier for smart card 710 in process 720. According to one embodiment of the present invention, the unique internal identifier is based at least in part on a chip serial number for smart card 710. In process 725, a unique identifier (see unique identifier 526, FIG. 5) based at least in part on the internal unique identifier is installed internal to smart card 710 by smart card issuer 700.

In process 730, a unique external identifier is determined by smart card issuer 700. In process 735, an external identifier based at least in part on the unique external identifier is installed external to smart card 710 by smart card issuer 700.

In process 740, a record of issuance of smart card 700 is created in a database of smart card issuer 700. The format of the record, in accordance with one embodiment of the present invention, is illustrated in FIG. 6A. In accordance with another embodiment of the present invention, the issuance record includes the external identifier, and the external application is based at least in part on the internal application, such that the internal identifier may be derived from the external identifier. The database of smart card issuer 700 thus maintains identifying information about smart cards in the smart card issuer's inventory.

In process 745, the smart card exterior is personalized by smart card issuer 700. By way of example, process 745 may include printing a name, number, or picture on the exterior of smart card 710. (See also process 546 and smart card 550 (FIG. 5).) In process 750, the record created in process 740 is updated with the information used to personalize the smart card exterior in process 745. One embodiment of the format of the updated record is illustrated in FIG. 6B.

In process 755, smart card issuer 700 issues smart card 710 to a smart card end-user 705, sometimes called end-user 705. In process 760, the record created in process 740 and updated in process 750 is transferred to a smart card personalization authority 715 by smart card issuer 700. (See also process 564 and authority 566 (FIG. 5).) In process 775, the smart card personalization authority 715 receives the record and stores the received record.

In process 765, smart card end-user 705 receives smart card 710 that was issued in process 755. In process 770, smart card end-user 705 determines an initial PIN.

According to one embodiment of the present invention, the record transferred in process 760 by smart card issuer 700 includes all the card holder personalization data. According to another embodiment of the present invention, additional personalization data is added subsequent to process 760 (e.g. process 820 of FIG. 8).

While the operations shown in FIG. 7 are illustrated in a specific order, other sequences of the operations are conceivable, for example creating a record of an internal identifier and an external identifier in an issuer database, process 740 could be performed simultaneously with updating the record used to personalize the smart card exterior in process 750. Additionally, personalizing the smart card exterior in process 745 may occur much later than process 740, e.g. when process 740 is performed during manufacture of smart card 710.

As shown in FIGS. 7, 8, and 9, a smart card issuer and a smart card personalization authority are separate entities. However, according to another embodiment of the present invention, a single entity performs the functions of a smart card issuer and of a smart card personalization authority.

Figure 10:
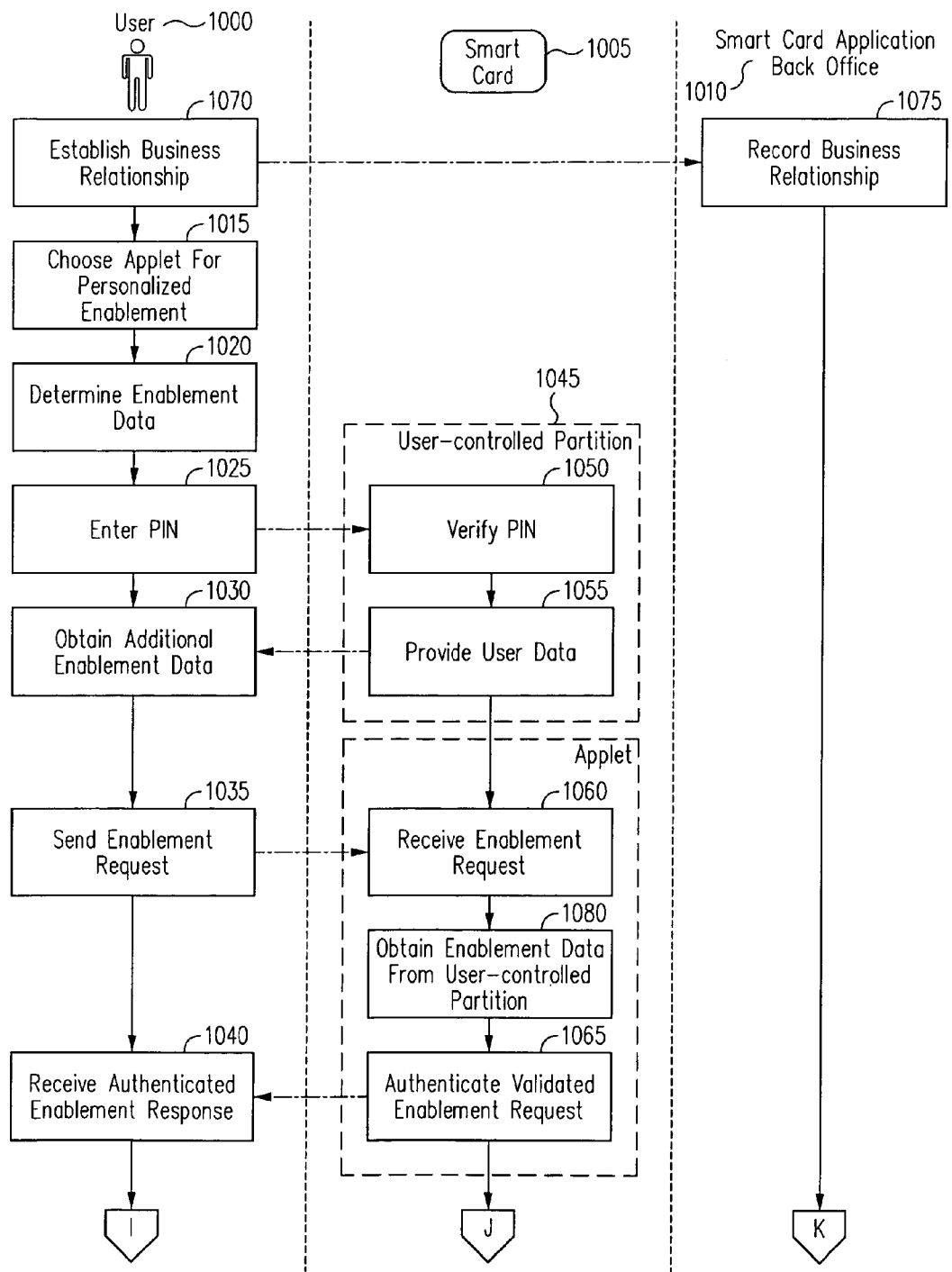
FIG. 10 is a flow diagram that illustrates a method for enablement of a smart card application in accordance with one embodiment of the present invention.
Figure 11:
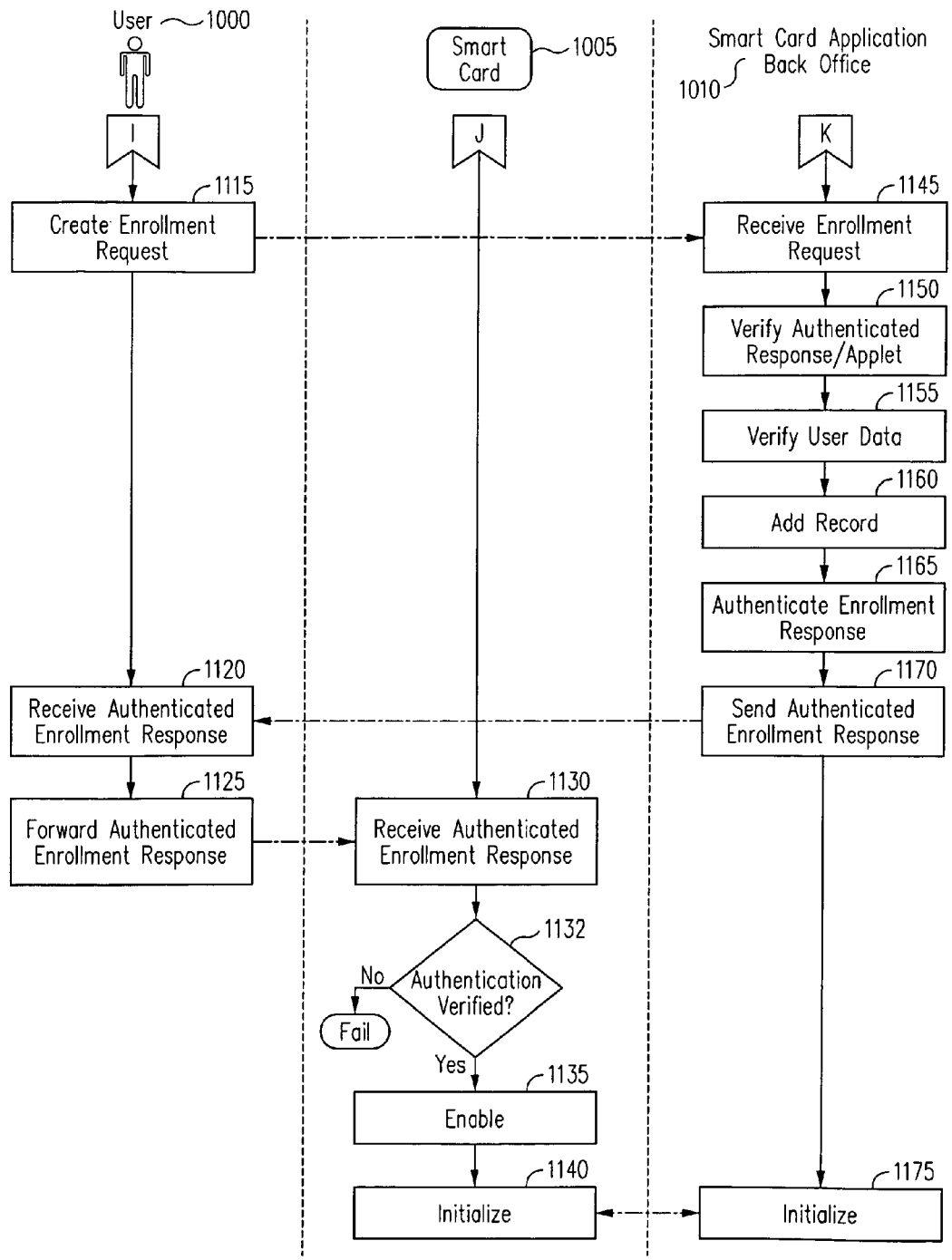
FIG. 11 is a flow diagram that illustrates a method for enrollment of a personalized smart card application in accordance with one embodiment of the present invention.

Also, in FIGS. 7 to 9 as well as FIGS. 10 and 11, an end-user is shown communicating with the smart card, the smart card personalization authority, or a smart card application back office. Those of skill in the art will understand that the end-user communicates with the smart card using some type of terminal device and communicates with the smart card personalization authority or the smart card application back office either via that terminal device or another user device. Thus, when it is said that the end-user performs an act with respect to the smart card or the smart card personalization authority or the smart card application back office, it should be interpreted as meaning the end-user causes the intermediary device to take the actions indicated using an appropriate user interface on that device.

In the embodiment of FIGS. 7, 8 and 9, smart card personalization authority 715 maintains an issuance record for each smart card. However, according to another embodiment of the present invention, the issuance record is deposited with a third party server, such as a Lightweight Directory Access Protocol (LDAP) server or the like. Smart card personalization authority 715 then retrieves an issuance record from the third party server when needed.

Returning to FIG. 8, in process 820, end-user 705 completes exterior personalization of smart card 710. Note that the external information added by the exterior personalization performed in process 820 is not included in the issuance record previously transferred to smart card personalization authority 715 in process 760 of FIG. 7.

In process 825, the end-user enters a PIN determined in process 770 and user data, which is received by smart card 710 in operation 845. In process 830, an authentication request is created and sent to smart card personalization authority 715 by end-user 705.

In process 855, smart card personalization authority 715 receives the authentication request. In process 860, smart card personalization authority 715 creates an authentication confirmation message and sends the authentication confirmation message to end-user 705. The authentication confirmation message indicates that the authentication is completed. More specifically, in one embodiment, the authentication confirmation message indicates that the information received in process 775 of FIG. 7 and the information received in process 855 match.

In process 835, end-user 705 receives the authentication confirmation message from smart card personalization authority 715. In process 840, end-user 705 forwards the authentication confirmation message to smart card 710. Smart card 710 receives the authentication confirmation message in process 850.

Referring now to FIG. 9, in check process 920, smart card 710 makes a determination whether the authentication confirmation message received in process 850 is authentic. The determination may use a cryptographic process using a symmetric or asymmetric algorithm and one or more cryptographic keys stored with an initial identifier applet, such as unique identifier 526 of FIG. 5.

If the received authentication confirmation message is authentic, process 925 compares the contents of the authentication confirmation message with the smart card contents. The authentication confirmation message includes a value or data to validate. If there is a match, process 940 records an indication of the match. The recorded indication may include an indication that the initial PIN is enabled by process 935, or an indication that the internal identifier is disabled. In process 945, an indication that personalization is complete is sent to end-user 705.

User 705 receives the indication that personalization is complete and indicates the card is fully issued in process 950. The indication may be made by modifying the record, or by removing the record.

In process 960, end-user 705 issues a notification that smart card 710 has been fully issued and personalized to smart card issuer 700. Smart card issuer 700 receives the notification in process 955, and smart card personalization authority 715 receives the notification in process 965. Upon completing the processes in FIGS. 7 to 9, the card is in an issued state and is bound to an identified end-user.

In the embodiment of FIGS. 7 to 9, when it is stated that a smart card issuer, the end-user, the smart card, or the smart card personalization authority takes an action, those-of-skill-in-the-art understand the action is accomplished using hardware, instructions executing on hardware, etc. The instructions can be provided by executable computer program code, e.g., software, or firmware. Accordingly, the processes may be implemented using hardware, software, firmware, or a combination thereof.

FIGS. 10 and 11 are a process flow diagram for enablement of a smart card application and enrollment of a personalized smart application in accordance with embodiments of the present invention. FIG. 11 is a continuation of FIG. 10.

The processes illustrated by FIGS. 10 and 11 are applicable for applications that require information other than the fact that the smart card has an identified end-user (an end-user recognized by a personalization authority), such as when an application requires the actual name of a person to operate. FIGS. 10 and 11 presuppose a smart card has been personalized by processes such as those described above with respect to FIGS. 7 to 9.

Turning now to FIG. 10, a flow diagram illustrates a method for enablement of a smart card application in accordance with one embodiment of the present invention. The processes illustrated in FIGS. 10 and 11 may be implemented using hardware, software, firmware, or a combination thereof.

In process 1070, an end-user 1000 establishes a business relationship between end-user 1000 and a smart card application back office 1010. By way of example, end-user 1000 may apply for a banking account at an institution having a banking application for execution on smart cards of account holders. In process 1075, the smart card application back office 1010 records the business relationship with end-user 1000.

In process 1015, end-user 1000 chooses an applet on smart card 1005 for enablement, which personalizes the applet. In process 1020, end-user 1000 determines the enablement data needed for the applet. In process 1025, end-user 1000 enters a PIN if that PIN has not already been entered in the current smart card session to obtain additional enrollment data from smart card 1005.

The PIN is received and verified by smart card 1005 in process 1050. In process 1055, smart card 1005 provides, to end-user 1000, user data in smart card 1005 that is controlled by the PIN. By way of example, the user data controlled by the PIN may include any or all of: an end-user name, a phone number, a social security number, a home address, a mailing address, a business address, and an applet identifier or other data stored in user-controlled partition 1045 of smart card 1005.

In process 1030, end-user 1000 receives the user data controlled by the PIN. In process 1035, end-user 1000 sends an enablement request to smart card 1005. In process 1060, an application, e.g., an applet, on smart card 1005 receives the enablement request. In process 1080, enablement data is obtained from user-controlled partition 1045 by the application.

In process 1065, smart card 1005 obtains data, which may include enablement data determined in process 1020, from smart card end-user 1000, validates the data, and authenticates the validated data based at least in part on data known to be in smart card 1005 (such as an end-user name and possibly other data). An authenticated enablement response is then sent to end-user 1000. End-user 1000 receives the authenticated enablement response in process 1040.

Turning now to FIG. 11, in process 1115, end-user 1000 creates an enrollment request including the authenticated enablement response received in process 1040 and sends the enrollment request to smart card application back office 1010. Smart card application back office 1010 receives the enrollment request in process 1145.

Smart card application back office 1110 verifies that the enrollment request is for an actual applet contained on an actual smart card based at least in part on data included in the authenticated enablement response in verification process 1150. According to one embodiment of the present invention, a cryptographic process is applied to verify a signature of the authenticated enablement response received in the enrollment request in process 1145. Authentication may use cryptographic keys previously setup between smart card 1005 and back office 1010, e.g., as described in below with reference to FIG. 13.

Smart card application back office 1010 verifies user data in process 1155. According to one embodiment of the present invention, the verification includes determining whether a user category determined from the user data matches a user category supported by the requested service.

Still referring to FIG. 11, smart card application back office 1010 stores a record indicating end-user 1000 is a user of the requested service in process 1160. In process 1165, smart card application back office 1010 authenticates an enrollment response. The authenticated enrollment response is based on at least part of the user data verified in process 1155. In process 1170, smart card application back office 1010 sends the authenticated enrollment response to end-user 1000.

In process 1120, end-user 1000 receives the authenticated enrollment response, and in process 1125 forwards the authenticated enrollment response to smart card 1005. In process 1130, smart card 1005 receives the authenticated enrollment response.

In authentication verification check process 1132, smart card 1005 verifies the authentication. Smart card 1105 enables the personalized application for using the requested service in process 1135 if verification check process 1132 is successful. In process 1140, smart card 1005 communicates with initialization process 1175 in smart card application back office 1010 to initialize the operation of the personalized applet on smart card 1005. The initialization may include, by way of example, installation of one or more cryptographic keys, and setting an initial balance amount. Upon completing the processes in FIGS. 10 and 11, the application in smart card 1005 is in an enabled state and is bound to an identified end-user.

FIGS. 12 to 17 illustrate personalization of a multi-application smart card in accordance with embodiments of the present invention. A smart card is blocked if a user-controlled partition is improperly or partially initialized. The smart card is issued to the end-user in a "blank" state, rather than being initialized upon issuance to an end-user, hence upon issuance, the card is "blocked". All functions requiring a link to an identified end-user are disabled upon issuance. Functions that are independent of an end-user are enabled (e.g. electronic purse, where the only relevant part is that the money in the purse can be trusted (the credential in the smart card is recognized by the money system, irrespective of who owns the smart card)). This restriction prevents the smart card from being useful for anybody but the rightful owner. Thus, the multiple applications on the smart card can be run by commercially-unrelated entities having business with the same smart card holder.

Figure 12:
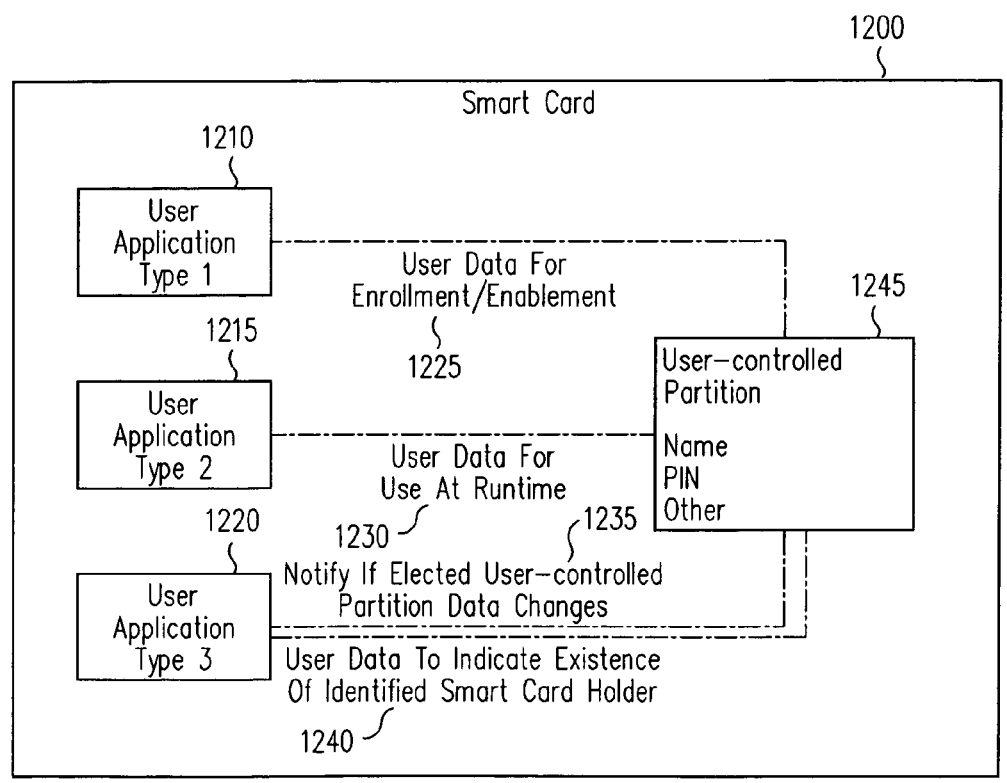
FIG. 12 is a block diagram that illustrates the interaction between user applications and a user-controlled partition in accordance with one embodiment of the present invention.

Turning now to FIG. 12, a block diagram illustrates the interaction between user applications 1210, 1215 and 1220 and a user-controlled partition 1245 on smart card 1200 in accordance with embodiments of the present invention. Three types of user applications are represented in FIG. 12.

According to one embodiment of the present invention, a user application 1210 requires user data 1225 stored in user-controlled partition 1245 of smart card 1200 to complete the enrollment process. According to another embodiment of the present invention, a user application 1215 requires user data 1230 stored in user-controlled partition 1245 of smart card 1200 to complete the enrollment process and to operate after enrollment. According to another embodiment of the present invention, a user application 1220 requires user data 1240 stored in user-controlled partition 1245 of smart card 1200 to verify that smart card 1200 has an identified smart card holder, irrespective of the identity of the particular smart card holder.

According to one embodiment of the present invention, a smart card application back office is notified of a change to specific data in user-controlled partition 1245 that is relevant to a user application 1210, 1215, 1220. According to one embodiment of the present invention, notification of the smart card application back office is performed via notification 1235 of an application resident on smart card 1200 and adapted to handle such notifications.

According to one embodiment of the present invention, information about the smart card end-user name is immutable. Once the smart card end-user name is entered, the name cannot be changed. This guarantees that applications on smart card 1200 share the same smart card end-user name, at least for use during their respective enrollment processes.

According to one embodiment of the present invention, use of user-controlled partition data 1245 that identifies an end-user is controlled by a password. By way of example, an end-user name including the name of an individual is controlled by the password.

According to one embodiment of the present invention, use of data (read-only access) in user-controlled partition data is controlled by a password that is a PIN, and modification of data in user-controlled partition 1245 is controlled by a password that is a passphrase.

According to another embodiment of the present invention, a secondary PIN authorizes smart card 1200 to be used in situations where a first limit is exceeded, such as when there may be financial consequences, legal consequences, or both. By way of example, the secondary PIN may be required to complete a financial transaction when the amount of purchase charged using smart card 1200 exceeds a predetermined amount.

According to another embodiment of the present invention, a third PIN authorizes smart card 1200 to be used in situations where a second limit is exceeded, where the second limit is more than the first limit. Additional PINs may be used in situations where other limits are exceeded. The different PINs have different qualified uses, but those different qualified uses may be shared among multiple applications. If there is sharing, the PIN may be a part of user-controlled partition 1245.

According to another embodiment of the present invention, a specific limit is tied to an application, but the PINs are shared. By way of example, a secondary PIN may be associated with a $500 limit for a first financial application, and the same secondary PIN may be associated with a $1000 limit for a second financial application.

According to another embodiment of the present invention, user-controlled partition 1245 includes data that is controlled by the smart card's PIN, such as information that relates to a person, but not personally. By way of example, the user-controlled partition may include one or more language preferences.

According to another embodiment of the present invention, user-controlled partition 1245 includes personal preference information. By way of example, user-controlled partition 1245 may include an end-user's preferred name (e.g. what name is displayed when the smart card is put in an automated teller machine (ATM)), a preferred business address, a preferred mailing address, and a preferred phone number or any one or any combination of this data. According to another embodiment of the present invention, user-controlled partition 1245 includes biometric data concerning the smart card user.

Figure 13:
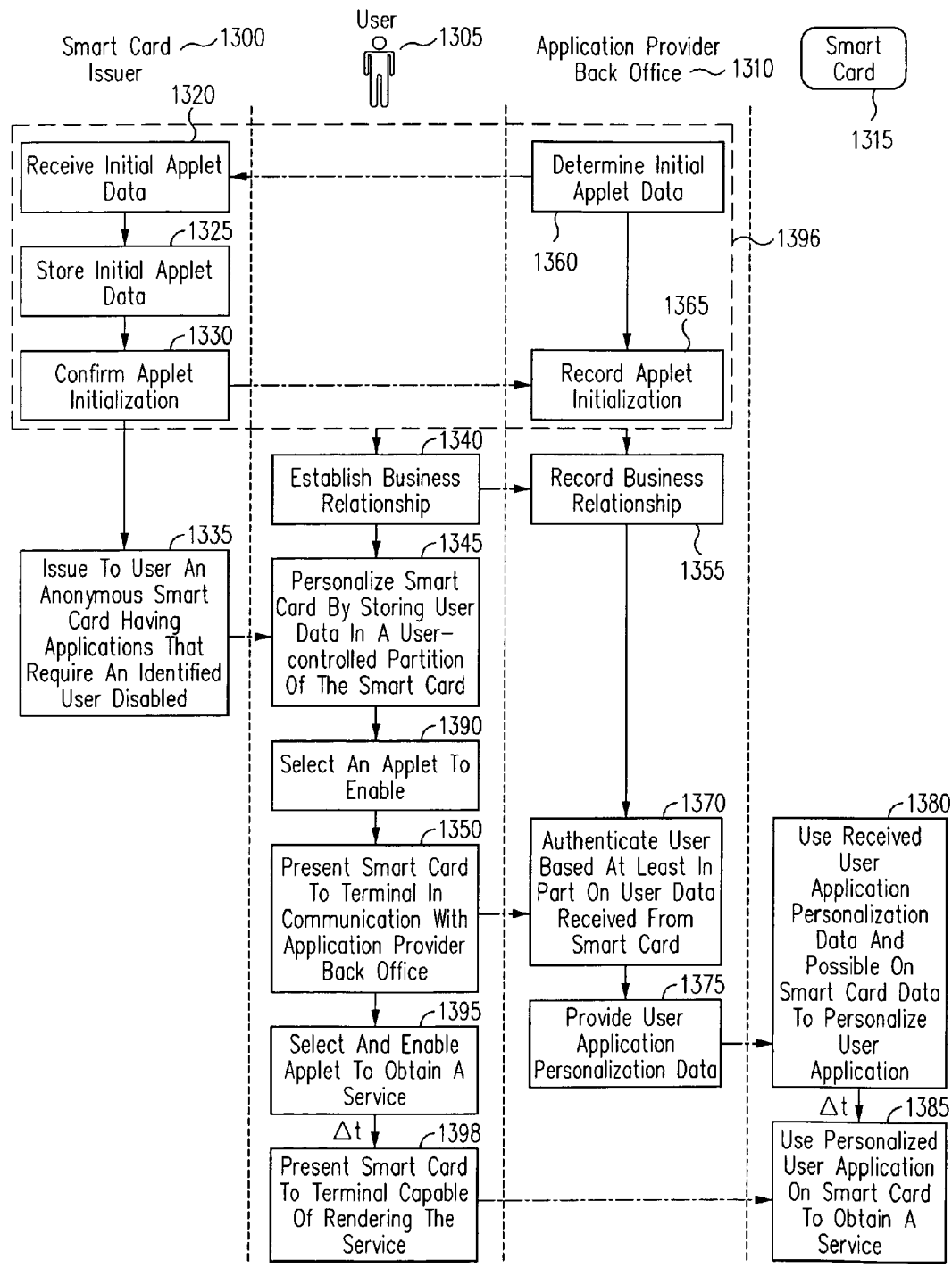
FIG. 13 is a high level flow diagram that illustrates a method for personalizing multi-application smart cards in accordance with one embodiment of the present invention.

Turning now to FIG. 13, a high level flow diagram illustrates a method for personalizing multi-application smart cards in accordance with one embodiment of the present invention. Processes within box 1396 are referred to collectively as "pre-initialization". Pre-initialization may be repeated for each application supported by the smart card at issuance. Pre-initialization may also be performed for each application after that application has been loaded subsequent to issuance of smart card 1315.

In process 1360, application provider back office 1310 determines initial applet data. The initial applet data may include items that do not relate to an identified end-user of smart card 1315, e.g., cryptographic keys, numbers, etc., but that are nevertheless required for proper functioning of the applet.

Still referring to FIG. 13, a smart card issuer 1300 receives initial applet data in process 1320. In process 1325, smart card issuer 1300 stores the initial applet data and confirms applet initialization in process 1330. In process 1365, application provider back office 1310 records the applet initialization sent by smart card issuer 1300 from process 1330.

In process 1340, an end-user 1305 establishes a business relationship with application provider back office 1310. Application provider back office 1310 records the business relationship in process 1355.

In process 1335, smart card issuer 1300 issues to end-user 1305 an anonymous smart card 1315 having applications, which require an identified user, disabled. In process 1345, end-user 1305 personalizes smart card 1315 by storing user data in a user-controlled partition of smart card 1315.

In process 1390, end-user 1305 selects an applet to enable, e.g., either based on the pre-established business relationship, or based on a business relationship to be established before personalizing a corresponding user application on smart card 1315. In process 1350, end-user 1305 presents smart card 1315 to a terminal in communication with application provider back office 1310 if smart card 1305 is not already in such a terminal.

Still referring to FIG. 13, in process 1370, application provider back office 1310 authenticates end-user 1305 based at least in part on user data received from smart card 1315. In process 1375, application provider back office 1310 provides user application personalization data to smart card 1315.

In process 1380, smart card 1315 receives the user application personalization data and uses this data and possibly other data on smart card 1315 to personalize one or more user applications on smart card 1315. In process 1395, end-user 1305 selects and enables an applet to obtain a service, which may include selecting one or more user applications in smart card 1315 supported by the terminal. In process 1398, end-user 1305 presents smart card 1315 to a terminal capable of rendering the service. In process 1385, smart card 1315 uses the one or more personalized user applications on smart card 1315 to obtain a service.

Figure 14:
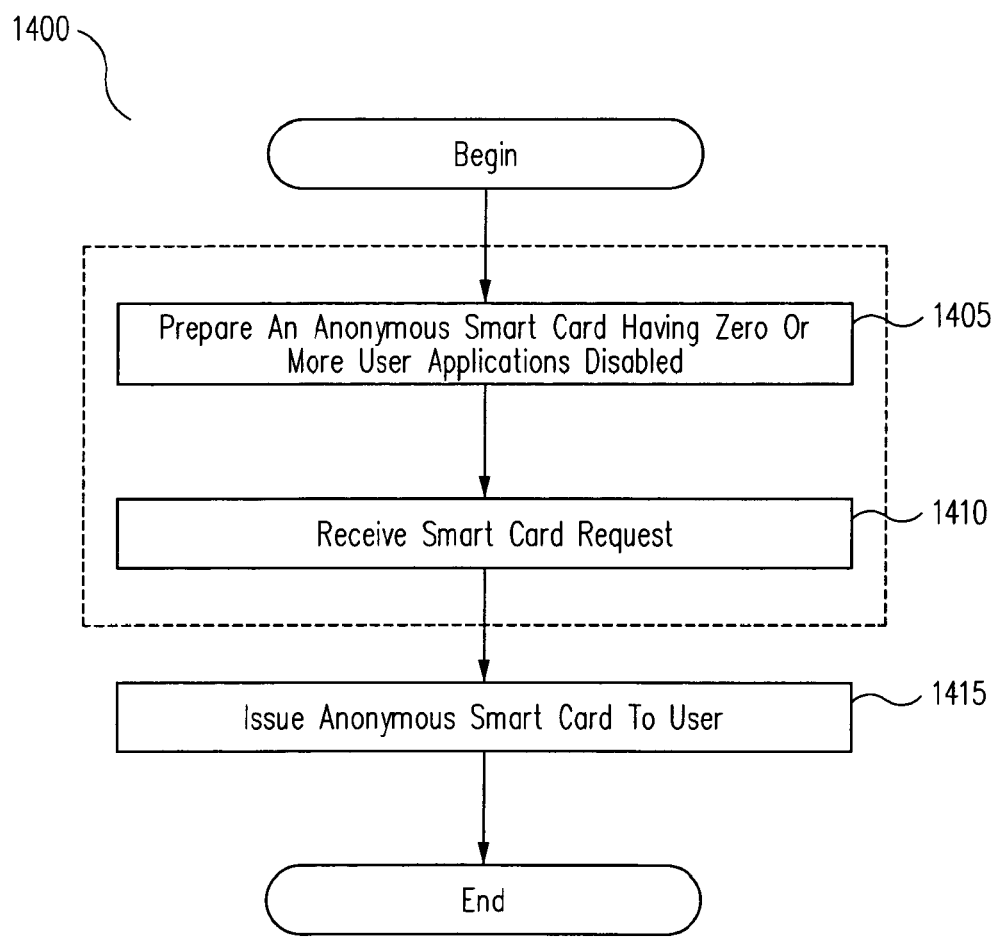
FIG. 14 is a flow diagram that illustrates a method for personalizing multi-application smart cards from the perspective of a smart card issuer in accordance with one embodiment of the present invention.

Turning now to FIG. 14, a flow diagram illustrates a method for personalizing multi-application smart cards 1400 from the perspective of a smart card issuer in accordance with one embodiment of the present invention. The processes illustrated in FIG. 14 may be implemented using hardware, software, firmware, or a combination thereof. FIG. 14 provides another perspective for the processes performed by smart card issuer 1300 in box 1396 and process 1335 of FIG. 13, when the end-user issues the request for the anonymous smart card.

In process 1405, an anonymous smart card having zero or more user applications disabled is prepared. The anonymous smart card may be prepared by pre-initializing user applications as discussed with respect to the processes in box 1396 of FIG. 13. In process 1410, a smart card request is received. In process 1415, the anonymous smart card is issued to a user.

While the operations shown in FIG. 14 are illustrated in a specific order, other sequences of the operations are conceivable, for example process 1405 for preparing an anonymous smart card having user applications disabled could be carried out after receiving a smart card request in process 1410.

Figure 15:
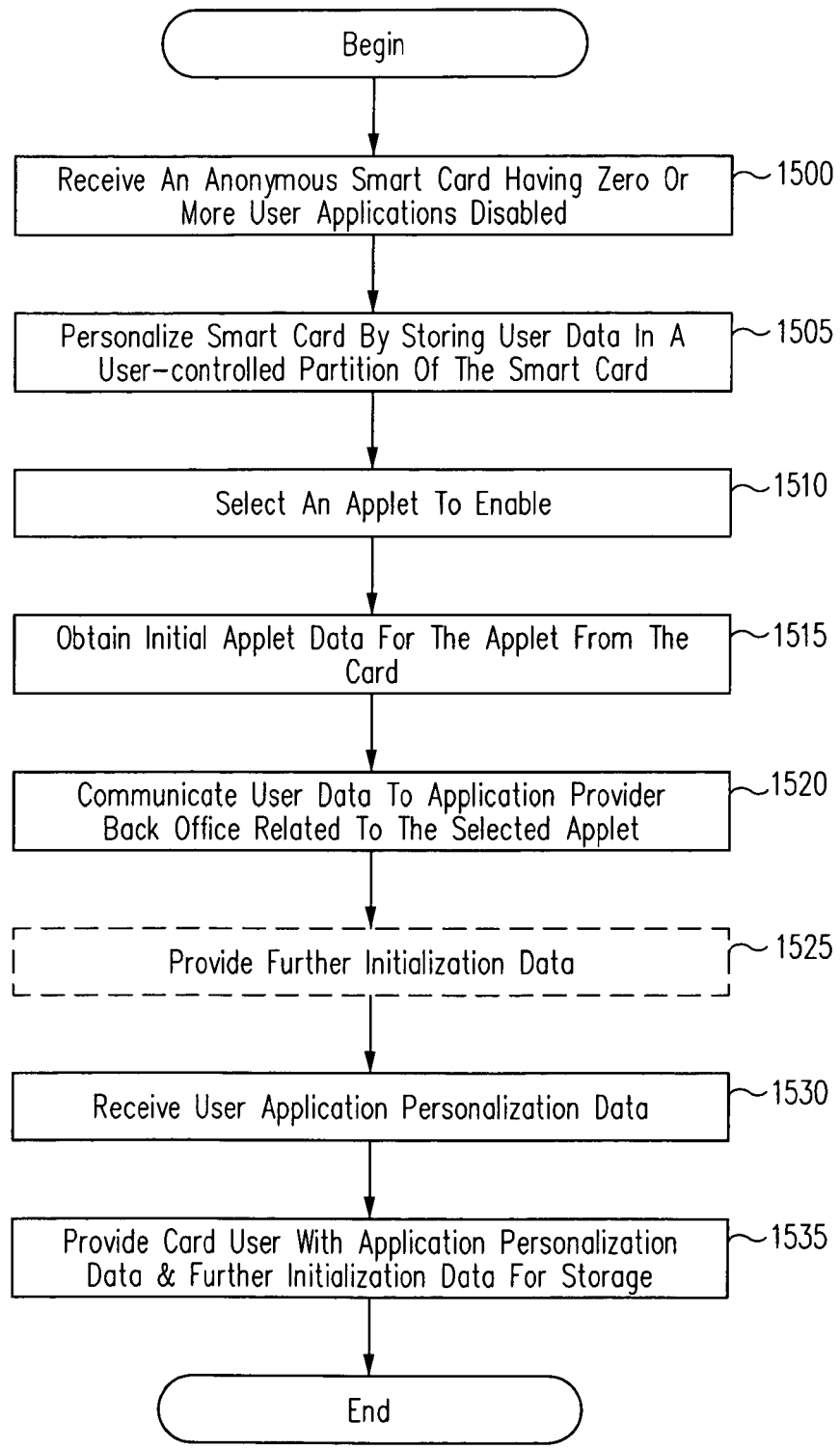
FIG. 15 is a flow diagram that illustrates a method for personalizing multi-application smart cards from the perspective of a smart card user in accordance with one embodiment of the present invention.

Turning now to FIG. 15, a flow diagram illustrates a method for personalizing multi-application smart cards from the perspective of a smart card end-user in accordance with one embodiment of the present invention. The processes illustrated in FIG. 15 may be implemented using hardware, software, firmware, or a combination thereof. FIG. 15 provides more detail for one embodiment of processes 1345, 1390, and 1350 of FIG. 13.

In process 1500, an anonymous smart card having zero or more user applications disabled is received by the user. In process 1505, the smart card is personalized by storing user data in a user-controlled partition of the smart card. In process 1510, an applet to enable is selected, e.g., either based on pre-established business relationship, or based on a business relationship to be established before personalizing a corresponding user application on the smart card.

In process 1515, initial applet data for the applet is obtained from the card. In process 1520, the user data is communicated to an application provider back office related to the selected applet. In process 1525, further initialization data is optionally provided. In process 1530, user application personalization data is received. In process 1535, the card is provided with user application personalization data and further initialization data for storage.

As indicated above, communication between a smart card and a smart card user, a smart card personalization authority, or a smart card application back office in FIGS. 7 to 11, 13, and 15 may be via a terminal or card acceptance device (not shown in FIGS. 7 to 11, 13, and 15). Additionally, one or more functions illustrated as being performed by a smart card end-user in FIGS. 7 to 11, 13, and 15 may be performed by the terminal.

Figure 16:
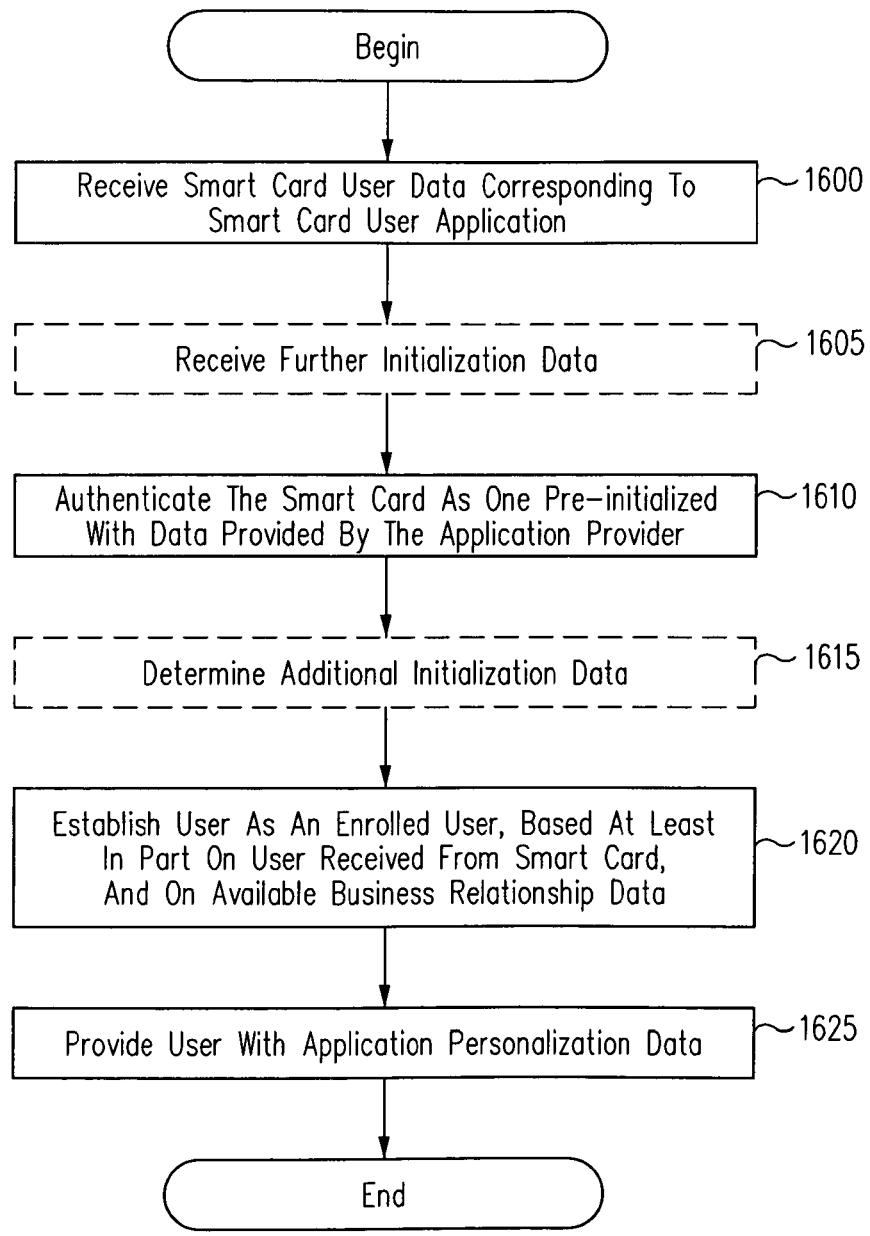
FIG. 16 is a flow diagram that illustrates a method for personalizing multi-application smart cards from the perspective of an application provider back office in accordance with one embodiment of the present invention.

Turning now to FIG. 16, a flow diagram illustrates a method for personalizing multi-application smart cards from the perspective of an application provider back office in accordance with one embodiment of the present invention. The processes illustrated in FIG. 16 may be implemented using hardware, software, firmware, or a combination thereof. FIG. 16 provides more detail for one embodiment of processes 1370 and 1375 of FIG. 13.

In process 1600, smart card user data corresponding to a smart card user application is received by the application provider back office. In process 1605, further initialization data is optionally received. By way of example, the application provider back office may determine that one or more additional cryptographic keys, such as transport keys, are required.

In process 1610, the smart card is authenticated as one pre-initialized with data provided by the application provider. In process 1615, additional initialization data is optionally determined. The end-user is established as an enrolled user with a smart card enabled for application services, based at least in part on user data received from the smart card, and business relationship data available to the application provider back office in process 1620.

In process 1625, the application provider back office provides the end-user with application personalization data, which in one embodiment is provided via the smart card. The user application personalization data may include one or more cryptographic credentials, such as secret keys. The user personalization data may be authenticated.

Figure 17:
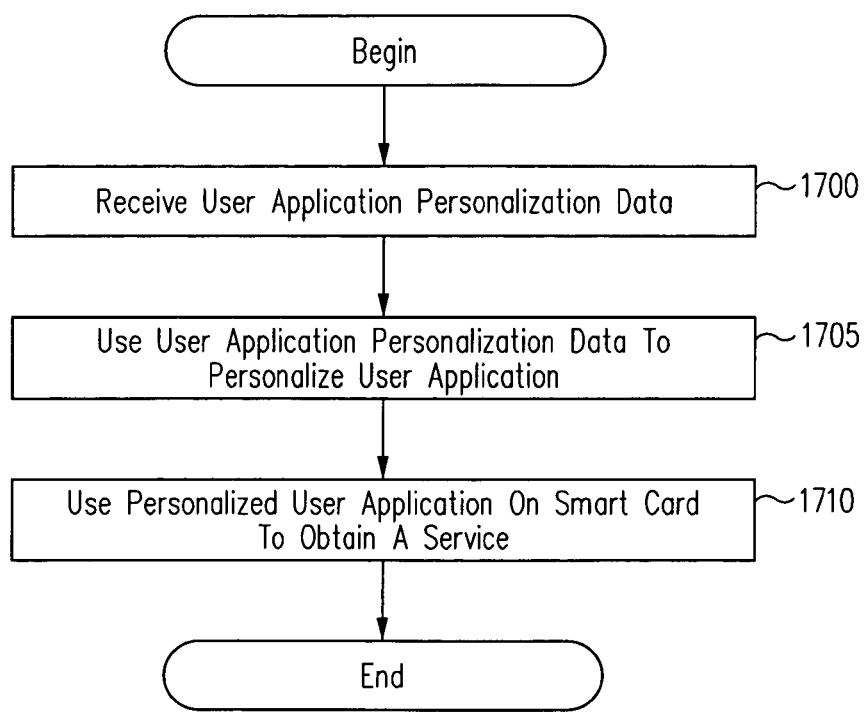
FIG. 17 is a flow diagram that illustrates a method for personalizing multi-application smart cards from the perspective of a smart card in accordance with one embodiment of the present invention.

Turning now to FIG. 17, a flow diagram illustrates a method for personalizing multi-application smart cards from the perspective of a smart card in accordance with one embodiment of the present invention. The processes illustrated in FIG. 17 may be implemented using hardware, software, firmware, or a combination thereof. FIG. 17 provides more detail for one embodiment of processes 1380 and 1385 of FIG. 13.

In process 1700, user application personalization data is received by the smart card. In process 1705, the user application personalization data is used to personalize the user application in the smart card. In process 1710, the personalized user application on the smart card is used to obtain a service.

Figure 18:
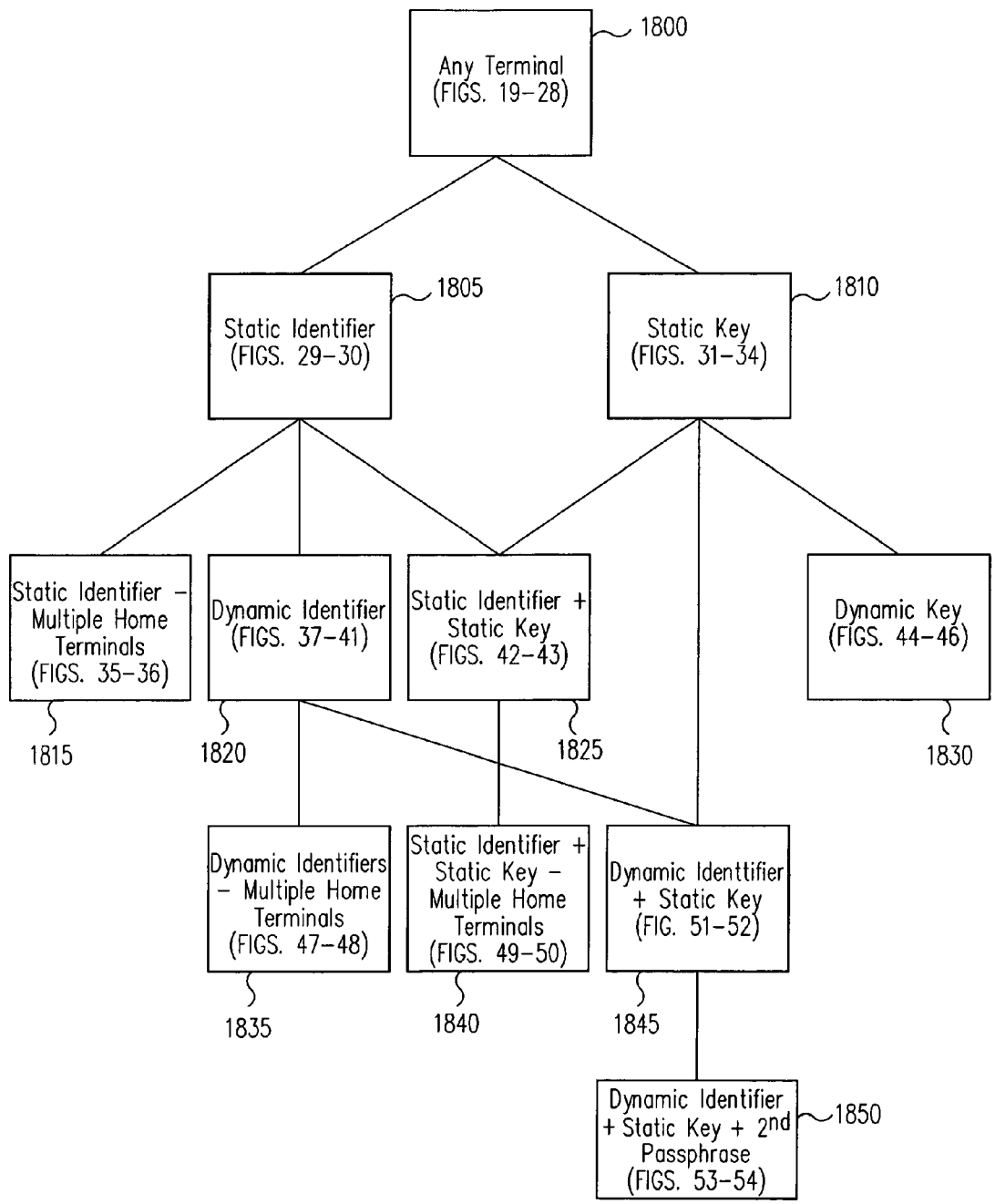
FIG. 18 is a block diagram that provides an overview of relationships between embodiments of the present invention.
Figure 19:
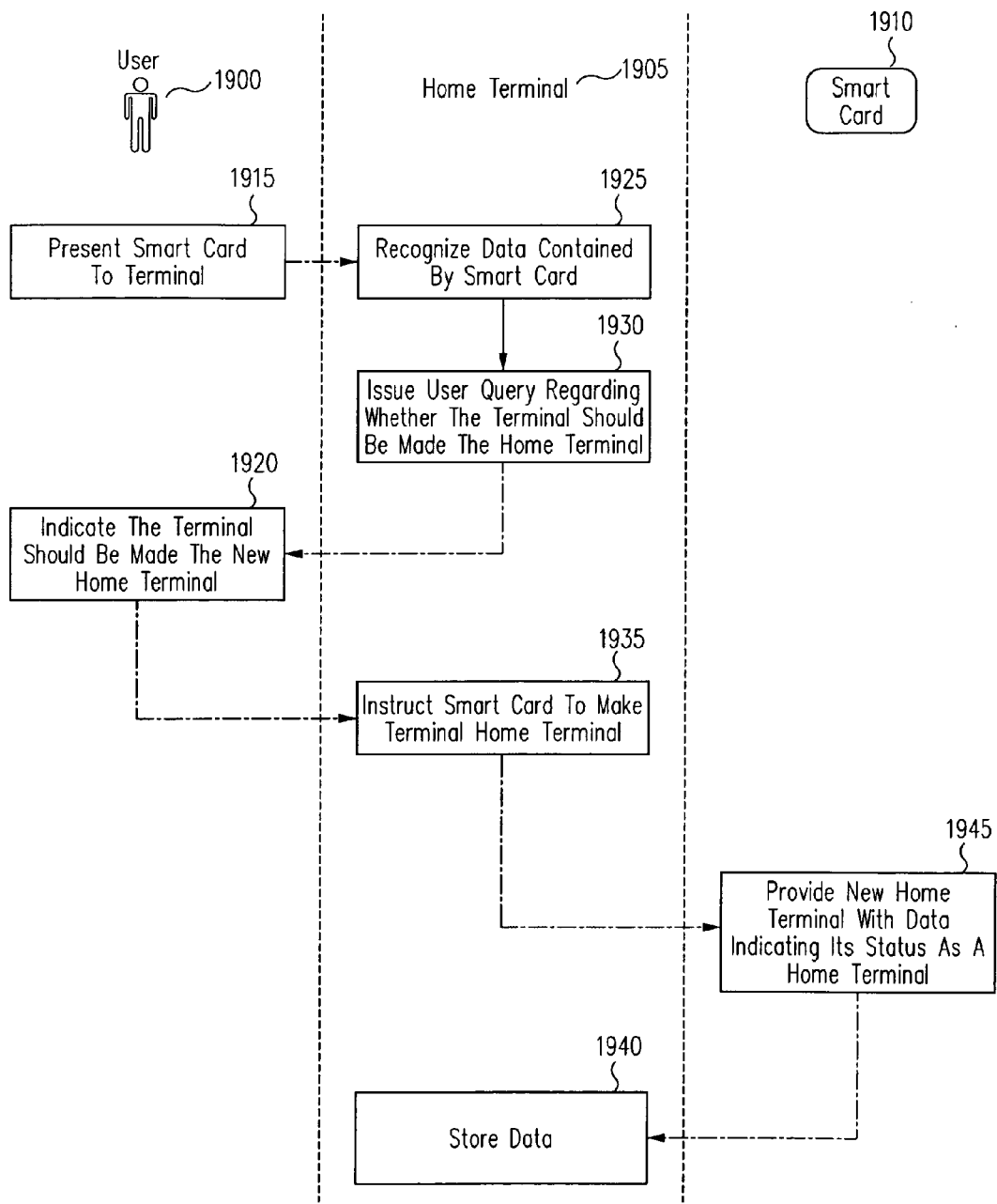
FIG. 19 is a flow diagram that illustrates a method for designating a terminal as a home terminal in accordance with one embodiment of the present invention.
Figure 20:
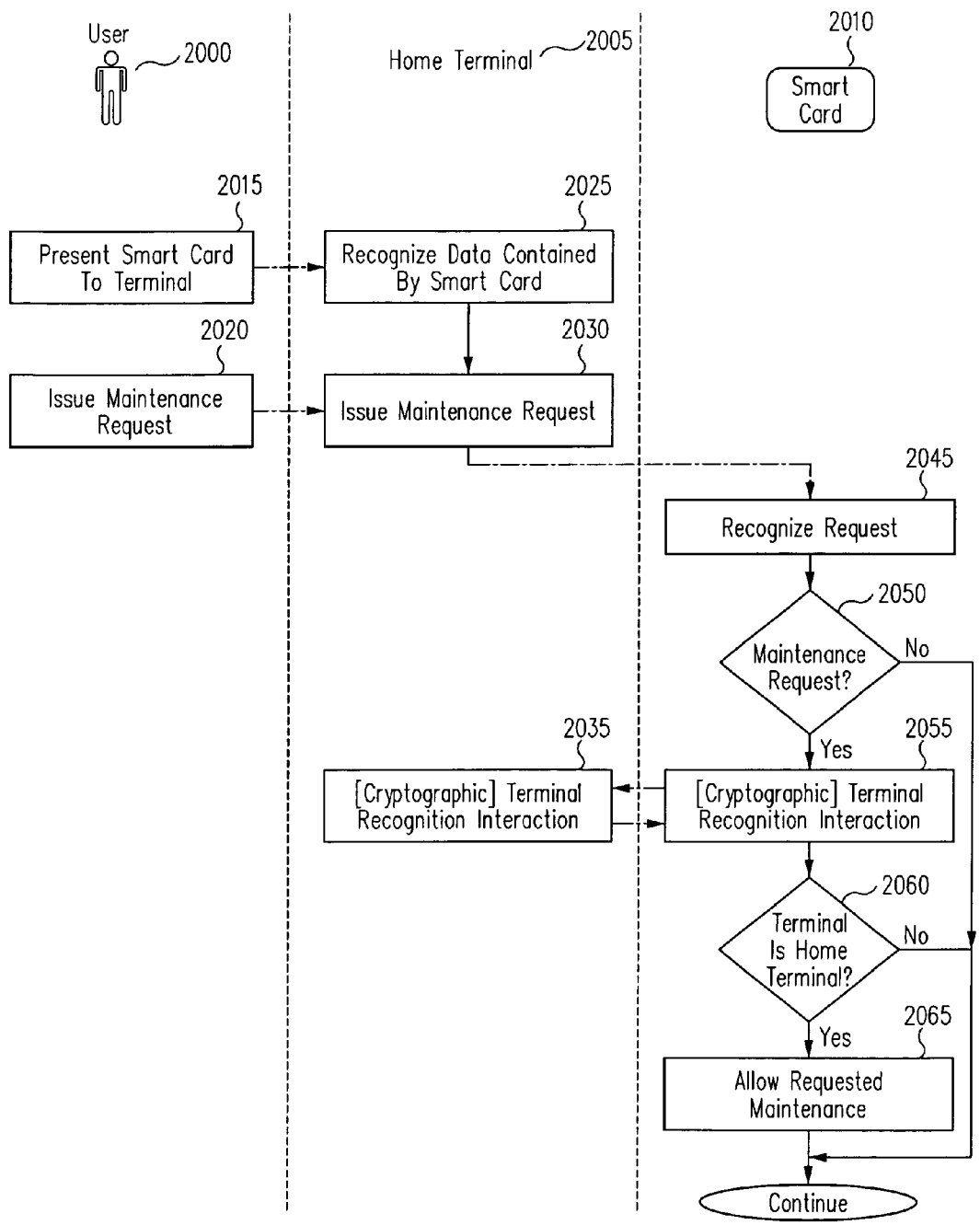
FIG. 20 is a flow diagram that illustrates a method for maintaining user data stored on a smart card where operations between the smart card and a terminal follow a cryptographic protocol in accordance with one embodiment of the present invention.

FIGS. 18 to 20 illustrate embodiments of the use and maintenance of user data stored on a smart card. The embodiments illustrate several ways to increase the security of user data stored on a smart card by imposing additional constraints on environments for proper functioning of a password that controls maintenance of the user data.

In some embodiments of the present invention, an end-user designates one or more smart card reader-equipped computers as "home terminals." A home terminal describes a computer that persistently stores data pertaining to a smart card. The persistently stored data enables the performance of smart card data management functions, smart card data maintenance functions, or both.

In some embodiments of the present invention, a cryptographic protection mechanism is applied to recognize such a home terminal and to prevent unauthorized access to the personal data. A smart card then authenticates, in some embodiments, the one or more computers that are privileged to manage the personal data in the smart card, such as the PIN, addresses, phone numbers, preferences, and other information that needs to be managed and can change over time. The embodiments described below differ in security aspects and in complexity of implementation, and may be used to suit needs for various levels of security and simplicity.

Turning now to FIG. 18, a block diagram that provides an overview of relationships between embodiments of the present invention that maintain user data stored on a smart card is presented. Embodiments 1800 do not require a special relationship with a particular terminal to perform maintenance or use of data on a smart card using that terminal. These embodiments are described in detail below with reference to FIGS. 21 to 28.

Embodiments 1805, 1810, 1815, 1820, 1825, 1830, 1835, 1840, 1845 and 1850 require a special relationship with one or more terminals. Embodiments 1805 use a static identifier shared by one or more terminals and a smart card. These embodiments are described in detail below with reference to FIGS. 29 and 30.

Embodiments 1810 use a static key shared by one or more terminals and a smart card. These embodiments are described in detail below with reference to FIGS. 31 to 34.

Embodiments 1815 use a plurality of static identifiers shared by multiple terminals and a smart card. These embodiments are described in detail below with reference to FIGS. 35 and 36.

Embodiments 1820 use a dynamic identifier shared by one or more terminals and a smart card. These embodiments are described in detail below with reference to FIGS. 37 to 41.

Embodiments 1825 use a static identifier combined with a static key shared by one or more terminals and a smart card. These embodiments are described in detail below with reference to FIGS. 42 and 43.

Embodiments 1830 use a dynamic key shared by one or more terminals and a smart card. These embodiments are described in detail below with reference to FIGS. 44 and 46.

Still referring to FIG. 18, embodiments 1835 use a plurality of dynamic identifiers shared by multiple terminals and a smart card. These embodiments are described in detail below with reference to FIGS. 47 and 48.

Embodiments 1840 use a plurality of static identifiers combined with a plurality of static keys shared by multiple terminals and a smart card. These embodiments are described in detail below with reference to FIGS. 49 and 50.

Embodiments 1845 use a dynamic identifier and an encrypted static key shared by one or more terminals and a smart card. These embodiments are described in detail below with reference to FIGS. 51 and 52.

Embodiments 1850 use a plurality of dynamic identifiers, an encrypted static key and a second passphrase shared by one or more terminals and a smart card. These embodiments are described in detail below with reference to FIGS. 53 and 54.

FIG. 19 illustrates a process for designating a new home terminal, and FIG. 20 illustrates at a high level maintaining user data stored on a smart card. The embodiments illustrated in FIGS. 21 to 54 presuppose the establishment of a home terminal relationship as illustrated in FIG. 19. FIG. 20 provides a high level illustration of the embodiments in FIGS. 21 to 54.

Turning now to FIG. 19, a flow diagram illustrates a method for designating a terminal as a home terminal in accordance with one embodiment of the present invention. The processes illustrated in FIG. 19 may be implemented using hardware, software, firmware, or a combination thereof.

In process 1915, an end-user 1900 presents a smart card 1910 to a terminal 1905. In process 1925, terminal 1905 recognizes data contained on smart card 1910. In process 1930, home terminal 1905 issues a query to end-user 1900 whether terminal 1905 should be made a home terminal. In response to the query, end-user 1900 indicates to terminal 1905 that terminal 1905 should be made a home terminal in process 1920. In response to the user's indication in process 1920, terminal 1905 instructs smart card 1910 to make terminal 1905 a home terminal in process 1935. In process 1945, smart card 1910 responds to the instructions from process 1935 by providing terminal 1905 data for establishing a home terminal relationship between terminal 1905 and smart card 1910, such as a static identifier, a static identifier from a list, a key, a dynamic identifier, a dynamic identifier from a list, or a combination thereof. In process 1940, terminal 1905 receives the data and stores the received data at a location accessible to terminal 1905, i.e. on terminal 1905 or on a network device, making the terminal 1905 a home terminal with respect to smart card 1910.

Although FIG. 19 illustrates making a single terminal a home terminal, an end-user may designate multiple terminals 1905 as home terminals for a particular smart card 1910. According to another embodiment of the present invention, an end-user is restricted to designating a predetermined number of terminals as home terminals for a particular smart card 1910.

Turning now to FIG. 20, a flow diagram illustrates a method for maintaining user data stored on a smart card 2010 where operations between smart card 2010 and a terminal 2005 follow a cryptographic protocol in accordance with one embodiment of the present invention is presented. The processes illustrated in FIG. 20 may be implemented using hardware, software, firmware, or a combination thereof.

In process 2015, an end-user 2000 presents a smart card 2010 to a terminal 2005. In process 2025, terminal 2005 recognizes data contained on smart card 2010. In process 2020, end-user 2000 issues a maintenance request. In process 2030, terminal 2005 receives the maintenance request from end-user 2000 and forwards a maintenance request to smart card 2010.

In process 2045, smart card 2010 recognizes a request has been received. In check process 2050, smart card 2010 determines whether the received request includes a maintenance request. If the received request includes a maintenance request, process 2055 initiates a terminal recognition interaction between smart card 2010 and terminal 2005 that may involve a cryptographic authentication mechanism. In check process 2060, smart card 2010 determines whether terminal 2005 is a home terminal. If terminal 2005 is a home terminal, the requested maintenance is allowed in process 2065.

According to another embodiment of the present invention, a PIN challenge-response protocol is used to determine whether end-user 2000 is authorized to perform requested maintenance. In response to receiving a maintenance request, smart card 2010 issues a PIN challenge to end-user 2000 via terminal 2005. According to one embodiment of the present invention, the PIN challenge includes a picture PIN. Picture PINs are described in U.S. Patent Application Publication No. 2003/01773366 A1 entitled "Method and Apparatus for Dynamic Personal Identification Number Management", of Eduard K. de Jong, filed Mar. 18, 2002 and incorporated herein by reference to demonstrate the level of skill in the art with respect to Picture PINs.

Figure 23:
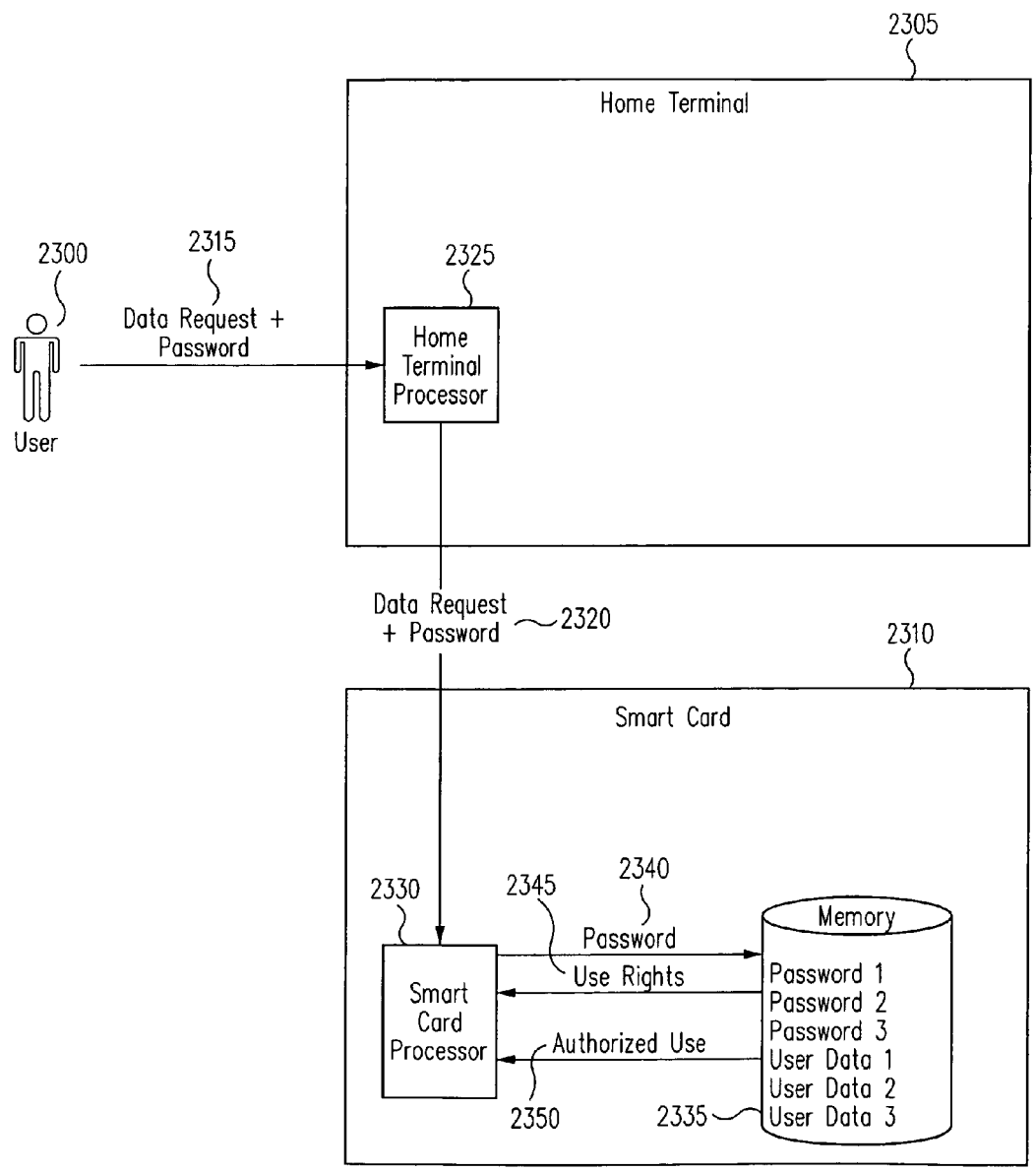
FIG. 23 is a flow diagram that illustrates a method for using user data stored on a smart card where different uses of the user data are controlled by different personal identification number (PINs), in accordance with one embodiment of the present invention.
Figure 24:
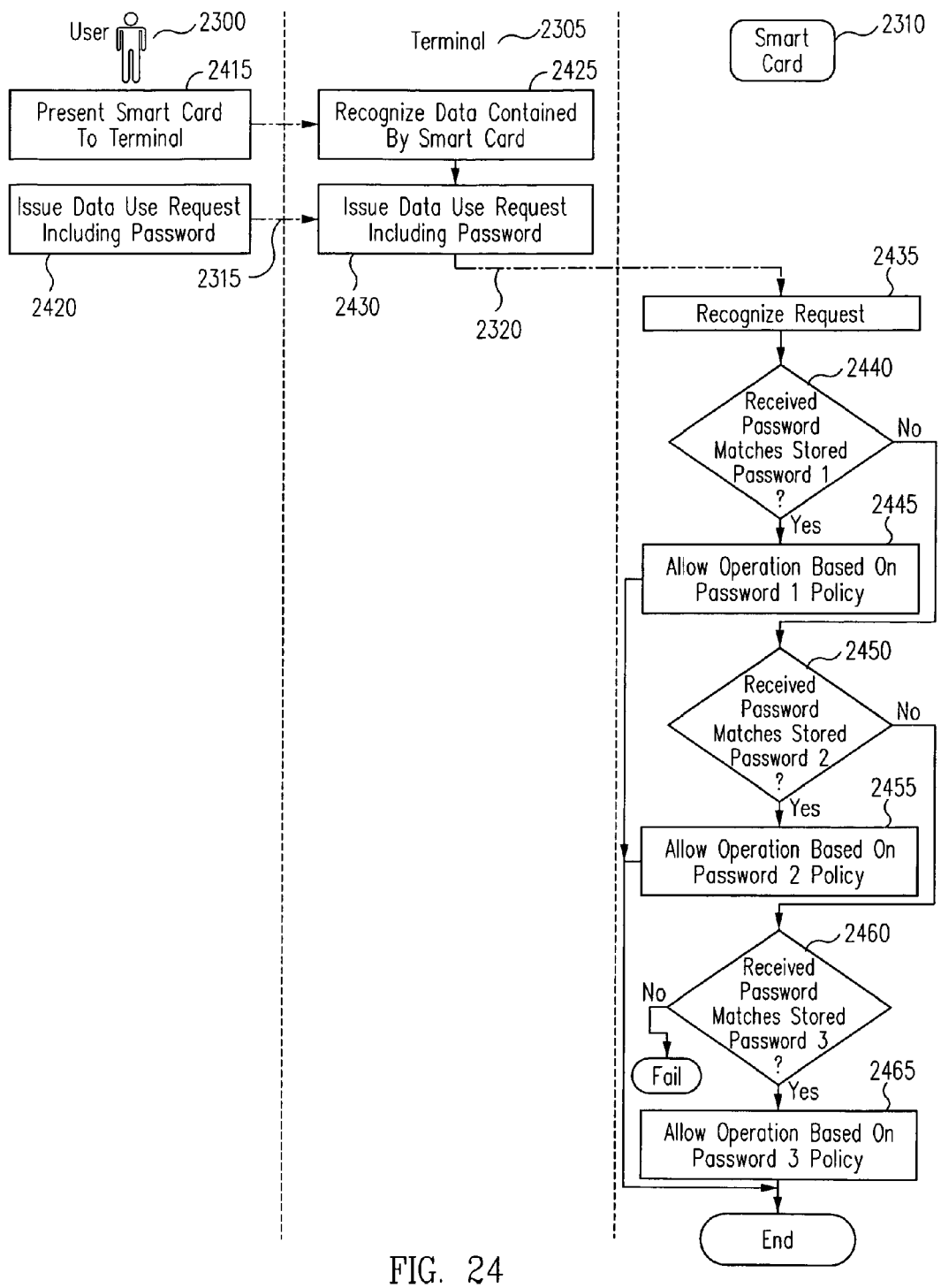
FIG. 24 is a flow diagram that illustrates a method for using user data stored on a smart card where different uses of the user data are controlled by different personal identification number (PINs), in accordance with one embodiment of the present invention.
Figure 25:
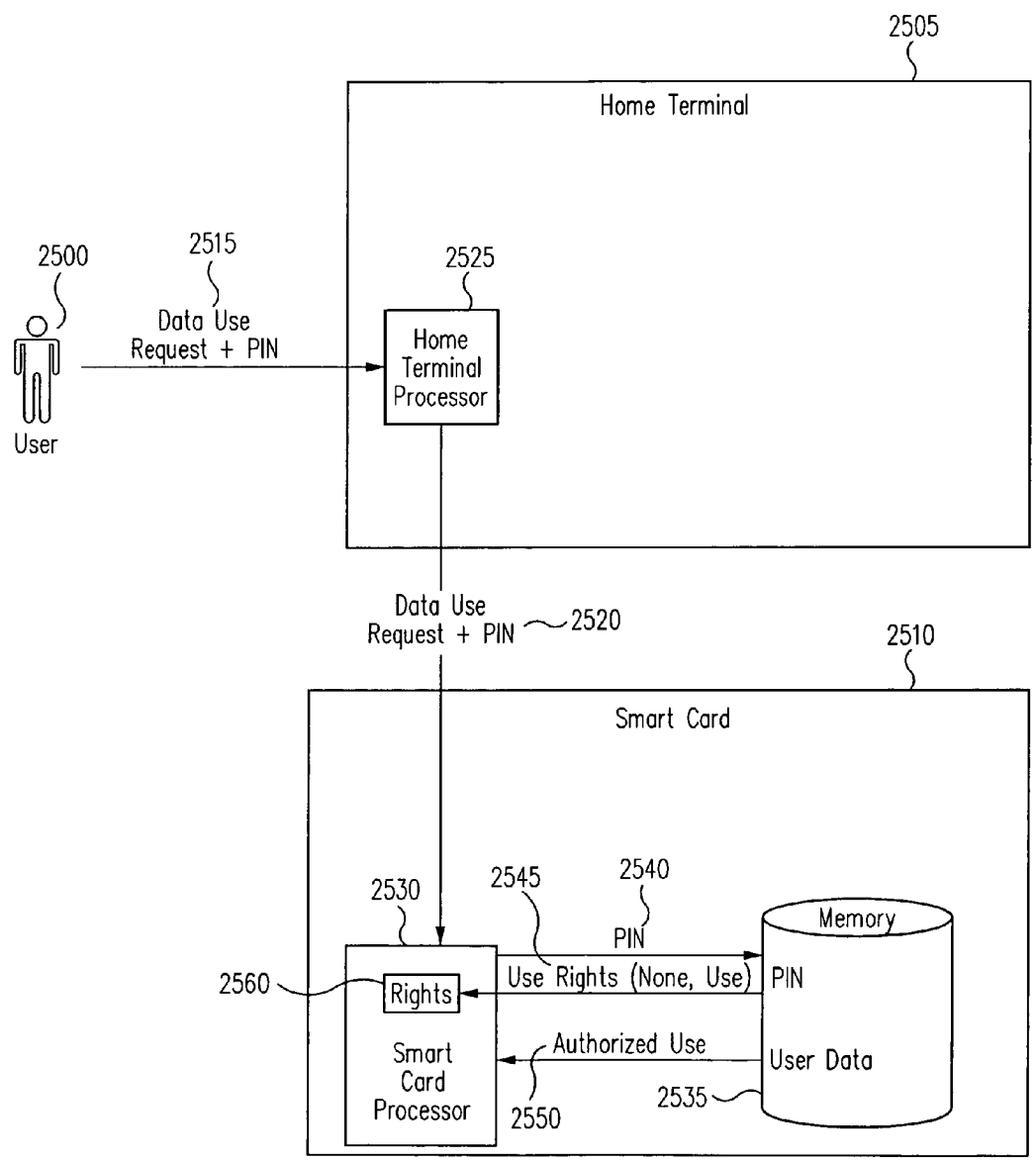
FIG. 25 is a block diagram that illustrates an apparatus for using user data stored on a smart card where use of the user data is controlled by a session personal identification number (PIN), in accordance with one embodiment of the present invention.
Figure 26:
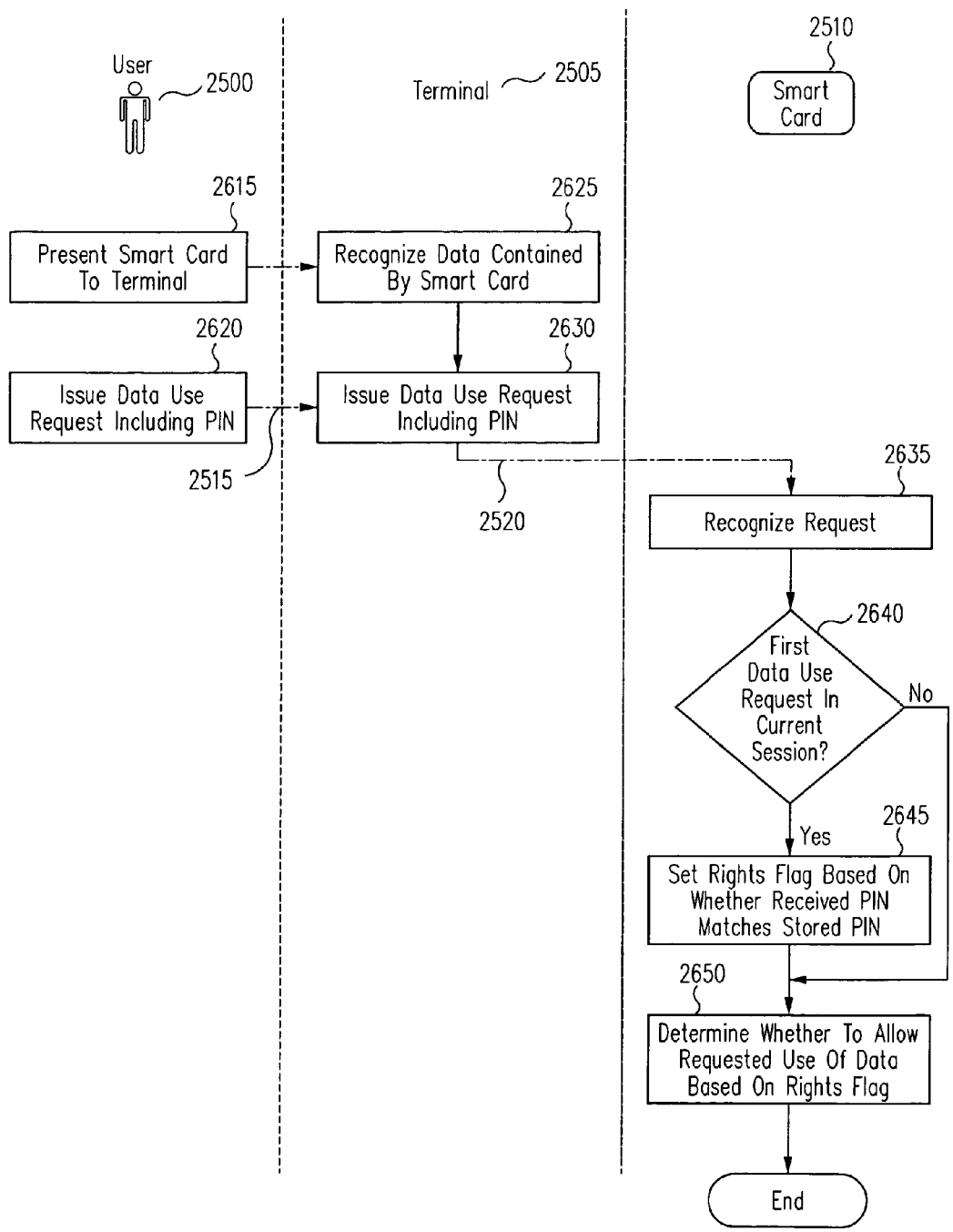
FIG. 26 is a flow diagram that illustrates a method for using user data stored on a smart card where use of the user data is controlled by a session personal identification number (PIN), in accordance with one embodiment of the present invention.
Figure 27:
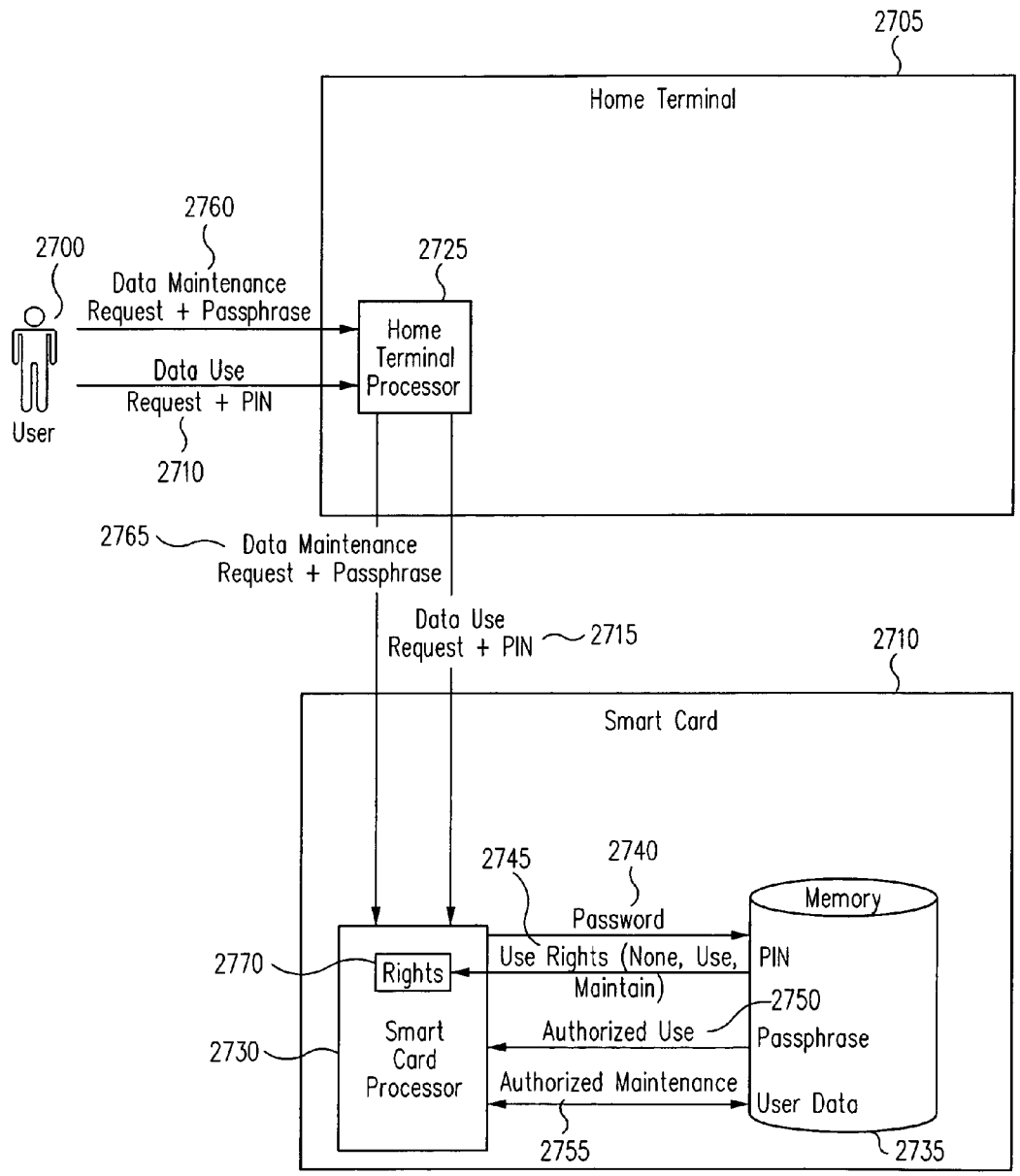
FIG. 27 is a block diagram that illustrates an apparatus for maintaining user data stored on a smart card where maintenance of the user data is controlled by a passphrase and where use of the user data is controlled by a personal identification number (PIN), in accordance with one embodiment of the present invention.
Figure 28:
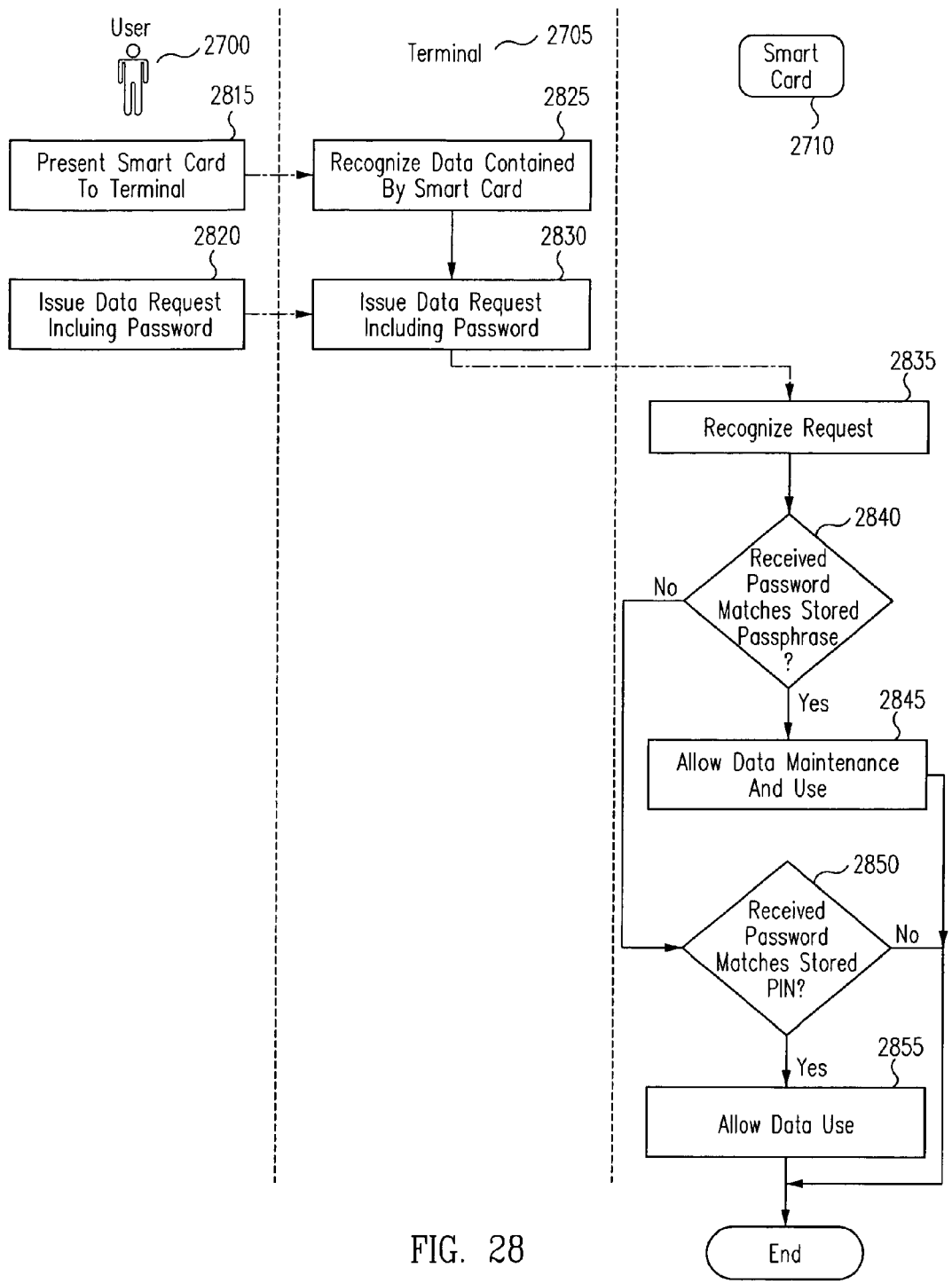
FIG. 28 is a flow diagram that illustrates a method for maintaining user data stored on a smart card where maintenance of the user data is controlled by a passphrase and where use of the user data is controlled by a personal identification number (PIN), in accordance with one embodiment of the present invention.

FIGS. 21 to 28 illustrate maintaining user data stored on a smart card without requiring a special relationship between the smart card and a particular terminal beyond designation of the terminal as a home terminal, in accordance with embodiments of the present invention. In more detail, FIGS. 21 to 24 illustrate using a PIN to control use of the user data. Use of the user data is defined as use of the accessed data. FIGS. 25 and 26 illustrate using a session PIN to control use of the user data. FIGS. 27 and 28 illustrate using a passphrase to control maintenance of the user data and using a PIN to control use of the user data. Maintenance of user data is defined as both read use and writing new user data.

Figure 21:
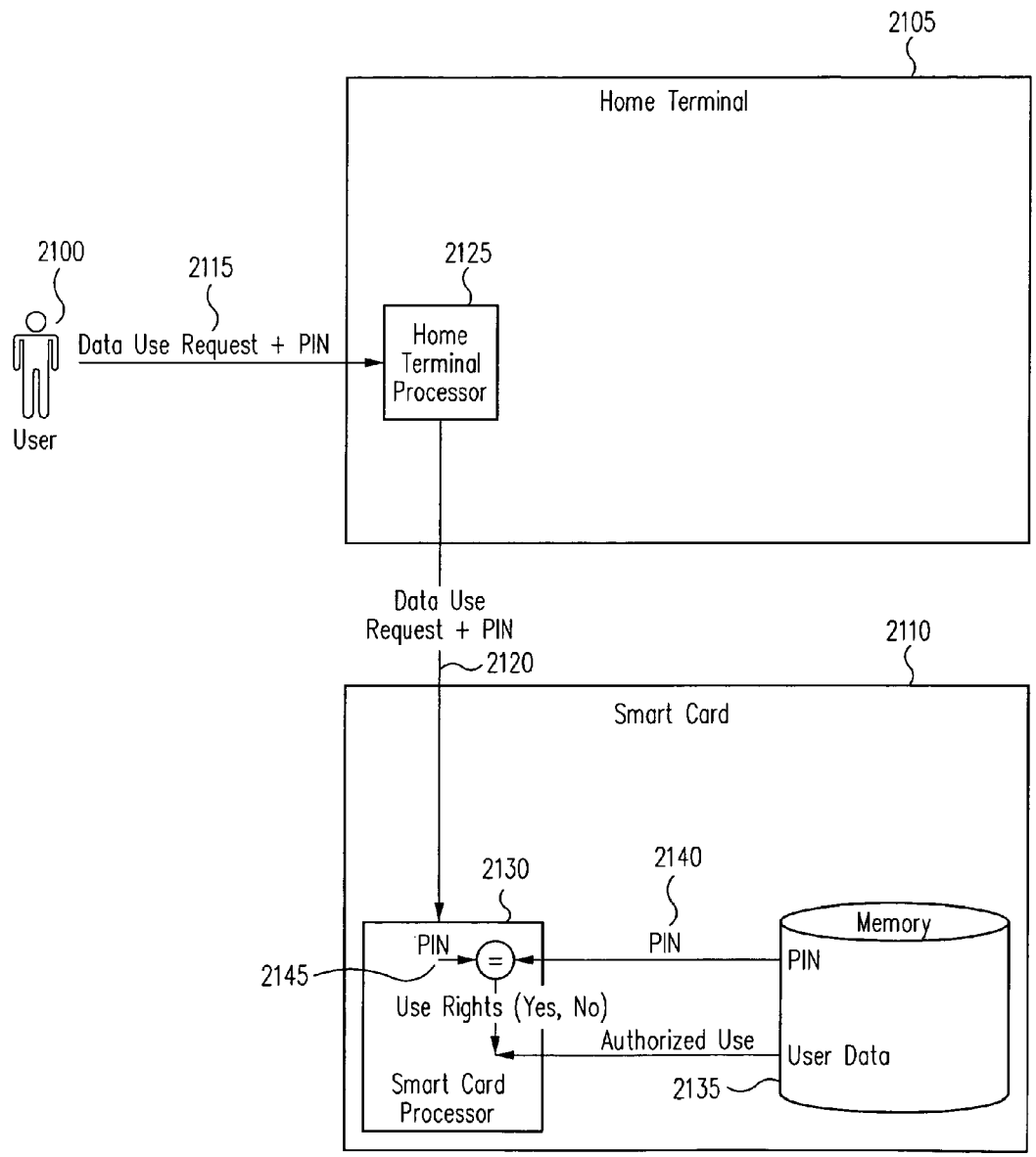
FIG. 21 is a block diagram that illustrates an apparatus for using user data stored on a smart card where use of the user data is controlled by a personal identification number (PIN), in accordance with one embodiment of the present invention.

Turning now to FIG. 21, a block diagram illustrates an apparatus for using user data stored on a smart card 2110 where use of the user data is controlled by a personal identification number (PIN), in accordance with one embodiment of the present invention. As shown in FIG. 21, a home terminal 2105 includes home terminal processor 2125 adapted to receive a data use request 2115 from user 2100. Data use request 2115 may include a PIN entered by end-user 2100. Alternatively, home terminal 2105 may communicate with end-user 2100 to obtain the PIN. Home terminal processor 2125 is further adapted to forward a data use request 2120 including the PIN to a smart card 2110 in the same communication.

Still referring to FIG. 21, smart card 2110 includes a smart card processor 2130 and a memory 2135. Memory 2135 stores data including a PIN 2140 and user data. Smart card processor 2130 is adapted to recognize data use request 2120 including the PIN from home terminal 2105 and to determine whether received PIN 2145 matches PIN 2140 retrieved from memory 2135. Smart card processor 2130 is further adapted to allow the requested use of the data if received PIN 2145 matches stored PIN 2140. The authorized use of user data 2135 gives the user read-only access to data 2135.

While in this embodiment, the PIN comparison is shown as performed by processor 2130, in another embodiment, received PIN 2145 is used to access a memory that stores at least one PIN and access rights associated with PIN 2140. If received PIN 2145 matches stored PIN 2140, the access rights associated with that PIN are returned from memory 2135 and otherwise a no access is returned from memory 2135. Memory structures for implementing this functionality are known to those of skill in the art.

According to one embodiment of the present invention, a PIN is used in a challenge-response protocol initiated by smart card 2120. According to another embodiment of the present invention, a PIN includes a picture PIN. Picture PINs are described in U.S. Patent Application Publication No. 2003/0177366 A1 entitled "Method and Apparatus for Dynamic Personal Identification Number Management" of Eduard K. de Jong, filed Mar. 18, 2002, which is incorporated herein by reference to demonstrate the level of skill in the art with respect to picture PINs.

Figure 22:
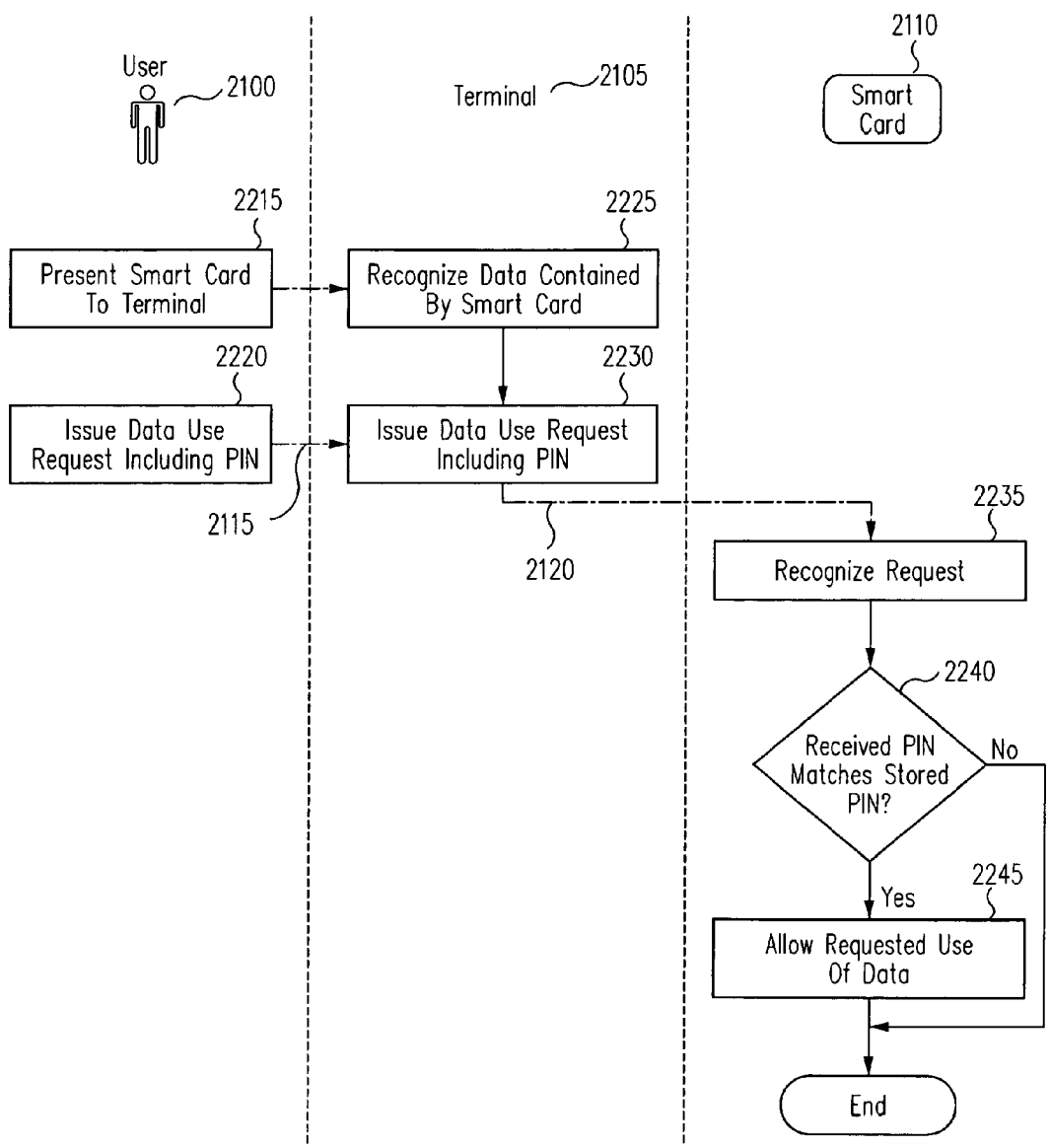
FIG. 22 is a flow diagram that illustrates a method for using user data stored on a smart card where use of the user data is controlled by a personal identification number (PIN), in accordance with one embodiment of the present invention.

Turning now to FIG. 22, a flow diagram illustrates a method for using user data stored on a smart card where use of the user data is controlled by a personal identification number (PIN), in accordance with one embodiment of the present invention. In one embodiment the process illustrated in FIG. 22 is implemented using the elements of FIG. 21. The processes illustrated in FIG. 22 may be implemented using hardware, software, firmware, or a combination thereof.

In process 2215, end-user 2100 presents smart card 2110 to terminal 2105. In process 2225, terminal 2105 recognizes data contained on smart card 2110. In process 2220, end-user 2100 issues data use request 2115 including a PIN.

According to one embodiment of the present invention, end-user 2100 explicitly requests use of the data. According to another embodiment of the present invention, end-user 2100 implicitly requests use of the data as a result of interaction with terminal 2105. By way of example, the interaction of end-user 2100 with the terminal 2105 may trigger a request for data on smart card 2110, which in turn triggers a request to end-user 2100 for a PIN that controls use of the data stored on smart card 2110.

In process 2230, terminal 2105 receives data use request 2115 including the PIN and issues data use request and PIN 2120 to smart card 2110 in the same communication. In process 2235, smart card 2110 recognizes a request was received. In check process 2240, a determination is made whether the received PIN matches a PIN stored on smart card 2110. If there is a match, the requested use of the data is allowed in process 2245.

FIGS. 23 and 24 illustrate using user data stored on a smart card where different uses of the user data are controlled by different passwords, in accordance with one embodiment of the present invention. Turning now to FIG. 23, a block diagram illustrates an apparatus for accessing user data stored on a smart card 2310 where access of the user data is controlled by a plurality of passwords, in accordance with one embodiment of the present invention.

As shown in FIG. 23, a home terminal 2305 includes home terminal processor 2325 adapted to receive a data request 2315 from end-user 2300. The data request includes a password entered by end-user 2300. Alternatively, home terminal 2305 may communicate with end-user 2300 to obtain the password. Home terminal processor 2325 is further adapted to forward a data request 2320 including a password to a smart card 2310 in the same communication.

Still referring to FIG. 23, smart card 2310 includes a smart card processor 2330 and a memory 2335. Memory 2335 stores data including a plurality of passwords Password 1, Password 2, Password 3 and a plurality of corresponding user data User Data 1, User Data 2, User Data 3. Smart card processor 2330 is adapted to recognize data request 2320 including the password from home terminal 2305 and to determine whether received password 2340 matches any one of the plurality of passwords stored in memory 2335.

If received password 2340 matches a stored password, use rights 2345 associated with the stored password are provided to smart card processor 2330 from memory 2335. Smart card processor 2330 is further adapted to allow the requested use of the data (read-only access to the data) via authorized use request 2350 if that use is within use rights 2345.

The use of three passwords and three sets of user data with respect to FIGS. 23 and 24 is illustrative only of a plurality of passwords and a plurality of sets of user data and is not intended to limit the invention to the specific embodiment illustrated. In view of this description, one of skill in the art can implement the invention for pluralities of any desired size.

Turning now to FIG. 24, a flow diagram illustrates a method for using user data stored on a smart card where different uses of the user data are controlled by different passwords, in accordance with one embodiment of the present invention. In one embodiment, the process illustrated in FIG. 24 is implemented using the elements of FIG. 23. The processes illustrated in FIG. 24 may be implemented using hardware, software, firmware, or a combination thereof.

In process 2415, end-user 2300 presents smart card 2310 to terminal 2305. In process 2425, terminal 2305 recognizes data contained on smart card 2310. In process 2420, end-user 2300 issues data use request 2315 including a password. Recall, in the context of the present invention, the term "password" is used collectively to describe a personal identification number (PIN) or a passphrase. Thus, this process is applicable for both requests for data maintenance and requests for use of the data.

According to one embodiment of the present invention, end-user 2300 explicitly issues the data request. According to another embodiment of the present invention, end-user 2300 implicitly issues the data request as a result of interaction with terminal 2305. By way of example, the interaction of end-user 2300 with the terminal 2305 may trigger a request for data on smart card 2310, which in turn triggers a request to end-user 2300 for a password that controls the data stored on smart card 2310.

In process 2430, terminal 2305 receives data use request 2315 including the password and issues data request and password 2320 to smart card 2310 in the same communication. In process 2435, smart card 2310 recognizes a data request was received. In processes 2440, 2450 and 2460, a determination is made whether the received password matches any one of the plurality of passwords stored on smart card 2310. If there is a match, the requested operation on the data is allowed in process 2445, 2455, 2465, respectively.

The sequential path for check processes 2440, 2450, and 2460 as well as the number of check processes is illustrative only and is not intended to limit the invention to this specific embodiment. In view of the disclosure, one of skill in the art can implement the process of checking an end-user supplied password with those stored in memory 2335 in a way most efficient for a particular smart card to identify the data use rights, if any associated with that password.

FIGS. 25 and 26 illustrate using a session PIN to control use of the user data in accordance with one embodiment of the present invention. Unlike the embodiments illustrated in FIGS. 21 to 24, the embodiments illustrated in FIGS. 25 and 26 use a card session rights flag cached on the smart card to indicate the use rights an end-user has to user data stored on the smart card. The card session rights flag is set based at least in part on the most recent data request that included a password, thus obviating the need to include a password with subsequent data requests in the same smart card session.

Turning now to FIG. 25, a block diagram illustrates an apparatus for using user data stored on a smart card where use of the user data is controlled by a session personal identification number (PIN), in accordance with one embodiment of the present invention is presented. As shown in FIG. 25, a home terminal 2505 includes a home terminal processor 2525 adapted to receive a data use request 2515 including a PIN entered by an end-user 2500 and to forward a data use request 2520 including the PIN to a smart card 2510.

Still referring to FIG. 25, smart card 2510 includes a smart card processor 2530 and a memory 2535. Memory 2535 is for storing data including a PIN and associated user data. Unlike the embodiment illustrated in FIG. 21, smart card processor 2530 includes one or more rights flags 2560 for indicating whether end-user 2500 has use rights with respect to the user data stored in memory 2535.

According to one embodiment of the present invention, the one or more rights flags 2560 are stored in a transient memory area, sometimes called an impersistent memory area, of smart card 2510. Each of the one or more rights flags 2560 describes one or more rights end-user 2500 has, for the current session, to the user data stored in memory 2535.

Smart card processor 2530 is adapted to recognize data use request 2520 including the PIN from home terminal 2505, and is adapted to determine whether data use request 2520 is a first data use request received in the current session. Smart card processor 2530 is further adapted to assert rights flag 2560 based at least in part on whether received PIN 2540 matches the PIN stored in memory 2535. More specifically, received PIN 2540 is used to retrieve use rights 2545 from memory 2535. Use rights 2545 are associated with the stored PIN in memory 2535 that matches received PIN 2540. Upon receipt of use rights 2545, processor 2530 configures session rights flag 2560 to represent use rights 2545. For each subsequent data request that does include a password, processor 2530 references one or more rights flag 2560 to determine whether the data request should be allowed.

According to one embodiment of the present invention, a PIN is used in a challenge-response protocol initiated by a smart card. According to another embodiment of the present invention, a PIN includes a picture PIN.

Turning now to FIG. 26, a flow diagram illustrates a method for using user data stored on a smart card where use of the user data is controlled by a session personal identification number (PIN), in accordance with one embodiment of the present invention is presented. In one embodiment, the process illustrated in FIG. 26 is implemented using the elements of FIG. 25. The processes illustrated in FIG. 26 may be implemented using hardware, software, firmware, or a combination thereof.

The process of FIG. 26 is similar to the process of FIG. 22, except the embodiment illustrated in FIG. 26 configures a rights flag, sometimes called a session rights flag, based on whether a received PIN matches a stored PIN, if the current data use request is the first such request in the current session. In process 2615, end-user 2500 presents smart card 2510 to terminal 2505. In process 2625, terminal 2505 recognizes data contained on smart card 2510. In process 2620, end-user 2500 issues a data use request 2515 including a PIN. In process 2630, terminal 2505 receives data use request 2515, and issues data use request 2520 to smart card 2510.

According to one embodiment of the present invention, end-user 2500 explicitly requests use of the data. According to another embodiment of the present invention, end-user 2500 implicitly requests use of the data as a result of interaction with terminal 2605. By way of example, the interaction of end-user 2500 with terminal 2505 may trigger a request for data on smart card 2510, which in turn triggers a request to end-user 2500 for a PIN that controls the data stored on smart card 2510.

In process 2635, smart card 2510 recognizes that a data use request has been received. In check process 2640, a determination is made whether the data use request received is a first data use request received in a current session. If data use request is the first data use request received in the current session, process 2645 provides received PIN 2540 to memory 2535, which in response returns use rights 2545 that is associated with received PIN 2645. If use rights 2545 is other than none, rights flag 2560 is configured in process 2645 to correspond to those rights. In process 2650, a determination whether to allow the requested use of the data is based at least in part on the state of rights flag 2560. If rights flag 2560 is asserted, authorized use 2550 is allowed with respect to the requested user data stored in memory 2535.

As mentioned above, FIGS. 27 and 28 illustrate using a passphrase to control maintenance of the user data and using a PIN to control use of the user data. Anyplace where an end-user enters a passphrase is considered a home terminal in this embodiment.

FIGS. 27 and 28 are similar to FIGS. 25 and 26, except that embodiments illustrated in FIGS. 27 and 28 use a card session rights flag cached on the smart card to indicate both the use and maintenance rights an end-user has to user data stored on the smart card. The card session rights flag is configured based at least in part on the most recent data request that included a password, thus obviating the need to include a password with subsequent data requests in the same smart card session.

Turning now to FIG. 27, a block diagram illustrates an apparatus for maintaining user data stored on a smart card where maintenance of the user data is controlled by a passphrase and where use of the user data is controlled by a personal identification number (PIN), in accordance with one embodiment of the present invention. As shown in FIG. 27, a home terminal 2705 includes a home terminal processor 2725 adapted to receive a data request 2710, 2760 including a password and to forward the data request 2710, 2760 as data request 2715, 2765 including a password to a smart card 2710. More specifically, home terminal processor 2725 is adapted to: (1) receive a data request 2710 including a PIN and to forward data request 2710 as data request 2715 including the PIN to smart card 2710; and (2) receive a data request 2760 including a password and to forward data request 2760 as data request 2765 including the password to smart card 2710.

Still referring to FIG. 27, smart card 2710 includes a smart card processor 2730 and a memory 2735. Memory 2735 is for storing data including a PIN, a passphrase, and user data. According to one embodiment of the present invention, smart card processor 2730 includes one or more rights flags 2770 for indicating whether end-user 2700 has, in the current session, use rights with respect to the user data stored in memory 2735. In this example, one rights flag is shown and additional rights flags are indicated by the shading behind this rights flag.

According to one embodiment of the present invention, one or more rights flags 2770 are stored in a transient memory area, sometimes called an impersistent memory area. Each of the one or more rights flags 2770 describes one or more rights end-user 2700 has, for the current session, to the user data stored in memory 2535.

Smart card processor 2730 is adapted to recognize data request 2715, 2760 including a password from home terminal 2705 and to determine whether the received password matches a password stored on smart card 2710. Unlike the embodiment illustrated in FIG. 25, smart card processor 2730 is further adapted to allow data maintenance and use if the received password matches the passphrase stored on smart card 2710. Smart card processor 2730 is further adapted to allow the requested use of the data if the received password matches a PIN stored in memory 2735.

According to one embodiment of the present invention, smart card processor 2730 includes one or more rights flag 2770 for indicating whether end-user 2700 has maintenance rights or use rights with respect to user data stored in memory 2735. Each rights flag in one or more rights flags 2770 is set the first time a data request including a password is received in a session for an application and that password is associated with rights for data stored in memory 2735. For subsequent data requests that do not include a password, processor 2730 references one or more rights flag 2770 to determine whether the data request should be allowed.

According to one embodiment of the present invention, a PIN is used in a challenge-response protocol initiated by a smart card. According to another embodiment of the present invention, a password includes a picture PIN.

Turning now to FIG. 28, a flow diagram illustrates a method for maintaining user data stored on a smart card where maintenance of the user data is controlled by a passphrase and where use of the user data is controlled by a personal identification number (PIN), in accordance with one embodiment of the present invention.

Figure 29:
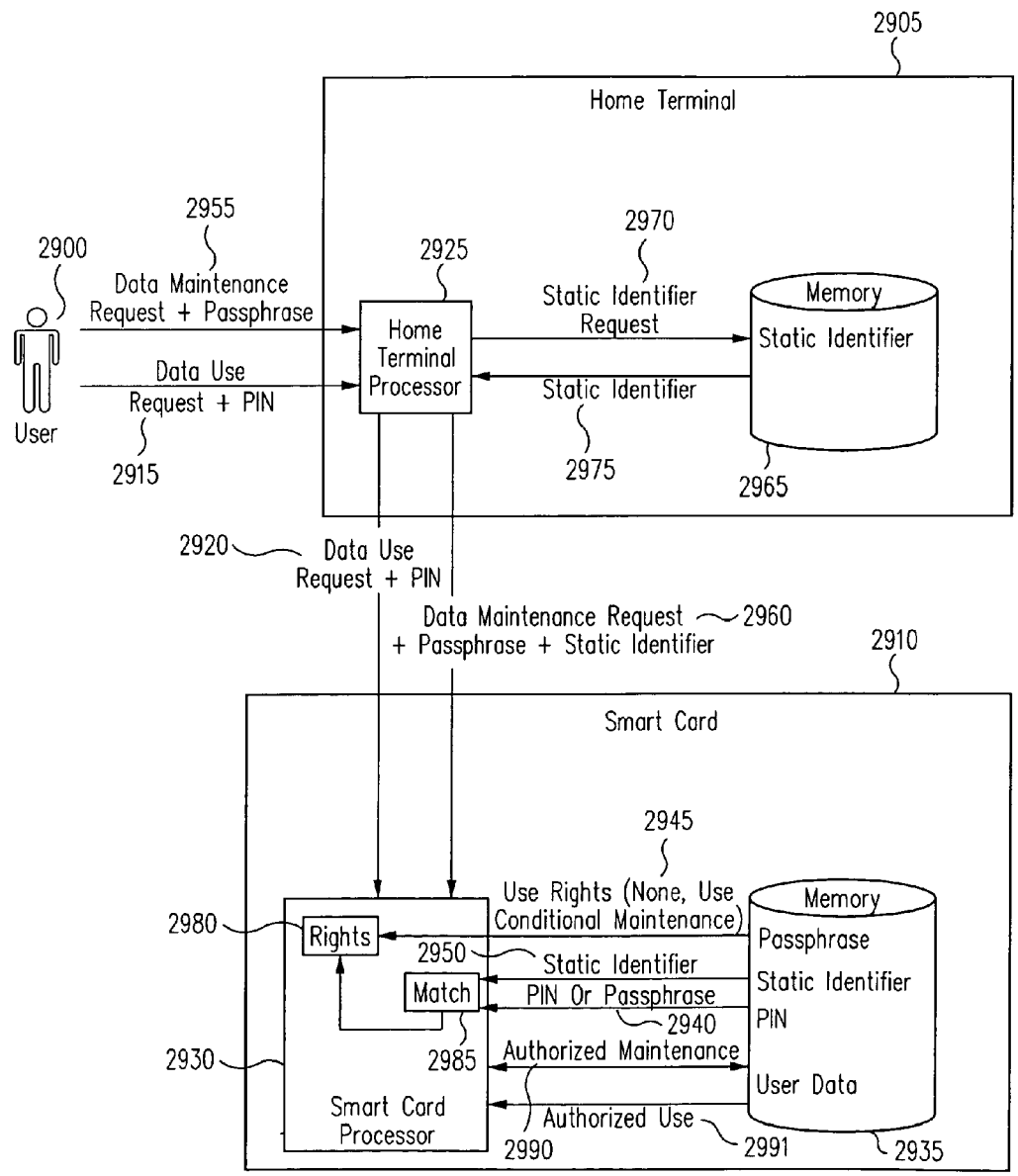
FIG. 29 is a block diagram that illustrates an apparatus for maintaining user data stored on a smart card where maintenance of the user data is controlled by a passphrase and a static identifier, and where use of the user data is controlled by a personal identification number (PIN), in accordance with one embodiment of the present invention.

In one embodiment the process illustrated in FIG. 29 is implemented using the elements of FIG. 27. The processes illustrated in FIG. 28 may be implemented using hardware, software, firmware, or a combination thereof. FIG. 28 differs from FIG. 26 in that in FIG. 28, smart card 2710 checks a received password against both a stored passphrase and against a stored PIN to determine whether to allow both data maintenance and use, just data use, or neither.

Referring to FIG. 28, in process 2815, end-user 2700 presents smart card 2710 to terminal 2705 to initiate a session. In process 2825, terminal 2705 recognizes data contained on smart card 2710. In process 2820, end-user 2700 issues a data use request including a password.

According to one embodiment of the present invention, end-user 2700 explicitly requests use or maintenance of the data. According to another embodiment of the present invention, end-user 2700 implicitly requests use or maintenance of the data as a result of interaction with terminal 2705. By way of example, the interaction of end-user 2700 with terminal 2705 may trigger a request for use or maintenance of data on smart card 2710, which in turn triggers a request to end-user 2700 for a PIN or passphrase that controls the data stored on smart card 2710.

In process 2830, terminal 2705 receives the data use request, and issues a data request to smart card 2710. In process 2835, smart card 2710 recognizes the data request sent from process 2830.

In check process 2840, a determination is made whether received password 2740 matches a passphrase stored on smart card 2710, e.g., received password 2740 is sent to memory 2735. When received password 2740 matches a passphrase stored on smart card 2710 use rights 2745 associated with that passphrase in memory 2735 are supplied to processor 2730. The use rights indicate that data maintenance and use is allowed in this embodiment. Processor 2770 optionally configures a rights flag in one or more rights flags 2770 when data maintenance is allowed. In process 2845, authorized maintenance 2755 of the data is allowed. If the received password does not match a passphrase stored on smart card 2710, processing transfers from check process 2840 to check process 2850.

Check process 2850 determines whether received password 2740 matches a PIN stored on smart card 2710. If the received PIN matches the PIN stored on smart card 2710, use rights 2745 indicate use only to processor 2730. Optionally, processor 2730 configures a rights flag for use only. In process 2855, authorized use 2750 of the data is allowed.

Figure 30:
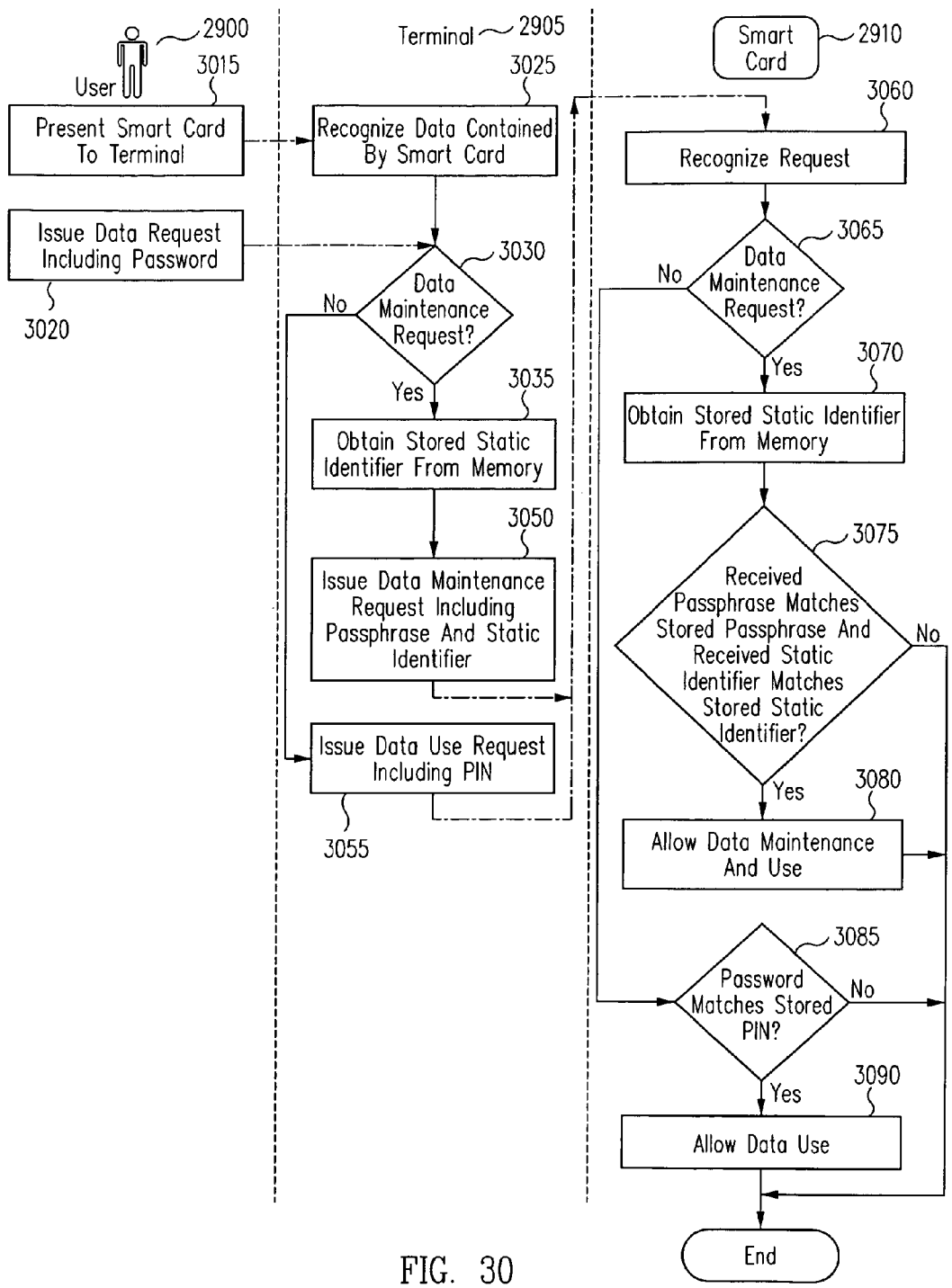
FIG. 30 is a flow diagram that illustrates a method for maintaining user data stored on a smart card where maintenance of the user data is controlled by a passphrase and a static identifier, and where use of the user data is controlled by a personal identification number (PIN), in accordance with one embodiment of the present invention.

FIGS. 29 and 30 illustrate using a static identifier shared by one or more terminals and a smart card to maintain user data stored on a smart card, in accordance with embodiments of the present invention. FIGS. 29 and 30 differ from FIGS. 21 to 28 in that the home terminal of FIGS. 29 and 30 maintains additional information that is separate from information entered by the user, but is included with a data maintenance request sent to the smart card. The additional information indicates to the smart card whether the data maintenance request originates from a recognized home terminal and so provides an additional level of security, because only data maintenance requests originating from a home terminal are permitted access to the data by the smart card.

Turning now to FIG. 29, a block diagram illustrates an apparatus for maintaining user data stored on a smart card where maintenance of the user data is controlled by a passphrase and a static identifier, and where use of the user data is controlled by a personal identification number (PIN), in accordance with one embodiment of the present invention. As shown in FIG. 29, a home terminal 2905 includes home terminal processor 2925 and a memory 2965 for storing a static identifier. Home terminal processor 2925 is adapted to (i) receive a data request including a password, e.g., data maintenance request 2955 including a passphrase or data use request 2915 including a PIN; (ii) determine a memory 2965 for the static identifier and retrieve static identifier 2975 if the data request includes data maintenance request 2955; and (iii) to forward a data request to a smart card 2910, e.g., data maintenance request 2960 including the passphrase and static identifier 2975, or data use request 2920 including the PIN.

Still referring to FIG. 29, smart card 2910 includes a smart card processor 2930 and a memory 2935. Memory 2935 stores data including a PIN, a passphrase, a static identifier, and user data. According to one embodiment of the present invention, smart card processor 2930 includes one or more rights flags 2980 for indicating whether end-user 2900 has use rights with respect to user data stored in memory 2935. The use of one or more rights flags 2980 is optional.

According to one embodiment of the present invention, the one or more rights flags 2980 are stored in a transient memory area. Each of one or more rights flags 2980 describes one or more rights end-user 2900 has to user data stored in memory 2935.

Smart card processor 2930 is adapted to recognize a data request including a password, either request 2920 or request 2960, received from home terminal 2905. Match unit 2985 of smart card processor 2930 is adapted to determine whether the received password matches a passphrase 2940 stored in memory 2935, and whether a received static identifier matches a static identifier 2950 stored in memory 2935 of smart card 2910. Smart card processor 2930 is further adapted to allow data maintenance 2990 if the received password matches stored passphrase 2940 and if the received static identifier matches stored static identifier 2950. Smart card processor 2930 is further adapted to allow requested use 2991 of the data if the received password matches a PIN 2940 stored in memory 2935 of smart card 2910. In each of these instances, the data request is verified.

According to one embodiment of the present invention, as indicated above, smart card processor 2930 includes one or more rights flags 2980 for indicating whether end-user 2900 has maintenance rights or use rights with respect to user data stored in memory 2935. One of one or more rights flags 2980 is set the first time a data request including a password is received in a session for an application and at least that password is associated with rights for data stored in memory 2935. Note that for maintenance, the static identifier must also match for configuration of a rights flag. For each subsequent data request that does not include a password, processor 2930 references one or more rights flag 2980 to determine whether the data request should be allowed.

Recall that the one or more rights flags are stored in a transient memory. Thus, in one embodiment, a session extends from when the rights flag is configured, e.g., asserted, until power is removed from the transient memory. Alternatively, a session timer can be used to limit extent of the session to a predetermined time interval after a last predetermined event, such as configuration of the rights flag or user activity. While a session is defined with respect to this embodiment, the definition is applicable to any embodiment which stores the one or more rights flags in a transient memory.

According to one embodiment of the present invention, a PIN is used in a challenge-response protocol initiated by a smart card. According to another embodiment of the present invention, a password includes a picture PIN.

As shown in FIG. 29, home terminal 2905 includes memory 2965. According to another embodiment of the present invention, memory 2965 resides on a remote network device (not shown in FIG. 29) coupled to home terminal 2905. A cryptographic protocol between home terminal 2905 and the remote network device may be used to protect integrity of the data stored in memory 2965.

Turning now to FIG. 30, a flow diagram illustrates a method for maintaining user data stored on a smart card where maintenance of the user data is controlled by a passphrase and a static identifier, and where use of the user data is controlled by a personal identification number (PIN), in accordance with one embodiment of the present invention. In one embodiment, the process illustrated in FIG. 30 is implemented using the elements of FIG. 29. The processes illustrated in FIG. 30 may be implemented using hardware, software, firmware, or a combination thereof.

In process 3015, end-user 2900 presents a smart card 2910 to terminal 2905. In process 3025, terminal 2905 recognizes data contained on smart card 2910.

In process 3020, end-user 2900 issues a data request including a password, e.g., one of data maintenance request plus a passphrase 2955 and data use request and a PIN 2915, to terminal 2905. Terminal 2905 receives the data request in check process 3030, and determines whether the data request is a data maintenance request where the password includes a passphrase.

If the received data request is a data maintenance request, process 3035 on terminal 2905 obtains a stored static identifier from a memory 2965, e.g., issues static identifier request 2970 to memory 2965 and in response receives static identifier 2975. Process 3050 issues data maintenance request including the passphrase and static identifier 2960 to smart card 2910.

If check process 3030 determines that the received data request is not a data maintenance request, the data request is a data use request including a PIN and processing transfers to process 3055 on terminal 2905. Process 3055 issues data use request including the PIN 2920 to smart card 2910.

According to one embodiment of the present invention, end-user 2900 explicitly requests use or maintenance of the data. According to another embodiment of the present invention, end-user 2900 implicitly requests use or maintenance of the data as a result of interaction with terminal 2905. By way of example, the interaction of end-user 2900 with terminal 2905 may trigger a request for use or maintenance of data on smart card 2910, which in turn triggers a request to end-user 2900 for a PIN or passphrase that controls the data stored on smart card 2910.

Still referring to FIG. 30, in process 3060 smart card 2910 recognizes that a data request was received from terminal 2905. In check process 3065, smart card 2910 determines whether the received data request includes a data maintenance request with a passphrase and a static identifier or a data use request including a PIN.

If the received data request includes a data maintenance request with a passphrase and a static identifier, process 3070 retrieves static identifier 2950 from memory 2935 on smart card 2910. Check process 3075 determines whether the received passphrase matches stored passphrase 2940 retrieved from memory 2935 and whether retrieved static identifier 2950 matches the received static identifier. If both the passphrases and the static identifiers match, authenticated maintenance, check process 3075 transfers to allow data maintenance and use process 3080 and otherwise processing ends. Use and maintenance of the data 2990 is allowed by process 3080.

If check process 3065 determined that the data request does not include a data maintenance request, processing transfers to check process 3085. Check process 3085 determines whether the received password matches a PIN stored on smart card 2910. If the received password matches a PIN stored on smart card 2910, check process 3085 transfers to allow data use process 3090 and otherwise processing ends. Authorized use of the data 2991 is allowed in process 3090.

FIGS. 31 to 34 illustrate using an authenticated data maintenance request created using a static key shared by one or more terminals and a smart card to maintain user data stored on a smart card, in accordance with embodiments of the present invention. FIGS. 31 to 34 differ from FIGS. 29 and 30 in that embodiments illustrated in FIGS. 29 and 30, information from a home terminal is included with a data maintenance request sent to a smart card and the sent information is compared against corresponding information maintained by the smart card, whereas embodiments illustrated by FIGS. 31 to 34 use the information (cryptographic key) from the home terminal to authenticate a data maintenance request sent to the smart card, and the smart card verifies the received authenticated data maintenance request using its own cryptographic key.

Figure 31:
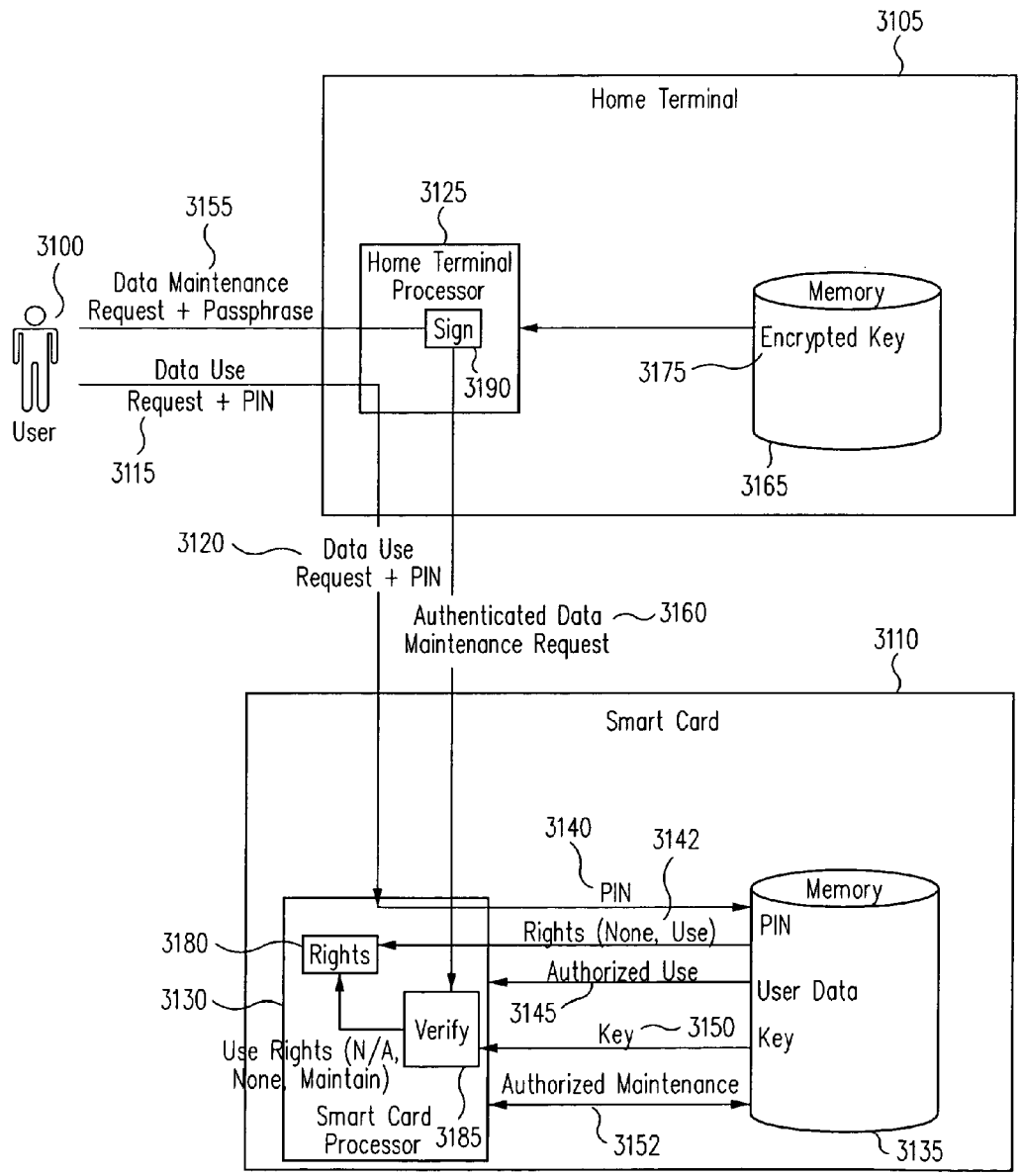
FIG. 31 is a block diagram that illustrates an apparatus for maintaining user data stored on a smart card where maintenance of the user data is controlled by an authenticated data maintenance request, and where use of the user data is controlled by a personal identification number (PIN), in accordance with one embodiment of the present invention.

Turning now to FIG. 31, a block diagram illustrates an apparatus for maintaining user data stored on a smart card where maintenance of the user data is controlled by an authenticated data maintenance request, and where use of the user data is controlled by a personal identification number (PIN), in accordance with one embodiment of the present invention. As shown in FIG. 31, a home terminal 3105 includes home terminal processor 3125 and a memory 3165 storing an encrypted key.

Home terminal processor 3125 is adapted to receive a data request including a password, e.g., data maintenance request 3155 including a passphrase or data use request 3115 including a PIN. If the data request includes data maintenance request 3155, home terminal processor 3125 is further adapted to determine a memory 3165 storing the encrypted key, use the passphrase to decrypt the encrypted key, use the key to authenticate the data maintenance request, and forward the authenticated data maintenance request 3160 to smart card 3110, as described more completely below. If the data request includes data use request 3115, home terminal processor 3125 is further adapted to forward a data use request 3120 including the PIN to smart card 3110.

Still referring to FIG. 31, smart card 3110 includes a smart card processor 3130 and a memory 3135. Memory 3135 stores data including a PIN, a key, and user data. According to one embodiment of the present invention, smart card processor 3130 includes one or more rights flags 3180 for indicating whether end-user 3100 has use rights with respect to the user data stored in memory 3135. For example, received PIN 3140 is used to retrieve use rights 3142 associated with PIN 3140 from memory 3135, and a rights flag is configured based on the use right, if the use rights are other than none.

According to one embodiment of the present invention, the one or more rights flags 3180 are stored in a transient memory area. The use of one or more rights flags 3180 is optional. Each of the one or more rights flags 3180 describes one or more rights end-user 3100 has to the user data stored in memory 3135.

Smart card processor 3130 is adapted to recognize the data request including a password, either request 3120 or request 3160, received from home terminal 3105. Verification unit 3185 of smart card processor 3130 is adapted to use the key in memory 3135, e.g., retrieve key 3150, to verify authenticated data maintenance request 3160 received from home terminal 3105. Smart card processor 3130 is further adapted to allow authorized data maintenance 3152 if the received authenticated data maintenance request 3160 is verified. Smart card processor 3130 is further adapted to allow requested use 3145 of the data if received PIN 3140 matches a PIN stored in memory 3135.

According to one embodiment of the present invention, as indicated above, smart card processor 3130 includes one or more rights flags 3180 for indicating whether end-user 3100 has maintenance rights or use rights with respect to user data stored in memory 3135. One of the one or more rights flag 3180 is configured the first time a data request including a password is received in a session for an application and that password is associated with rights for data stored in memory 3135. For subsequent data requests that do not include a password, processor 3130 references one or more rights flag 3180 to determine whether the data request should be allowed.

According to one embodiment of the present invention, a PIN is used in a challenge-response protocol initiated by a smart card. According to another embodiment of the present invention, a password includes a picture PIN.

As shown in FIG. 31, home terminal 3105 includes memory 3165. According to another embodiment of the present invention, memory 3165 resides on a remote network device (not shown in FIG. 31) coupled to processor 3125. A cryptographic protocol between home terminal 3105 and the remote network device may be used to protect integrity of the data stored in memory 3165.

Figure 32:
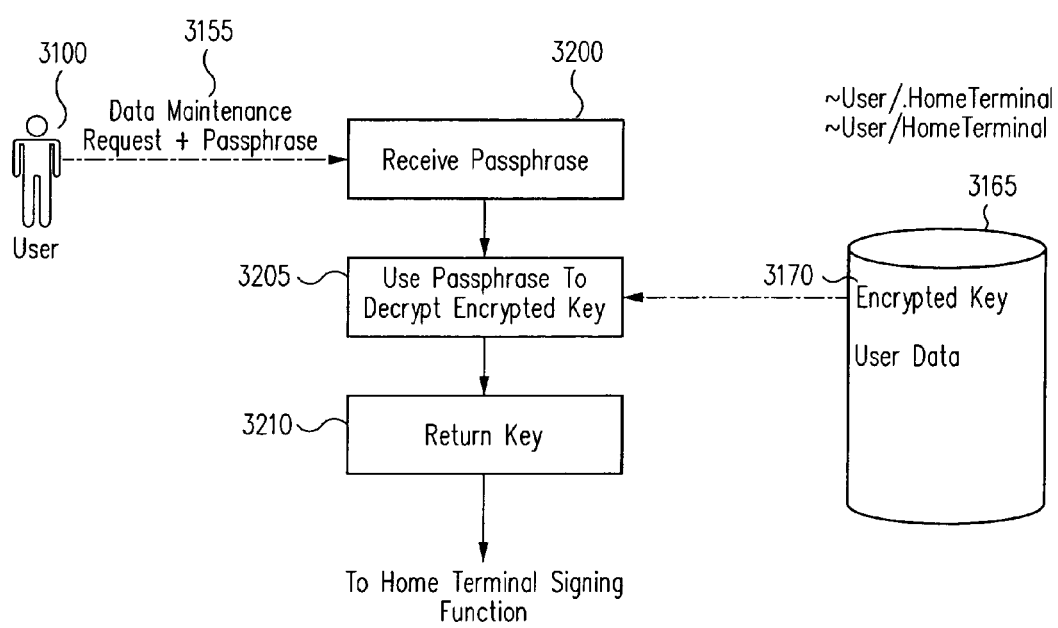
FIG. 32 is a flow diagram that illustrates a method for using a passphrase to decrypt an encrypted key to create a cryptographic key for use in authenticating a user data maintenance request in accordance with one embodiment of the present invention.

Turning now to FIG. 32, a flow diagram illustrates a method for using a passphrase to decrypt an encrypted key to create a cryptographic key for use in authenticating a user data maintenance request in accordance with one embodiment of the present invention. FIG. 32 provides more detail for processes 3440, 4340, 5040, 5240, and 5440 of FIGS. 34, 43, 50, 52, and 54, respectively. In one embodiment, the process illustrated in FIG. 32 is implemented using the elements of FIG. 31. The processes illustrated in FIG. 32 may be implemented using hardware, software, firmware, or a combination thereof.

In process 3200, a passphrase included in data maintenance request 3155 from end-user 3100 is received. In process 3205, an encrypted key stored in memory 3165 is retrieved. Received passphrase 3170 is used to decrypt the encrypted key. According to one embodiment of the present invention, a file on a home terminal references memory 3165. By way of example, as shown in FIG. 32, the file may be specified in a UNIX operating system environment as "~user/.HomeTerminal" or "~user/HomeTerminal", where "user" designates the name of the user, and "~user" indicates the user's home directory, as known to those skilled in the art. Those of ordinary skill in the art will recognize many other file specifications for use in the same or other operating system environments are possible. Many other file specifications are possible. In process 3210, the decrypted key is returned for use in authenticating a data maintenance request.

Figure 33:
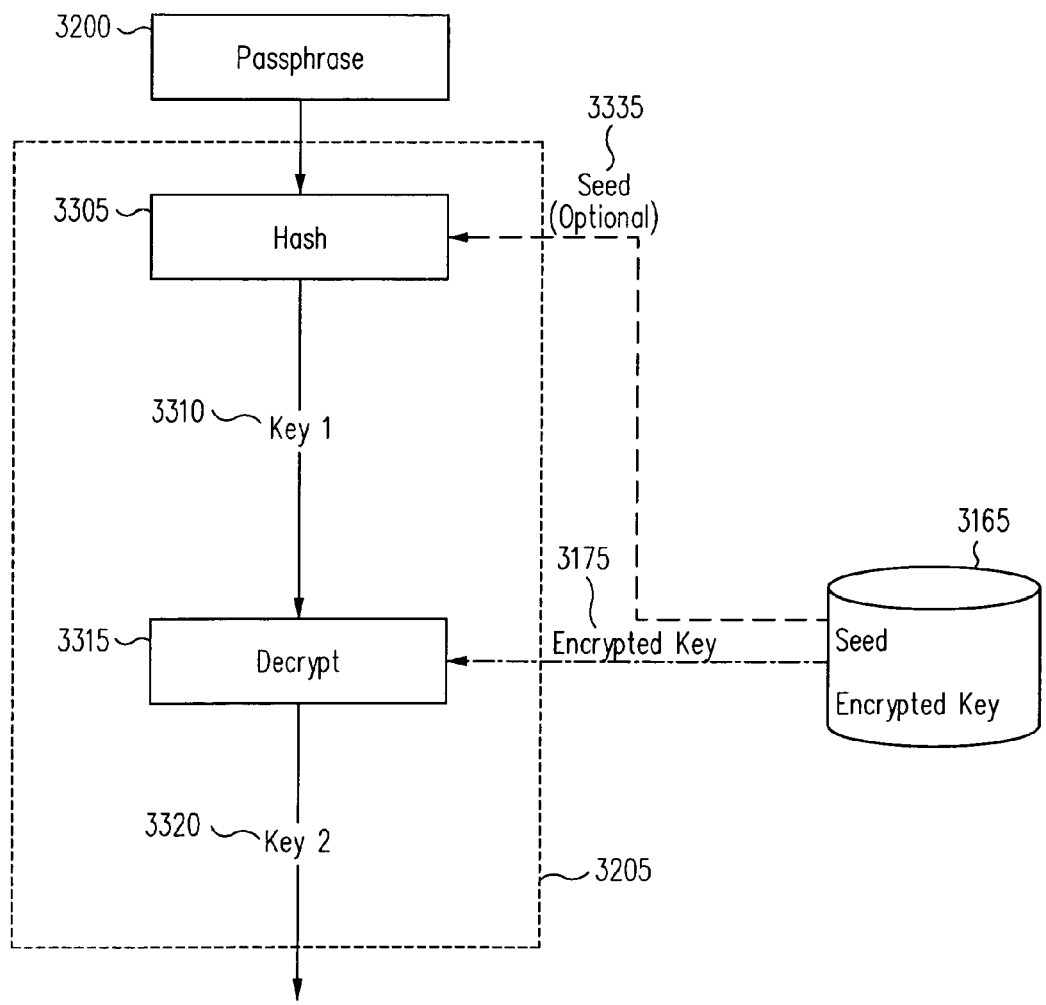
FIG. 33 is a flow diagram that illustrates a method for using a hashed passphrase to decrypt an encrypted key to create a cryptographic key for use in authenticating a user data maintenance request in accordance with one embodiment of the present invention.

Turning now to FIG. 33, a flow diagram that illustrates more detail for one embodiment of process 3205. This embodiment utilizes a method for using a hashed passphrase to decrypt an encrypted key to create a cryptographic key for use in authenticating a user data maintenance request. FIG. 33 also provides more detail for processes 3440, 4340, 5040, 5240, and 5440 of FIGS. 34, 43, 50, 52, and 54, respectively. The processes illustrated in FIG. 33 may be implemented using hardware, software, firmware, or a combination thereof.

As described above, process 3200 receives a passphrase included in data maintenance request 3155 from end-user 3100. According to one embodiment of the present invention, a seed 3335 obtained from memory 3165 of home terminal 3105 is hashed together with the received passphrase to create first key 3310 in hash process 3305. In process 3315, first key 3310 is used to decrypt encrypted key 3175 resulting in a second key 3320 for use in authenticating a data maintenance request. According to another embodiment of the present invention, a password-controlled file includes memory 3165.

Figure 34:
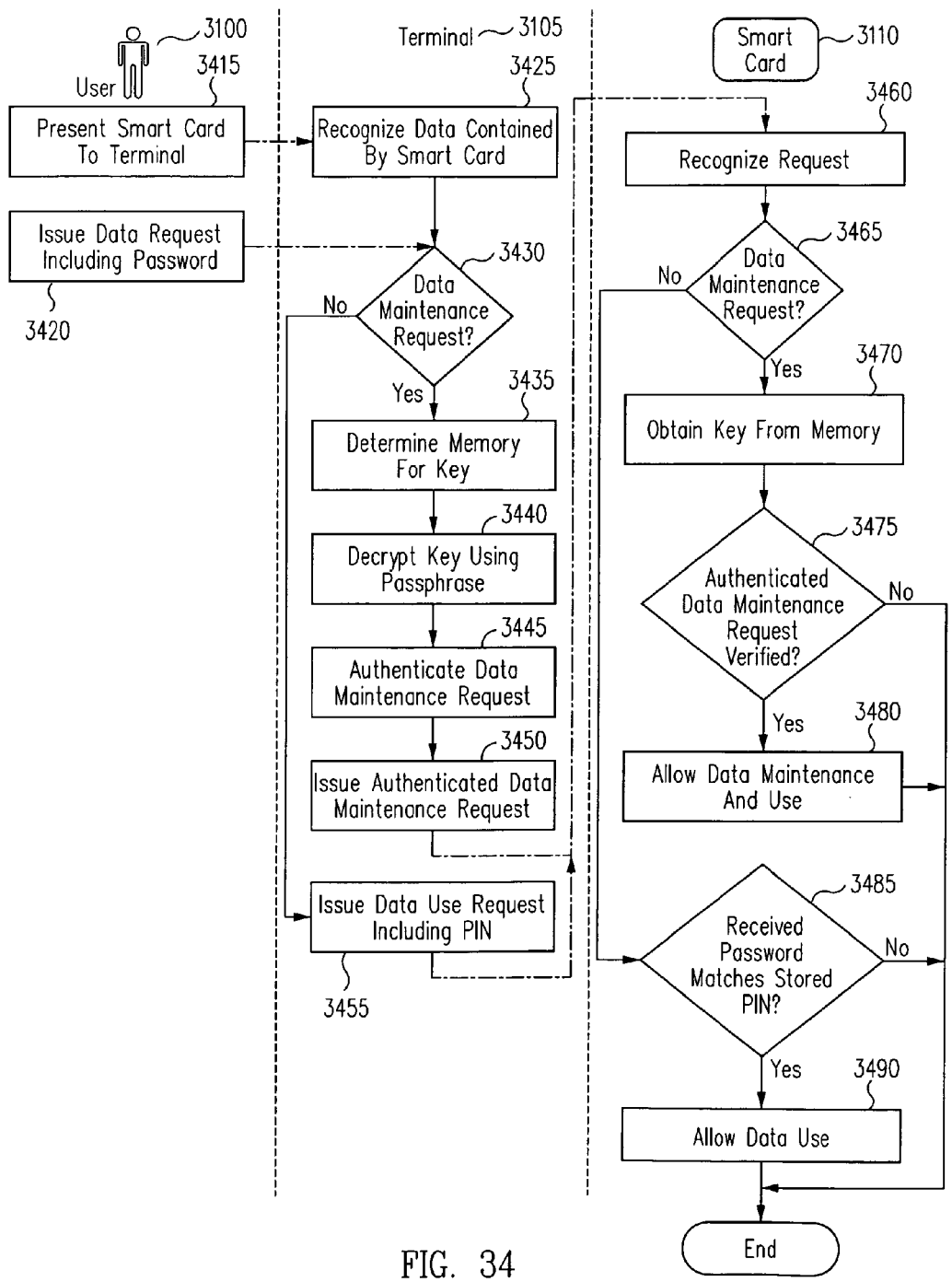
FIG. 34 is a flow diagram that illustrates a method for maintaining user data stored on a smart card where maintenance of the user data is controlled by an authenticated data maintenance request, and where use of the user data is controlled by a personal identification number (PIN), in accordance with one embodiment of the present invention.

Turning now to FIG. 34, a flow diagram illustrates a method for maintaining user data stored on a smart card where maintenance of the user data is controlled by an authenticated data maintenance request, and where use of the user data is controlled by a personal identification number (PIN), in accordance with one embodiment of the present invention. In one embodiment, the process illustrated in FIG. 34 is implemented using the elements of FIG. 31. The processes illustrated in FIG. 34 may be implemented using hardware, software, firmware, or a combination thereof.

In process 3415, end-user 3100 presents smart card 3110 to terminal 3105. In process 3425, terminal 3105 recognizes data contained on smart card 3110.

In process 3420, end-user 3100 issues a data request including a password, e.g., one of a passphrase and a PIN, to terminal 3105. Terminal 3105 receives the data request in check process 3430, and determines whether the data request is a data maintenance request where the password includes a passphrase.

If the received data request is a data maintenance request, process 3435 determines a memory storing encrypted key 3175 and retrieves encrypted key 3175. In process 3440, encrypted key 3175 is decrypted using the passphrase to generate a key. See FIGS. 32 and 33, for example.

In process 3445, the key is used to authenticate the received data maintenance request. For example, a signature module 3190 uses the key to sign the received data maintenance request. Process 3450 issues authenticated data maintenance request 3160 to smart card 3110.

If check process 3430 determines that the received data request is not a data maintenance request, the data request is a data use request including a PIN. Thus, process 3455 issues data use request 3120 to smart card 3110.

According to one embodiment of the present invention, end-user 3100 explicitly requests use or maintenance of the data. According to another embodiment of the present invention, end-user 3100 implicitly requests use or maintenance of the data as a result of interaction with terminal 3105. By way of example, the interaction of end-user 3100 with terminal 3105 may trigger a request for use or maintenance of data on smart card 3110, which in turn triggers a request to end-user 3100 for a PIN or passphrase that controls the data stored on smart card 3110.

Still referring to FIG. 34, in process 3460 smart card 3110 recognizes that a data request was received from terminal 3105. In check process 3465, smart card 3110 determines whether the received data request includes an authenticated data maintenance request or a data use request including a PIN.

If the received data request includes an authenticated data maintenance request, process 3470 on smart card 3110 retrieves a key from a memory on smart card 3110. Check process 3475 of smart card 3110 determines whether the authenticated data maintenance request is verified. The use of key to verify a signed data maintenance request is known to those of skill in the art. If the authenticated data maintenance request is verified, authorized maintenance of the data 3152 is allowed by process 3480 and processing then ends.

If check process 3465 determined that the data request does not include a data maintenance request, processing transfers to check process 3485. Check process 3385 determines whether the received password matches a PIN stored on smart card 3110. If the received password matches a PIN stored on smart card 3110 authorized use of the data 3145 is allowed in process 3490 and otherwise processing ends.

Figure 35:
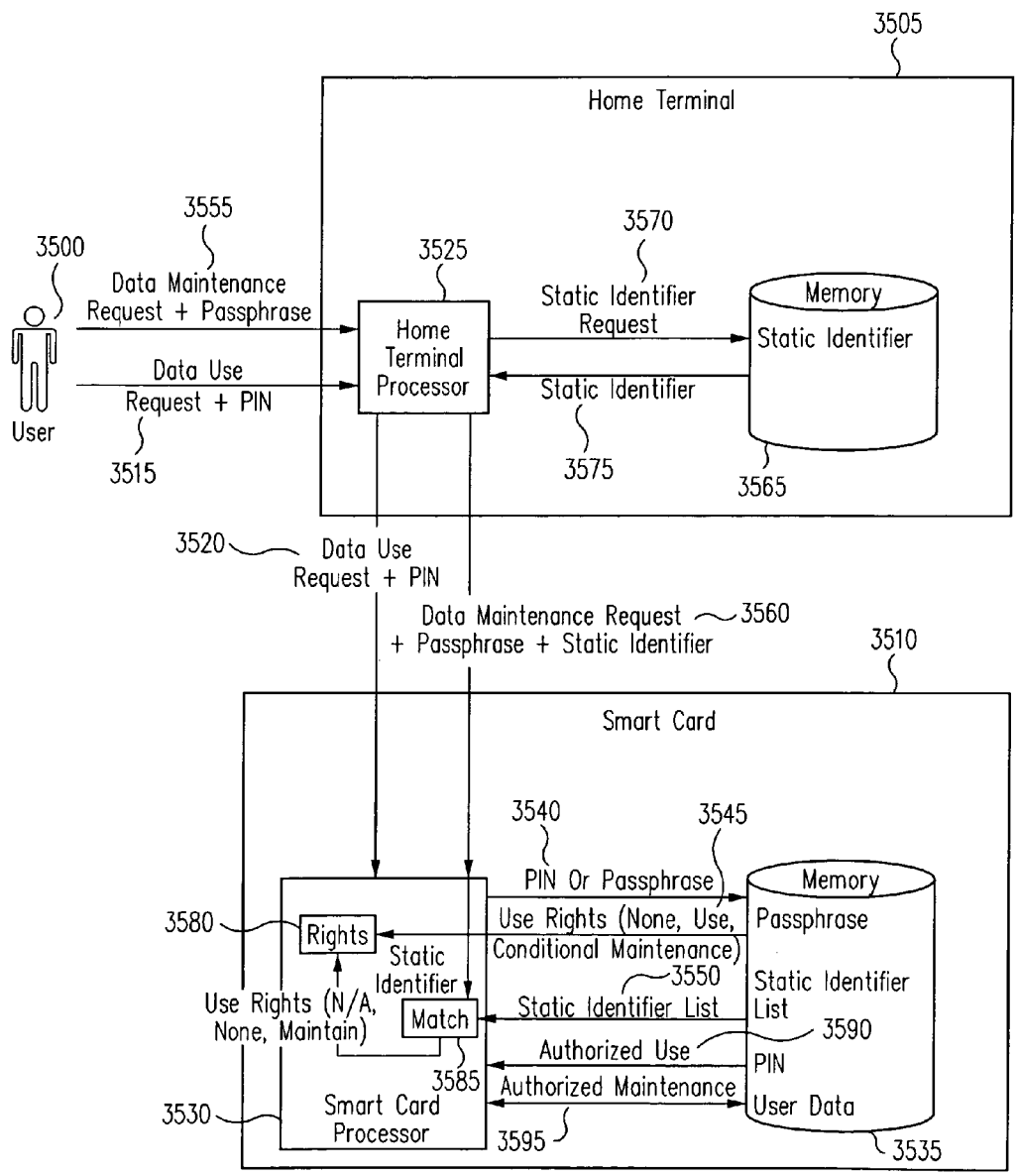
FIG. 35 is a block diagram that illustrates an apparatus for maintaining user data stored on a smart card where maintenance of the user data is controlled by a passphrase and a static identifier unique to one of a plurality of terminals, and where use of the user data is controlled by a personal identification number (PIN), in accordance with one embodiment of the present invention.
Figure 36:
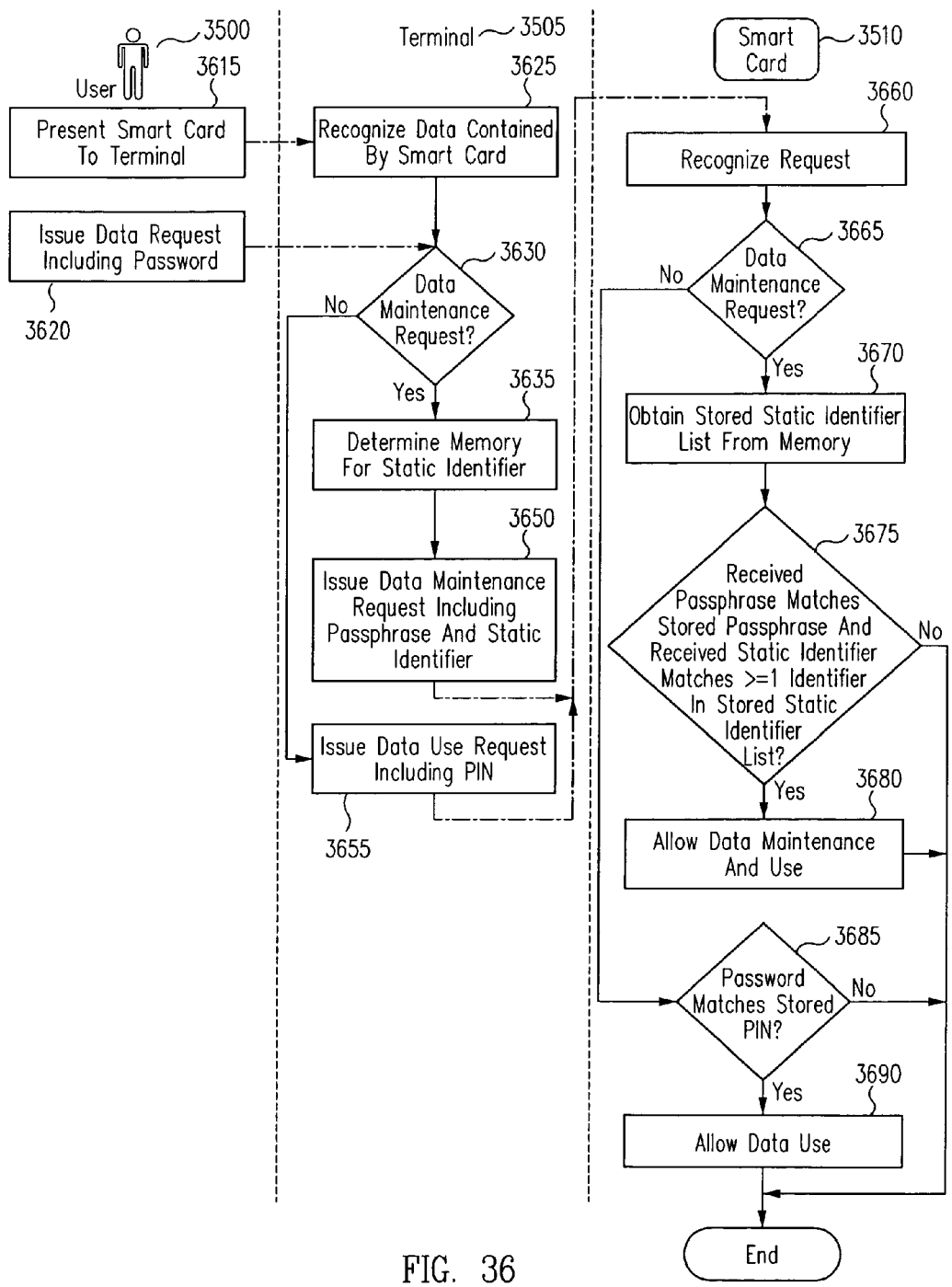
FIG. 36 is a flow diagram that illustrates a method for maintaining user data stored on a smart card where maintenance of the user data is controlled by a passphrase and a static identifier unique to one of a plurality of terminals, and where use of the user data is controlled by a personal identification number (PIN), in accordance with one embodiment of the present invention.

FIGS. 35 and 36 illustrate using a passphrase and a static identifier unique to one of multiple terminals and shared by a smart card to maintain user data stored on a smart card, in accordance with embodiments of the present invention. FIGS. 35 and 36 are similar to FIGS. 29 and 30, except that embodiments illustrated by FIGS. 35 and 36 support multiple home terminals, each with possibly different identifiers, while embodiments illustrated by FIGS. 29 and 30 support a single home terminal. Thus in embodiments illustrated by FIGS. 35 and 36, a smart card maintains a list of static identifiers corresponding to home terminals, and a static identifier received with a data maintenance request is matched against static identifiers in the list.

Turning now to FIG. 35, a block diagram illustrates an apparatus for maintaining user data stored on a smart card, in accordance with one embodiment of the present invention. The maintenance of the user data is controlled by a passphrase and a static identifier unique to one of a plurality of terminals. The plurality of terminals includes terminal 3505 and the remaining terminals in the plurality are represented by the shadow behind terminal 3505. The use of the user data is controlled by a personal identification number (PIN).

As shown in FIG. 35, a home terminal 3505 includes home terminal processor 3525 and a memory 3565 for storing a static identifier. Home terminal processor 3525 is adapted to (i) receive a data request including a password, e.g., data maintenance request 3555 including a passphrase or data use request 3515 including a PIN; (ii) determine a memory 3565 for the static identifier and retrieve static identifier 3575 if the data request includes a data maintenance request 3555; and (iii) to forward a data request to a smart card 3510, e.g., data maintenance request 3560 including the passphrase and static identifier 3575, or data use request 3520 including the PIN.

Still referring to FIG. 35, smart card 3510 includes a smart card processor 3530 and a memory 3535. Memory 3535 stores data including a PIN, a passphrase, a static identifier list, and user data. According to one embodiment of the present invention, smart card processor 3530 includes one or more rights flags 3580 for indicating whether end-user 3500 has use rights with respect to user data stored in memory 3535. According to one embodiment of the present invention, the one or more rights flags 3580 are stored in a transient memory area. Each of the one or more rights flags 3580 describes one or more rights end-user 3500 has to the user data stored in memory 3535.

Smart card processor 3530 is adapted to recognize a received data request including a password, either request 3520 or request 3560, from home terminal 3505. Match unit 3585 of smart card processor 3530 is adapted to determine whether received password 3540 matches a passphrase stored in memory 3535 on smart card 3510, and whether the received static identifier matches at least one static identifier in a static identifier list 3550 stored in memory 3535 on smart card 3510. Static identifier list 3550 includes a unique static identifier, i.e., a different static identifier, for each terminal in the plurality of terminals.

Smart card processor 3530 is further adapted to allow authorized data maintenance 3595 if the received password matches the passphrase stored on smart card 3510 and if the received static identifier matches at least one static identifier in static identifier list 3550. Smart card processor 3530 is further adapted to allow the requested use 3590 of the data if received password 3540 matches a PIN stored in memory 3535 of smart card 3510.

As indicated above, according to one embodiment of the present invention, smart card processor 3530 includes one or more rights flags 3580 for indicating whether end-user 3500 has maintenance rights or use rights with respect to user data stored in memory 3535. One of one or more rights flag 3580 is configured the first time a data request including a password is received in a session for an application and at least that password is associated with rights for data stored in memory 3535. Note that for maintenance, the static identifier must also match for configuration of a rights flag. For subsequent data requests that do not include a password, processor 3530 references one or more rights flag 3580 to determine whether the data request should be allowed.

According to one embodiment of the present invention, a PIN is used in a challenge-response protocol initiated by smart card 3510. According to another embodiment of the present invention, a password includes a picture PIN.

As shown in FIG. 35, home terminal 3505 includes memory 3565. According to another embodiment of the present invention, memory 3565 resides on a remote network device (not shown in FIG. 35) coupled to home terminal 3505. A cryptographic protocol between home terminal 3505 and the remote network device may be used to protect integrity of the data stored in memory 3565.

Turning now to FIG. 36, a flow diagram illustrates a method for maintaining user data stored on a smart card where maintenance of the user data is controlled by a passphrase and a static identifier unique to one of a plurality of terminals, and where use of the user data is controlled by a personal identification number (PIN), in accordance with one embodiment of the present invention. In one embodiment, the process illustrated in FIG. 36 is implemented using the elements of FIG. 35. The processes illustrated in FIG. 36 may be implemented using hardware, software, firmware, or a combination thereof.

In process 3615, an end-user 3500 presents a smart card 3510 to a terminal 3505. In process 3625, terminal 3505 recognizes data contained on smart card 3510.

In process 3620, end-user 3500 issues a data request including a password, e.g., one of a passphrase and a PIN. The data request is issued using terminal 3505 in one embodiment.

Data maintenance request check process 3630 on terminal 3505 receives the data request sent from process 3620, and determines whether the data request is a data maintenance request where the password includes a passphrase. If the received data request is a data maintenance request, process 3635 determines a memory storing a static identifier. In one embodiment of process 3635, processor 3525 issues a static identifier request 3570 to memory 3565. Since in this example, memory 3565 stores the static identifier, static identifier 3575 is sent to processor 3525 in response to request 3570. Thus, the memory including the static identifier is determined. Process 3650 on terminal 3505 issues data maintenance request 3560 including the passphrase and the static identifier to smart card 3510.

If check process 3630 determines that the received data request is not a data maintenance request, the data request is a data use request including a PIN. Thus, check process 3630 transfers to process 3655 on terminal 3505. Process 3655, in turn, issues data use request 3520 including the PIN to smart card 3510.

According to one embodiment of the present invention, end-user 3500 explicitly requests use or maintenance of the data. According to another embodiment of the present invention, end-user 3500 implicitly requests use or maintenance of the data as a result of interaction with terminal 3505. By way of example, the interaction of end-user 3500 with terminal 3505 may trigger a request for use or maintenance of data on smart card 3510, which in turn triggers a request to end-user 3500 for a PIN or passphrase that controls the data stored on smart card 3510.

Still referring to FIG. 36, process 3660 on smart card 3510 recognizes a data request from terminal 3505, e.g., a data request is received and recognized. Check process 3665 on smart card 3510 determines whether the received data request includes a data maintenance request including a passphrase and a static identifier, or a data use request including a PIN.

If the received data request includes a data maintenance request including a passphrase and a static identifier, process 3670 on smart card 3510 obtains a static identifier list from a memory on smart card 3510. Check process 3675 determines whether the received passphrase matches a passphrase stored on smart card 3510, and whether the received static identifier matches at least one static identifier in the static identifier list stored on smart card 3510. If the received passphrase matches a passphrase stored on smart card 3510, and if the received static identifier matches at least one static identifier stored in the static identifier list, process 3680 allows maintenance and use of the data.

If the received data request does not includes a data maintenance request, check process 3665 transfers processing to check process 3685. Check process 3685 determines whether the received password matches a PIN stored on smart card 3510. If the received password matches a PIN stored on smart card 3510, process 3690 allows use of the data.

Figure 37:
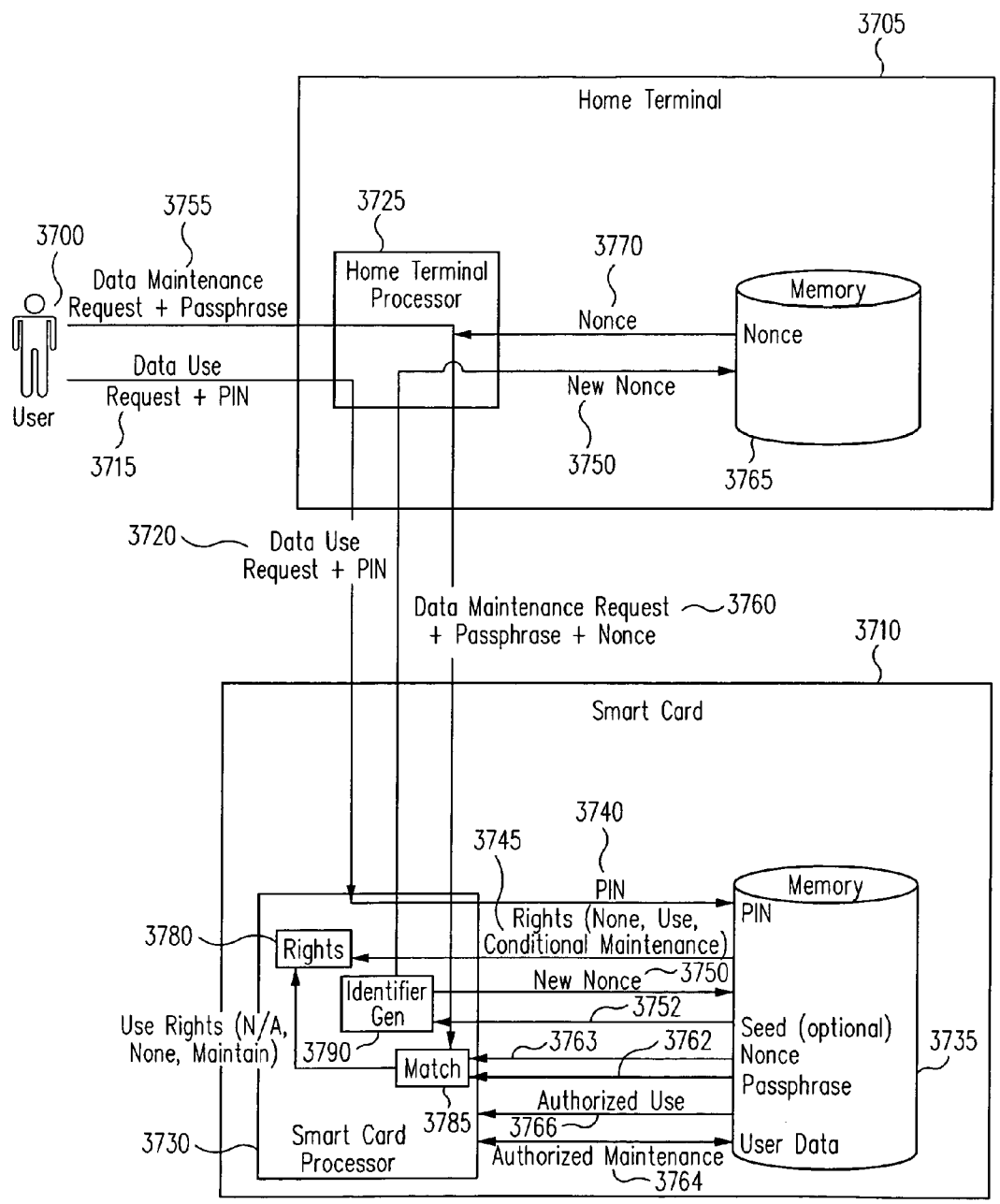
FIG. 37 is a block diagram that illustrates an apparatus for maintaining user data stored on a smart card where maintenance of the user data is controlled by a passphrase and a nonce, and where use of the user data is controlled by a personal identification number (PIN), in accordance with one embodiment of the present invention.
Figure 38:
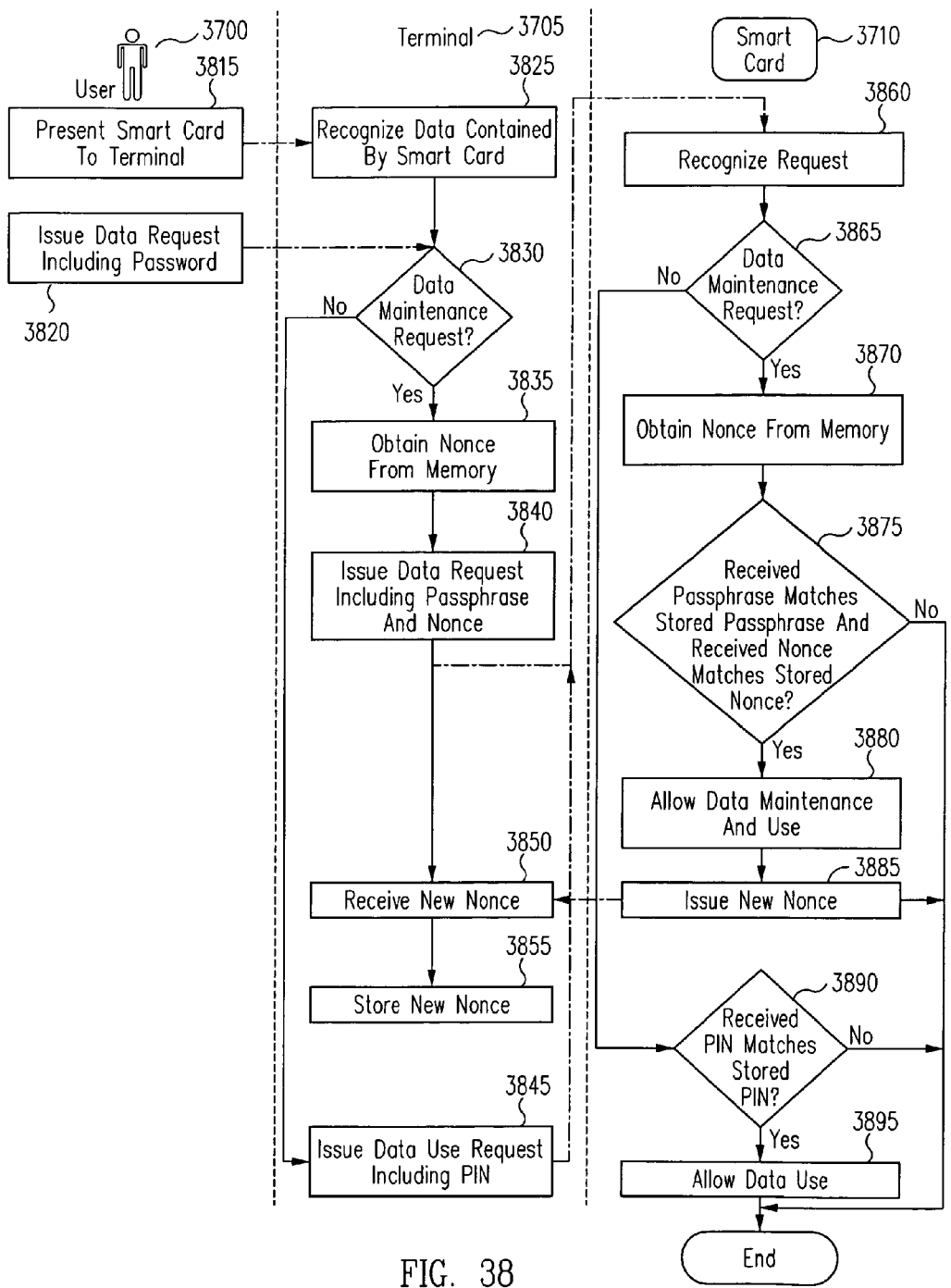
FIG. 38 is a flow diagram that illustrates a method for maintaining user data stored on a smart card where maintenance of the user data is controlled by a nonce, and where use of the user data is controlled by a personal identification number (PIN), in accordance with one embodiment of the present invention.
Figure 39:
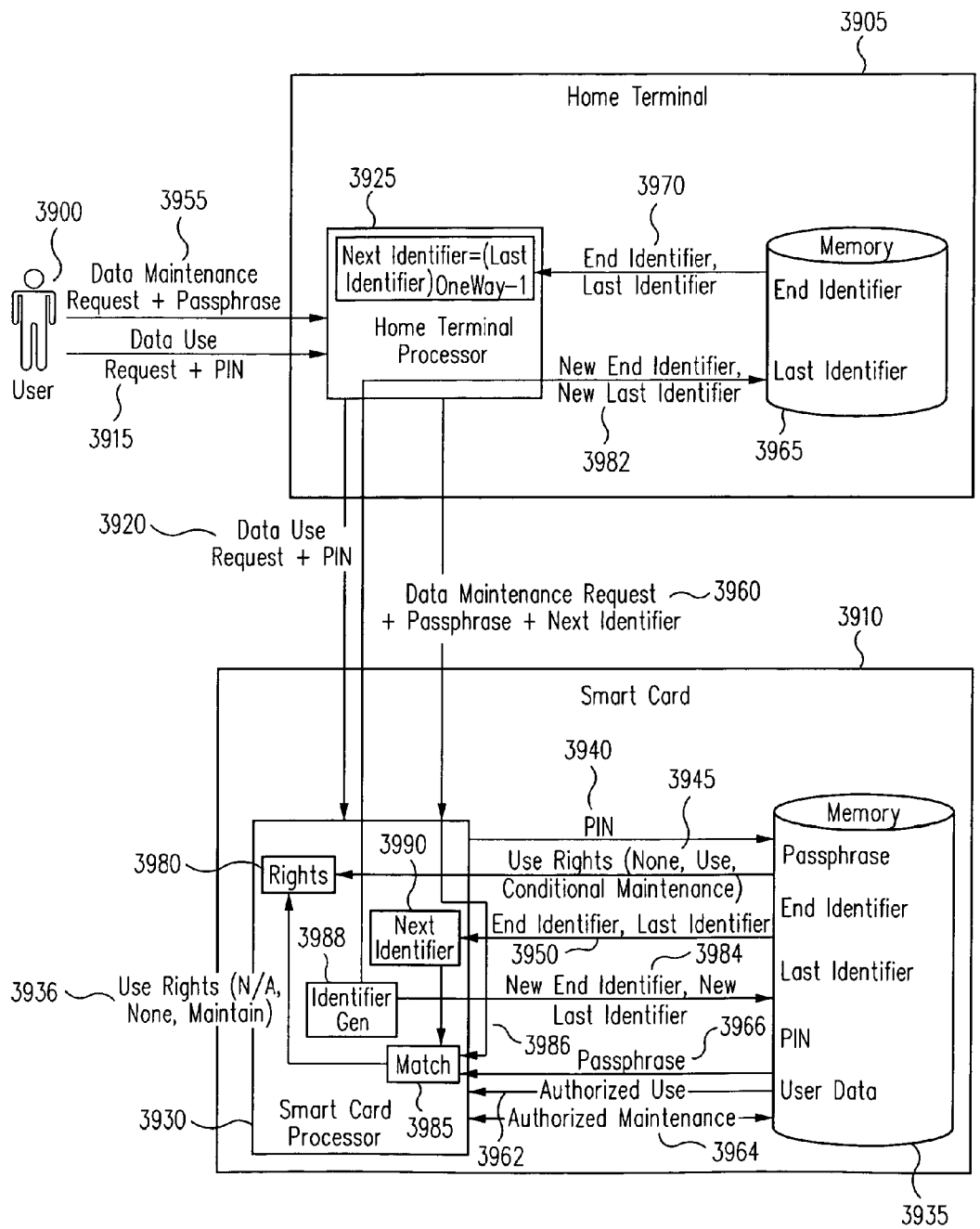
FIG. 39 is a block diagram that illustrates an apparatus for maintaining user data stored on a smart card where maintenance of the user data is controlled by a passphrase and a dynamic identifier, and where use of the user data is controlled by a personal identification number (PIN), in accordance with one embodiment of the present invention.
Figure 40:
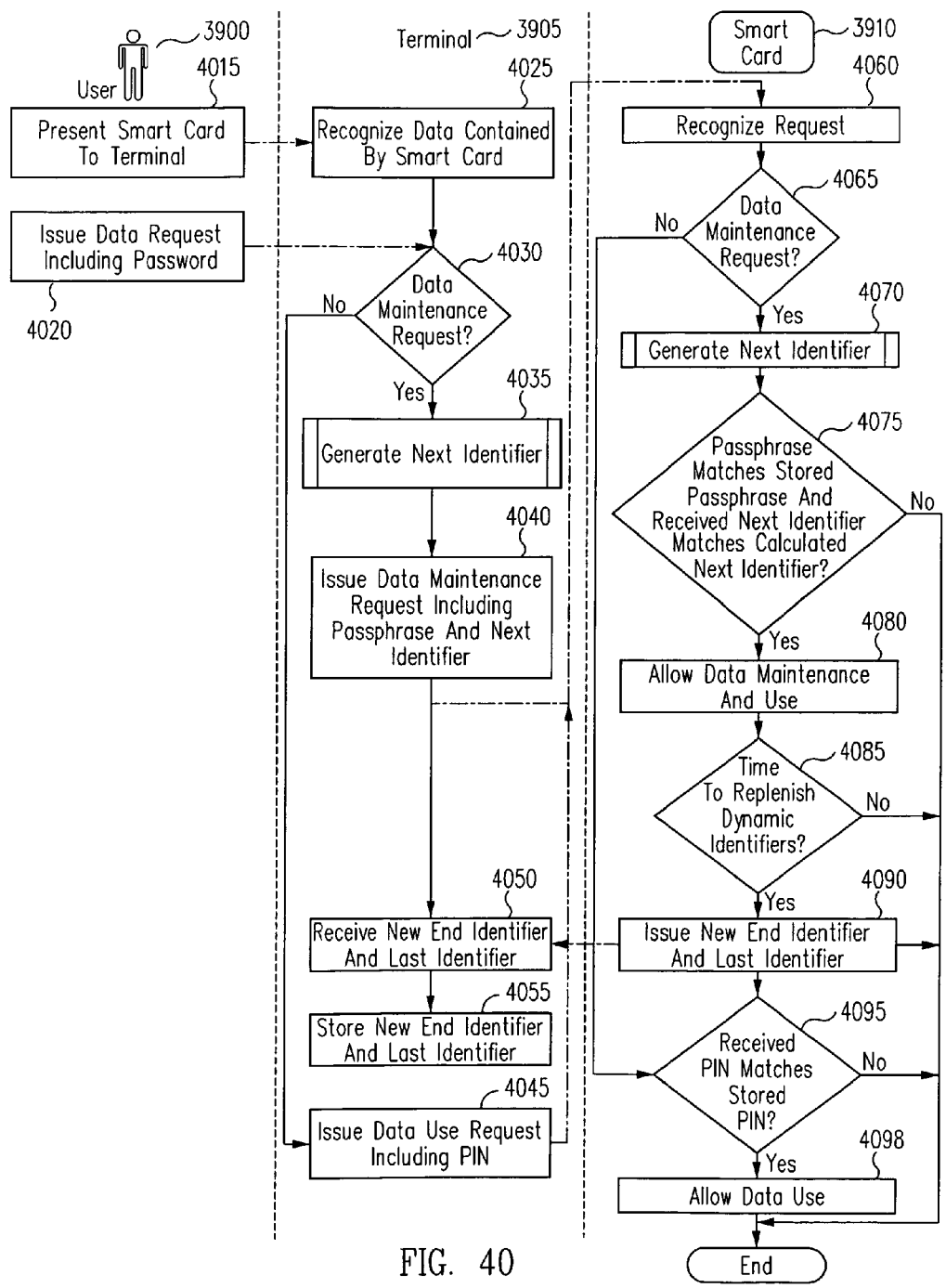
FIG. 40 is a flow diagram that illustrates a method for maintaining user data stored on a smart card where maintenance of the user data is controlled by a passphrase and a dynamic identifier, and where use of the user data is controlled by a personal identification number (PIN), in accordance with one embodiment of the present invention.

FIGS. 37 to 40 illustrate using a passphrase and a dynamic identifier unique to a terminal and shared by a smart card to maintain user data stored on a smart card, in accordance with embodiments of the present invention. FIGS. 37 to 40 differ from FIGS. 29 and 30 and FIGS. 35 and 36 in that embodiments illustrated by FIGS. 37 to 40, identifiers included in data maintenance requests sent to a smart card change with each successive data maintenance request in a session, i.e., the identifiers are dynamic identifiers. FIGS. 37 and 38 illustrate using nonces as dynamic identifiers. FIGS. 39 and 40 illustrate using a chain of dynamic identifiers created from successive applications of a cryptographic one-way function as dynamic identifiers.

Turning now to FIG. 37, a block diagram illustrates an apparatus for maintaining user data stored on a smart card where maintenance of the user data is controlled by a passphrase and a nonce, and where use of the user data is controlled by a personal identification number (PIN), in accordance with one embodiment of the present invention. As shown in FIG. 37, a home terminal 3705 includes home terminal processor 3725 and a memory 3765 for storing a nonce. Home terminal processor 3725 is further adapted to (i) receive a data request including a password, e.g., data maintenance request 3755 including a passphrase or data use request 3715 including a PIN; (ii) determine a memory 3765 storing the nonce and retrieve nonce 3770 if the data request includes a data maintenance request 3755; and (iii) forward a data request including a password to a smart card 3710, e.g., data maintenance request 3760 including the passphrase and nonce 3770, or data use request 3720 including the PIN.

Still referring to FIG. 37, smart card 3710 includes a smart card processor 3730 and a memory 3735. Memory 3735 is for storing data including a passphrase, a PIN, an optional seed, a nonce, and user data.

According to one embodiment of the present invention, smart card processor 3730 includes one or more rights flags 3780 for indicating whether end-user 3700 has use rights with respect to user data stored in memory 3735. According to one embodiment of the present invention, the one or more rights flags 3780 are stored in a transient or impersistent memory area. Each of the one or more rights flags 3780 describes one or more rights end-user 3700 has to the user data stored in memory 3735.

Smart card processor 3730 is adapted to recognize a data request including a password, e.g., either a data use request, e.g., data maintenance request 3760 including the passphrase and nonce 3770, or data use request 3720 including the PIN, sent from home terminal 3705. Match unit 3785 of smart card processor 3730 is adapted to determine whether the received password matches a passphrase 3762 stored in memory 3735 and whether the received nonce matches a nonce 3762 stored in memory 3735. In one embodiment, match unit 3785 asserts a rights flag to correspond based on the match. Smart card processor 3730 is further adapted to allow data maintenance 3764 and use 3766 if the received password matches passphrase 3762 and if the received nonce matches nonce 3763.

Smart card processor 3730 is further adapted to allow the requested use 3766 of the user data if the received password matches a PIN 3740 stored in memory 3735 of smart card 3710. In one embodiment, if the PINs match, a rights flag is configured to correspond to rights 3745 associated with the stored PIN.

Identifier generator 3790 of smart card processor 3730 is adapted to issue a new nonce 3750 for storage in memory 3735 of smart card 3710 and memory 3765 of home terminal 3705 after using a nonce to determine whether a data maintenance request should be allowed.

According to one embodiment of the present invention, smart card processor 3730 includes one or more rights flags 3580 for indicating whether end-user 3700 has maintenance rights or use rights with respect to user data stored in memory 3735. One of one or more rights flag 3780 is set the first time a data request including a password is received in a session for an application and at least that password is associated with rights for data stored in memory 3735. Note that for maintenance, the nonce must also match for configuration of a rights flag. For subsequent data requests that do not include a password, processor 3730 references one or more rights flag 3780 to determine whether the data request should be allowed.

According to one embodiment of the present invention, a PIN is used in a challenge-response protocol initiated by smart card 3710. According to another embodiment of the present invention, a password includes a picture PIN.

As shown in FIG. 37, home terminal 3705 includes memory 3765. According to another embodiment of the present invention, memory 3765 resides on a remote network device (not shown in FIG. 37) coupled to home terminal 3705. A cryptographic protocol between home terminal 3705 and the remote network device may be used to protect integrity of the data stored in memory 3765.

Turning now to FIG. 38, a flow diagram illustrates a method for maintaining user data stored on a smart card where maintenance of the user data is controlled by a passphrase and a nonce, and where use of the user data is controlled by a personal identification number (PIN), in accordance with one embodiment of the present invention. In one embodiment, the process illustrated in FIG. 38 is implemented using the elements of FIG. 37. The processes illustrated in FIG. 38 may be implemented using hardware, software, firmware, or a combination thereof.

In process 3815, an end-user 3700 presents a smart card 3710 to a terminal 3705. In process 3825, terminal 3705 recognizes data contained on smart card 3710.

In process 3820, end-user 3700 issues a data request including a password, e.g., one of a passphrase and a PIN. The data request is issued using terminal 3705 in one embodiment.

Data maintenance request check process 3830 on terminal 3705 receives the data request sent from process 3820, and determines whether the data request is a data maintenance request where the password includes a passphrase. If the received data request is a data maintenance request, process 3835 obtains a nonce 3770 from a memory. Process 3840 on terminal 3705 issues data maintenance request 3760 including the passphrase and the nonce to smart card 3710.

If check process 3830 determines that the received data request is not a data maintenance request, the data request is a data use request including a PIN. Thus, check process 3830 transfers to process 3845 on terminal 3705. Process 3845, in turn, issues data use request 3720 including the PIN to smart card 3710.

According to one embodiment of the present invention, end-user 3700 explicitly requests use or maintenance of the data. According to another embodiment of the present invention, end-user 3700 implicitly requests use or maintenance of the data as a result of interaction with terminal 3705. By way of example, the interaction of end-user 3700 with terminal 3705 may trigger a request for use or maintenance of data on smart card 3710, which in turn triggers a request to end-user 3700 for a PIN or passphrase that controls the data stored on smart card 3710.

Still referring to FIG. 38, process 3860 on smart card 3710 recognizes a data request from terminal 3705, e.g., a data request is received and recognized. Check process 3865 on smart card 3710 determines whether the received data request includes a data maintenance request including a passphrase and a nonce, or a data use request including a PIN.

If the received data request includes a data maintenance request including a passphrase and a nonce, process 3870 on smart card 3710 obtains a nonce from a memory on smart card 3710. Check process 3875 determines whether the received passphrase matches a passphrase stored on smart card 3710, and whether the received nonce matches the nonce stored on smart card 3710. If the received passphrase matches a passphrase stored on smart card 3710, and if the received nonce matches the stored nonce, process 3880 allows maintenance and use of the data.

Since the nonce has been used, process 3880 transfers to issue new nonce process 3885. Process 3885 issues the new nonce and stores the new nonce, replacing the previous nonce, in a memory on smart card 3710 and sends the new nonce to terminal 3075.

Receive new nonce process 3850 on terminal 3705 receives the new nonce from process 3885. Process 3855 stores new nonce 3750, replacing the old nonce, in a memory accessible by terminal 3705.

If the received data request on smart card 3710 does not includes a data maintenance request, check process 3865 transfers processing to check process 3890. Check process 3890 determines whether the received password matches a PIN stored on smart card 3710. If the received password matches a PIN stored on smart card 3710, process 3895 allows use of the data.

Turning now to FIG. 39, a block diagram illustrates an apparatus for maintaining user data stored on a smart card where maintenance of the user data is controlled by a passphrase and a dynamic identifier, and where use of the user data is controlled by a personal identification number (PIN), in accordance with one embodiment of the present invention. As shown in FIG. 39, a home terminal 3905 includes home terminal processor 3925 and a memory 3965 for storing an end identifier and a last identifier. Home terminal processor 3925 is further adapted to (i) receive a data request including a password, e.g., either data maintenance request 3955 including a passphrase, or data use request 3915 including a PIN; (ii) determine a memory 3965 storing the end identifier and the last identifier if the data request includes a data maintenance request 3955; and (iii) forward a data request including a password to a smart card 3910, e.g., either data maintenance request 3960 including the passphrase and a next identifier generated using the stored end identifier and the stored last identifier (See FIG. 41), or data use request 3920 including the PIN.

Still referring to FIG. 39, smart card 3910 includes a smart card processor 3930 and a memory 3935. Memory 3935 is for storing data including a passphrase, a PIN, a number of identifiers, an end identifier, and user data.

According to one embodiment of the present invention, smart card processor 3930 includes one or more rights flags 3980 for indicating whether end-user 3900 has use rights with respect to the user data stored in memory 3935. According to one embodiment of the present invention, one or more rights flags 3980 are stored in a transient memory area, sometimes called an impersistent memory area. Each of the one or more rights flags 3980 describes one or more rights end-user 3900 has to the user data stored in memory 3935.

Smart card processor 3930 is adapted to recognize a data request including a password, e.g., either data maintenance request 3960 including the passphrase and next identifier, or data use request 3920 including the PIN, sent from home terminal 3905. Next identifier unit 3990 of smart card processor 3930 is adapted to generate a next identifier based at least in part on end identifier and last identifier 3950 stored in memory 3935. Match unit 3985 of smart card processor 3930 is adapted to determine (i) whether the received password matches a passphrase 3966 stored in memory 3935 and (ii) whether the received next identifier matches the next identifier generated by next identifier unit 3990 using end identifier and last identifier 3950 stored in memory 3935. In one embodiment, match unit 3985 configures a rights flag to a state that corresponds with user rights 3936 determined by match unit 3985. Smart card processor 3930 is further adapted to allow data maintenance 3964 and use 3962 if the received password matches passphrase 3962 and if the received next identifier matches the next identifier generated by next identifier unit 3990.

Smart card processor 3930 is further adapted to allow the requested use 3962 of the user data if the received password matches a PIN 3940 stored in memory 3935 of smart card 3910. In one embodiment, if the PINs match, a rights flag is configured to correspond to rights 3945 associated with the stored PIN.

Identifier generator 3988 of smart card processor 3930 is adapted to issue a new end identifier and a new last identifier after determining that it is time to replenish a pool of available dynamic identifiers. New end identifier and new last identifier 3982 are sent to home terminal 3905 for storage in memory 3935 and to replace the previous end and last identifiers. New end identifier and new last identifier 3984 are stored in memory 3935 replacing the previous end and last identifiers. New end identifier and new last identifier 3982 and new end identifier and new last identifier 3984 are the same new end identifier and new last identifier.

As indicated above, according to one embodiment of the present invention, smart card processor 3930 includes one or more rights flags 3580 for indicating whether end-user 3900 has maintenance rights or use rights with respect to user data stored in memory 3935. One of one or more rights flag 3980 is configured the first time a data request including a password is received in a session for an application and at least that password is associated with rights for data stored in memory 3935. Note that for maintenance, the next identifier must also match for configuration of a rights flag. For subsequent data requests that do not include a password, processor 3930 references one or more rights flag 3980 to determine whether the data request should be allowed.

According to one embodiment of the present invention, a PIN is used in a challenge-response protocol initiated by smart card 3910. According to another embodiment of the present invention, a password includes a picture PIN.

As shown in FIG. 39, home terminal 3905 includes memory 3965. According to another embodiment of the present invention, memory 3965 resides on a remote network device (not shown in FIG. 39) coupled to home terminal 3905. A cryptographic protocol between home terminal 3905 and the remote network device may be used to protect integrity of the data stored in memory 3965.

Turning now to FIG. 40, a flow diagram illustrates a method for maintaining user data stored on a smart card where maintenance of the user data is controlled by a passphrase and a dynamic identifier, and where use of the user data is controlled by a personal identification number (PIN), in accordance with one embodiment of the present invention. In one embodiment, the process illustrated in FIG. 40 is implemented using the elements of FIG. 39. The processes illustrated in FIG. 40 may be implemented using hardware, software, firmware, or a combination thereof.

In process 4015, an end-user 3900 presents a smart card 3910 to a terminal 3905. In process 4025 on terminal 3905, terminal 3905 recognizes data contained on smart card 3910.

In process 4020, end-user 3900 issues a data request including a password, e.g., one of a passphrase and a PIN. The data request is issued using terminal 3905 in one embodiment.

Data maintenance request check process 4030 on terminal 3905 receives the data request sent from process 4020, and determines whether the data request is a data maintenance request where the password includes a passphrase. If the received data request is a data maintenance request, process 4035 determines a next identifier, as explained more completely below using end identifier and last identifier 3970 retrieved from memory 3965. Process 4040 on terminal 3905 issues data maintenance request 3960 including the passphrase and the next identifier to smart card 3910.

If check process 4030 determines that the received data request is not a data maintenance request, the data request is a data use request including a PIN. Thus, check process 4030 transfers to process 4045 on terminal 3905. Process 4045, in turn, issues data use request 3920 including the PIN to smart card 3910.

According to one embodiment of the present invention, end-user 3900 explicitly requests use or maintenance of the data. According to another embodiment of the present invention, end-user 3900 implicitly requests use or maintenance of the data as a result of interaction with terminal 3905. By way of example, the interaction of end-user 3900 with terminal 3905 may trigger a request for use or maintenance of data on smart card 3910, which in turn triggers a request to end-user 3900 for a PIN or passphrase that controls the data stored on smart card 3910.

Still referring to FIG. 40, process 4060 on smart card 3910 recognizes a data request from terminal 3905, e.g., a data request is received and recognized. Check process 4065 on smart card 3910 determines whether the received data request includes a data maintenance request including a passphrase and a next identifier, or a data use request including a PIN.

If the received data request includes a data maintenance request including a passphrase and a next identifier, process 4070 on smart card 3910 generates a next identifier using end identifier and last identifier 3950 stored in memory 3935. Check process 4075 determines (i) whether the received passphrase matches a passphrase stored on smart card 3910, and (ii) whether the generated next identifier matches the received next identifier. If the received passphrase matches a passphrase stored on smart card 3910, and if the received next identifier matches the generated next identifier, process 4080 on smart card 4010 allows maintenance and use of the data.

Since a dynamic identifier has been used, process 4080 transfers to time to replenish dynamic identifiers check operation 4085. Check operation 4085 determine whether a pool of available dynamic identifiers needs replenishment. When check operation 4085 determines the pool of available dynamic identifiers need replenishment, processing transfers to process 4090 on smart card 3910 and otherwise processing on smart card 3910 ends.

In process 4090, smart card 3910 issues a new end identifier and a new last identifier to terminal 3905 and updates memory 3935 with the new end and last identifiers replacing the old identifiers. Terminal 3905 receives the new end identifier and the new last identifier in process 4050. Process 4055 on terminal 3905 stores the new end identifier and the new last identifier for subsequent use, replacing the previous one and processing on smart card 3910 ends.

If the received data request on smart card 3910 does not includes a data maintenance request, check process 4065 transfers processing to check process 4095. Check process 4095 determines whether the received password matches a PIN stored on smart card 3910. If the received password matches a PIN stored on smart card 3910, process 4098 allows use of the data and them processing on smart card 3910 ends.

According to one embodiment of the present invention, dynamic identifiers are created by repeatedly applying a cryptographic one-way function to create a chain of identifiers. Each application of the cryptographic one-way function uses the result of the previous cryptographic one-way function as an input. An end identifier is described as the first identifier (the first input to a cryptographic one-way function). Dynamic identifiers are allocated in reverse order of creation.

Figure 41:
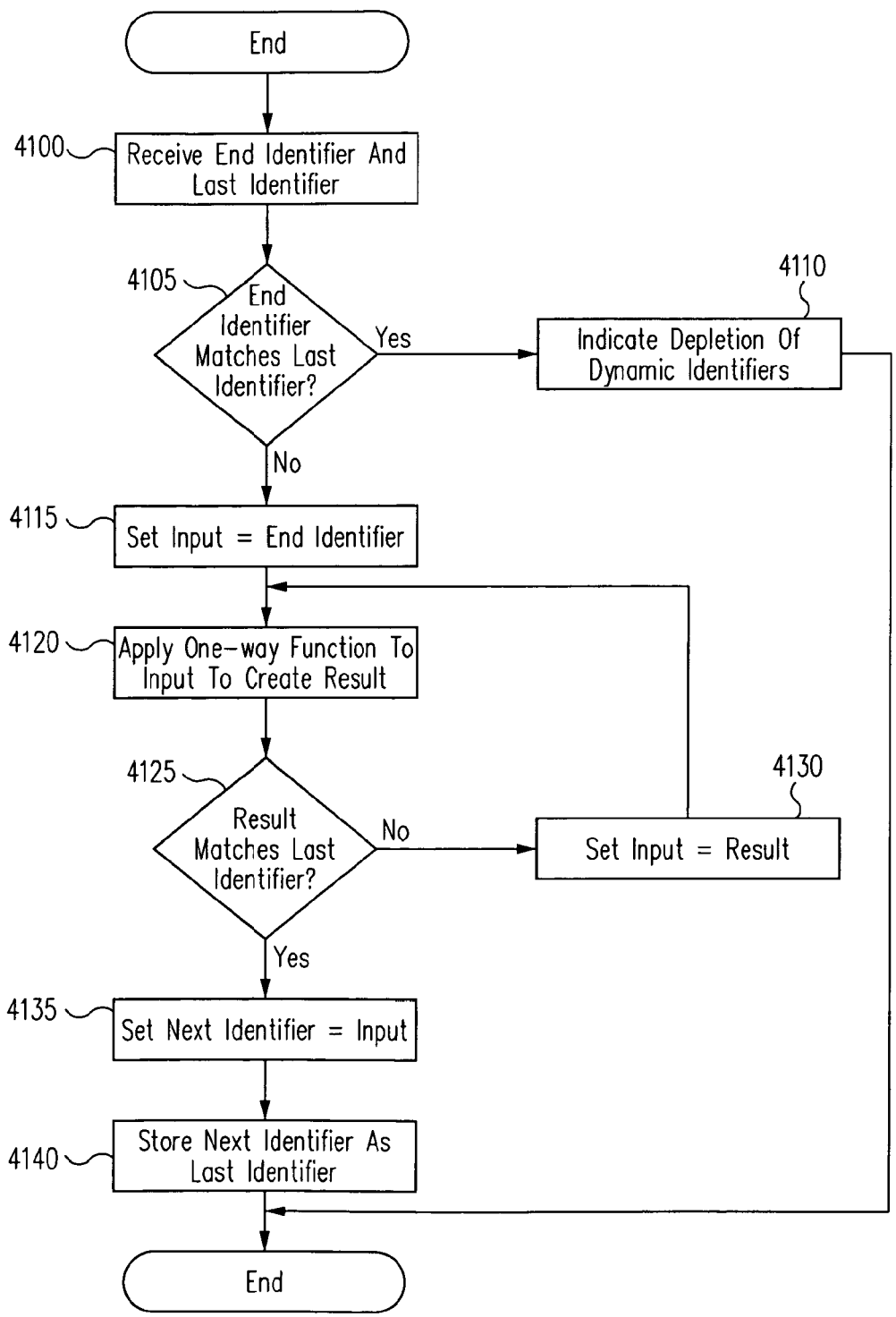
FIG. 41 is a flow diagram that illustrates a method for calculating a next identifier in accordance with one embodiment of the present invention.

Turning now to FIG. 41, a flow diagram illustrates a method for generating a next identifier in accordance with one embodiment of the present invention. FIG. 41 provides more detail for one embodiment of processes 4035 and 4070 of FIG. 40, and processes 4835 and 4870 of FIG. 48. The processes illustrated in FIG. 41 may be implemented using hardware, software, firmware, or a combination thereof.

Beginning with an end identifier as an input, a cryptographic one-way function is repeatedly applied to the previous cryptographic one-way function result until the result of the cryptographic one-way function matches the last identifier. The input to the cryptographic one-way function that produced the result is set as the next identifier.

In more detail, process 4100 receives an end identifier and a last identifier that were stored in a memory. Next, check process 4105 determines whether the end identifier matches the last identifier. If the end identifier matches the last identifier, check operation 4105 transfers to process 4110, which in turn generates an indication that the pool of dynamic identifiers has been depleted and processing ends.

Conversely, if the end identifier does not match the last identifier, check process 4105 transfers to process 4115, which in turn sets an input value to the value of the end identifier. Next, process 4120 applies a cryptographic one-way function to the input to create a result.

Check operation 4125 determines whether the result matches the last identifier. If the result does not match the last identifier, check operation 4125 transfers to process 4130. Process 4130 sets the input to the value of the result and transfers back to process 4120. Processing transfers through processes 4125, 4130 and 4120 until in check process 4125 the result matches the last identifier. When check process 4125 detects a match, processing transfers to process 4135. Process 4135 set the next identifier to the input and transfers to process 4140. Process 4140 overwrites the last identifier stored in memory with the next identifier so that the new next identifier becomes the last identifier, and processing to generate the next identifier ends.

Figure 42:
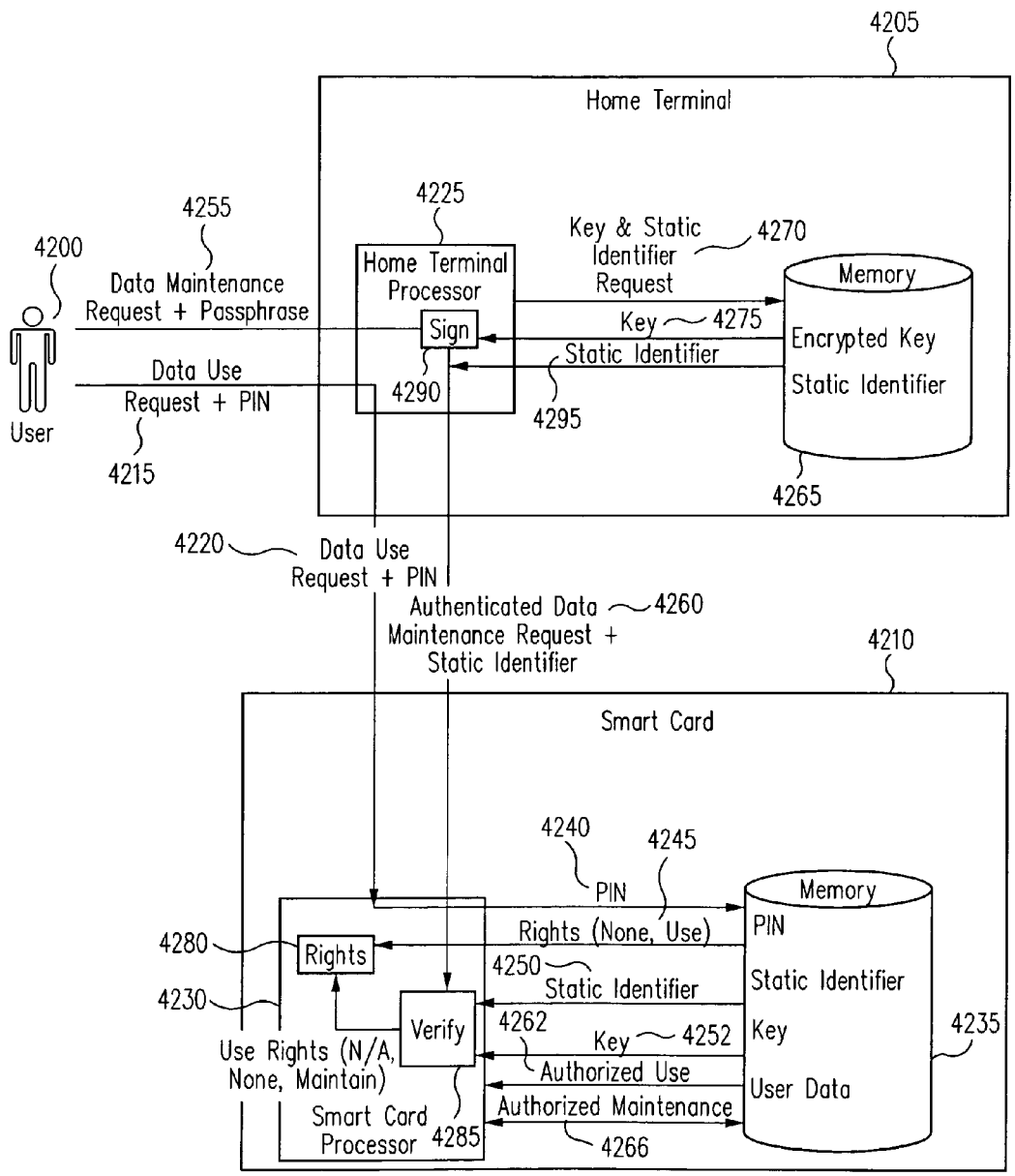
FIG. 42 is a block diagram that illustrates an apparatus for maintaining user data stored on a smart card where maintenance of the user data is controlled by an authenticated data maintenance request and a static identifier, and where use of the user data is controlled by a personal identification number (PIN), in accordance with one embodiment of the present invention.
Figure 43:
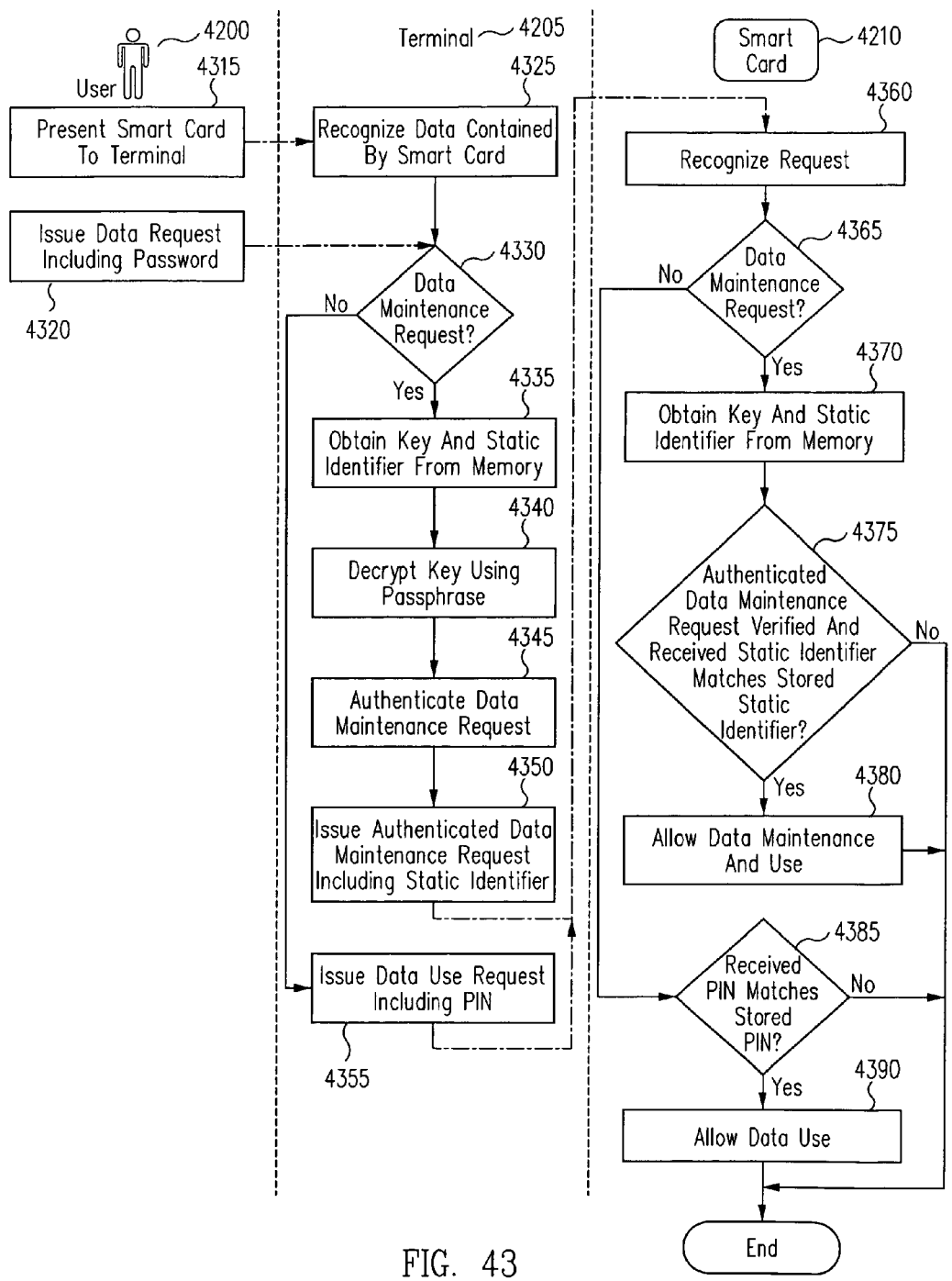
FIG. 43 is a flow diagram that illustrates a method for maintaining user data stored on a smart card where maintenance of the user data is controlled by an authenticated data maintenance request and a static identifier, and where use of the user data is controlled by a personal identification number (PIN), in accordance with one embodiment of the present invention.

FIGS. 42 and 43 illustrate using a passphrase with an authenticated data maintenance request and a static identifier unique to a terminal and shared by a smart card to maintain user data stored on the smart card, in accordance with embodiments of the present invention. FIGS. 42 and 43 combine use of a static key, as illustrated with respect to FIGS. 31 and 34, with use of a static identifier as illustrated with respect to FIGS. 29 and 30.

Turning now to FIG. 42, a block diagram illustrates an apparatus for maintaining user data stored on a smart card where maintenance of the user data is controlled by an authenticated data maintenance request, and where use of the user data is controlled by a personal identification number (PIN), in accordance with one embodiment of the present invention. As shown in FIG. 42, a home terminal 4205 includes home terminal processor 4225 and a memory 4265 storing an encrypted key and a static identifier. Home terminal processor 4225 is adapted to receive a data request including a password, e.g., data maintenance request 4255 including a passphrase or data use request 4215 including a PIN. If the data request includes data maintenance request 4255, home terminal processor 4225 is further adapted to retrieve the encrypted key 4275 and static identifier 4295 from a memory 4265 storing the encrypted key and the static identifier, use the passphrase to decrypt the encrypted key, use the key to authenticate the data maintenance request, and forward the authenticated data maintenance request with the static identifier 4260 to smart card 4210, as described more completely below. If the data request includes data use request 4215, home terminal processor 4225 is further adapted to forward a data use request 4220 including a PIN to smart card 4210.

Still referring to FIG. 42, smart card 4210 includes a smart card processor 4230 and a memory 4235. Memory 4235 stores data including a PIN, a static identifier, a key, and user data. According to one embodiment of the present invention, smart card processor 4230 includes one or more rights flags 4280 for indicating whether end-user 4200 has use rights with respect to the user data stored in memory 4235. For example, received PIN 4240 is used to retrieve use rights 4245 associated with PIN 4240 from memory 4235, and a rights flag is configured based on the use rights, if the use rights are other than none.

According to one embodiment of the present invention, the one or more rights flags 4280 are stored in a transient memory area. The use of one or more rights flags 4280 is optional. Each of the one or more rights flags 4280 describes one or more rights end-user 4200 has to the user data stored in memory 4235.

Smart card processor 4230 is adapted to recognize the data request including a password, either request 4220 or request 4260, received from home terminal 4205. Verification unit 4285 of smart card processor 4230, in one embodiment, is adapted to use key 4252 and static identifier 4250 in memory 4235, e.g., retrieve key 4252 and static identifier 4250, to verify the authenticated data maintenance request 4260 and static identifier received from home terminal 4205. Smart card processor 4230 is further adapted to allow authenticated data maintenance 4266 and use 4262 if the received authenticated data maintenance request 4260 is verified, and if the received static identifier matches static identifier 4250 stored in memory 4235 of smart card 4210. Optionally, verification unit 4285 configures one of one or more rights flags 4280 to represent the rights of end-user 4200. Smart card processor 4230 is further adapted to allow the requested use 4262 of the data if the received password matches the PIN stored in memory 4235.

According to one embodiment of the present invention, as indicated above, smart card processor 4230 includes one or more rights flags 4280 for indicating whether end-user 4200 has maintenance rights, use rights, or both with respect to user data stored in memory 4235. One of the one or more rights flag 4280 is set the first time a data request including a password is received in a session for an application and that password is associated with rights for data stored in memory 4235. For subsequent data requests that do not include a password, processor 4230 references one or more rights flag 4280 to determine whether the data request should be allowed.

According to one embodiment of the present invention, a PIN is used in a challenge-response protocol initiated by a smart card. According to another embodiment of the present invention, a password includes a picture PIN.

As shown in FIG. 42, authenticated data maintenance request 4260 produced by signature unit 4290 is not based on static identifier 4295. According to another embodiment of the present invention, authenticated data maintenance request 4260 produced by signature unit 4290 is based at least in part on the static identifier 4295

As shown in FIG. 42, home terminal 4205 includes memory 4265. According to another embodiment of the present invention, memory 4265 resides on a remote network device (not shown in FIG. 42) coupled to processor 4225. A cryptographic protocol between home terminal 4205 and the remote network device may be used to protect integrity of the data stored in memory 4265.

Turning now to FIG. 43, a flow diagram illustrates a method for maintaining user data stored on a smart card where maintenance of the user data is controlled by an authenticated data maintenance request and a static identifier, and where use of the user data is controlled by a personal identification number (PIN), in accordance with one embodiment of the present invention. In one embodiment, the process illustrated in FIG. 43 is implemented using the elements of FIG. 42. The processes illustrated in FIG. 43 may be implemented using hardware, software, firmware, or a combination thereof.

In process 4315, end-user 4200 presents a smart card 4210 to terminal 4205. In process 4325, terminal 4205 recognizes data contained on smart card 4210.

In process 4320, end-user 4200 issues a data request including a password, e.g., one of data maintenance request plus a passphrase 4255 and data use request and a PIN 4215, to terminal 4205. Terminal 4205 receives the data request in check process 4330, and determines whether the data request is a data maintenance request where the password includes a passphrase.

If the received data request is a data maintenance request, process 4335 on terminal 4205 obtains a stored key and a stored static identifier from a memory, e.g., issues key and static identifier request 4270 to memory 4265 and in response receives encrypted key 4275 and static identifier 4295. In process 4340, encrypted key 4275 is decrypted using the passphrase to generate a key. See FIGS. 32 and 33, for example. In process 4345, the key is used to authenticate the received data maintenance request. For example, a signature module 4290 uses the key to sign the received data maintenance request. Process 4350 issues authenticated data maintenance request including static identifier 4260 to smart card 4210.

If check process 4330 determines that the received data request is not a data maintenance request, the data request is a data use request including a PIN and check process 4330 transfers to process 4355 on terminal 4205. Process 4355 issues data use request including the PIN 4220 to smart card 4210.

According to one embodiment of the present invention, end-user 4200 explicitly requests use or maintenance of the data. According to another embodiment of the present invention, end-user 4200 implicitly requests use or maintenance of the data as a result of interaction with terminal 4205. By way of example, the interaction of end-user 4200 with terminal 4205 may trigger a request for use or maintenance of data on smart card 4210, which in turn triggers a request to end-user 4200 for a PIN or passphrase that controls the data stored on smart card 4210.

Still referring to FIG. 43, in process 4360 smart card 4210 recognizes that a data request was received from terminal 4205. In check process 4365, smart card 4210 determines whether the received data request includes an authenticated data maintenance request with a static identifier or a data use request including a PIN.

If the received data request includes an authenticated data maintenance request with a static identifier, process 4370 retrieves key 4252 and static identifier 4250 from a memory 4235 on smart card 4210.

Check process 3475 verifies the authenticated data maintenance request and determines whether retrieved static identifier 4250 matches the received static identifier. If both the authenticated data maintenance request is verified and the static identifiers match, check process 4375 transfers to allow data maintenance and use process 4380 and otherwise processing ends. Use and maintenance of the data 4266 is allowed by process 4380.

If check process 4365 determined that the data request does not include an authenticated data maintenance request, processing transfers to check process 4385. Check process 4385 determines whether the received password matches a PIN stored on smart card 4210. If the received password matches a PIN stored on smart card 4210, check process 4385 transfers to allow data use process 4390 and otherwise processing ends. Authorized use of the data 4262 is allowed in process 4390.

Figure 44:
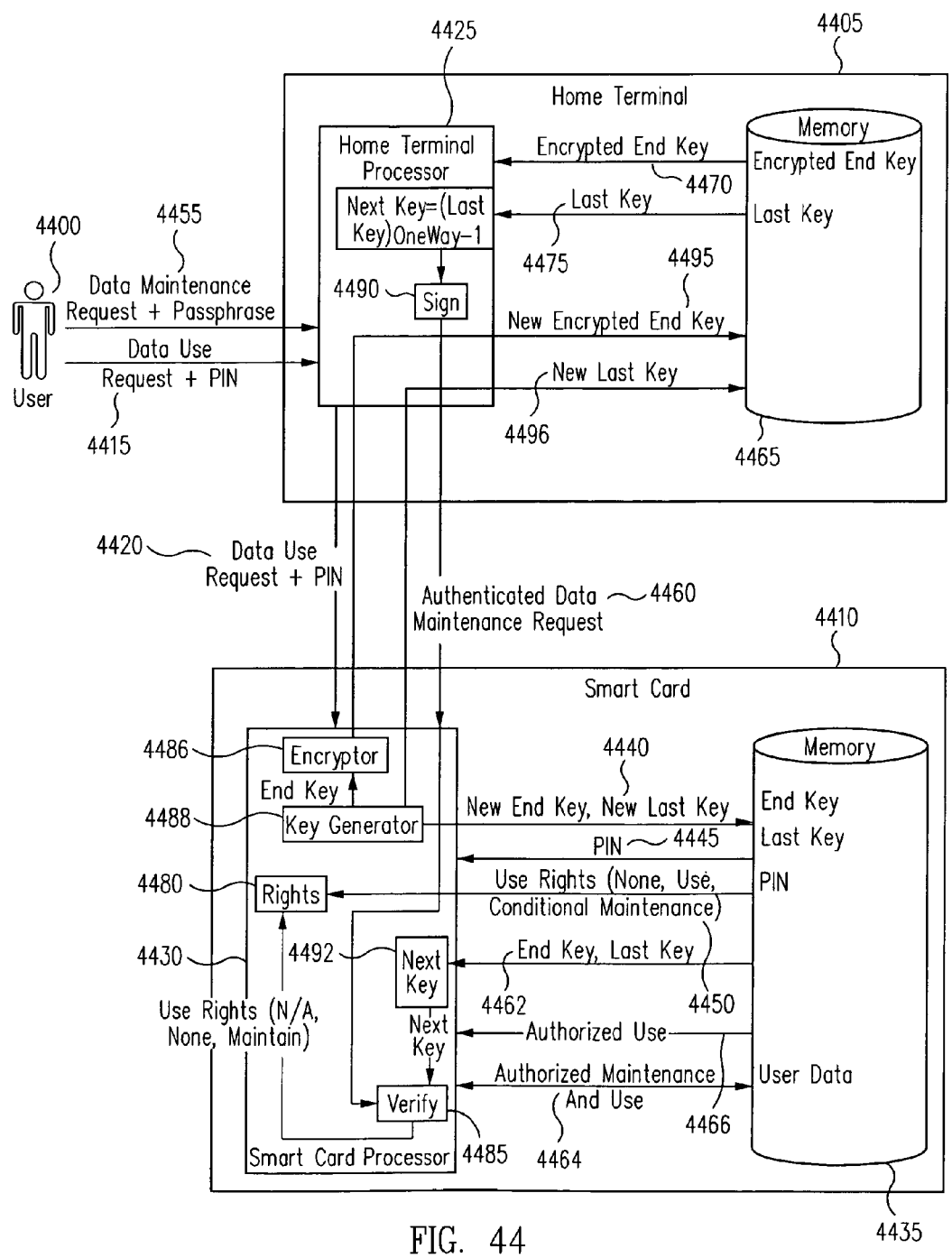
FIG. 44 is a block diagram that illustrates an apparatus for maintaining user data stored on a smart card where maintenance of the user data is controlled by an authenticated data maintenance request and a dynamic key, and where use of the user data is controlled by a personal identification number (PIN), in accordance with one embodiment of the present invention.
Figure 45:
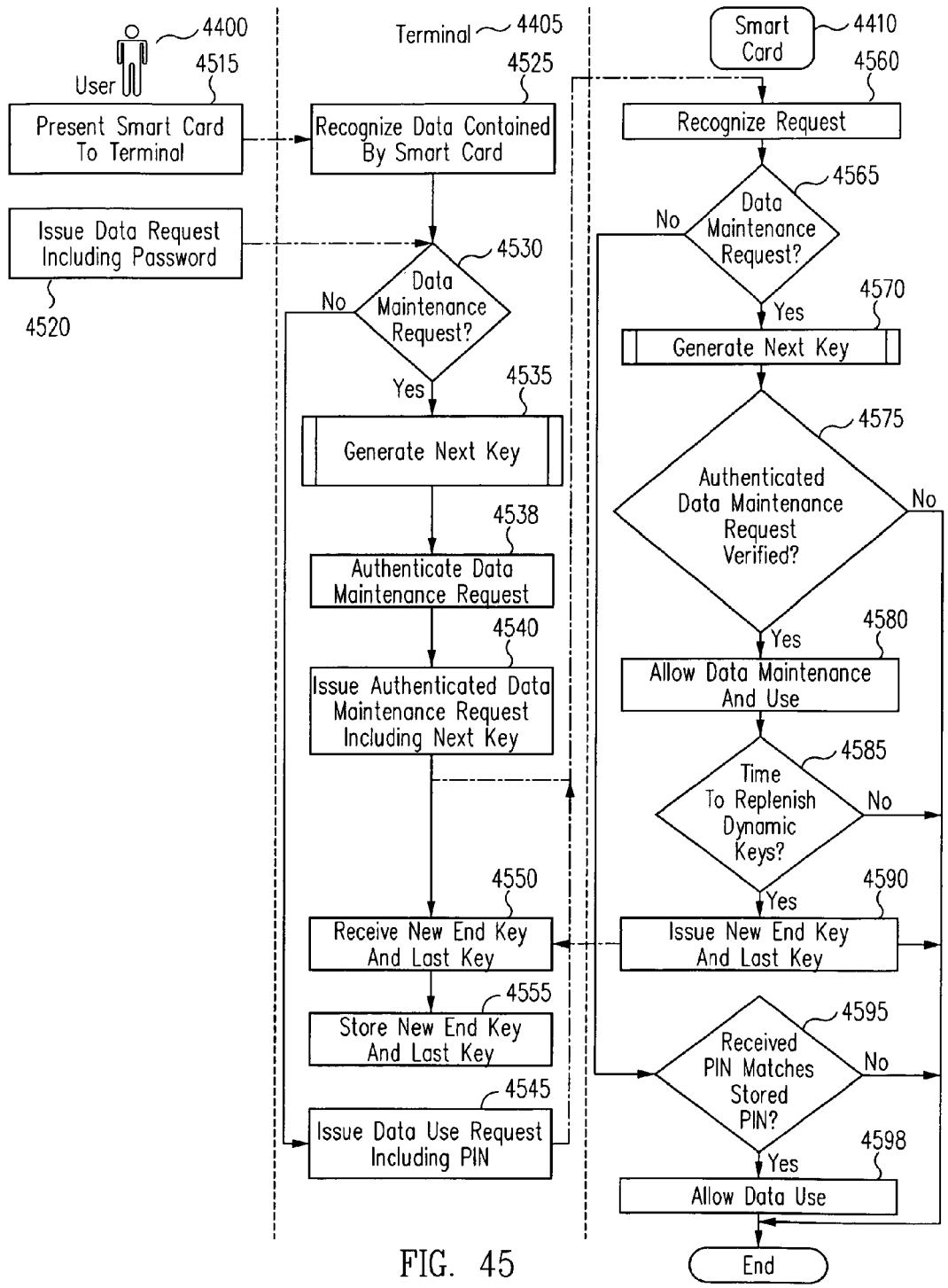
FIG. 45 is a flow diagram that illustrates a method for maintaining user data stored on a smart card where maintenance of the user data is controlled by an authenticated data maintenance request and a dynamic key, and where use of the user data is controlled by a personal identification number (PIN), in accordance with one embodiment of the present invention.

FIGS. 44 and 45 illustrate using an authenticated data maintenance request created using a dynamic key unique to a terminal and shared by a smart card to maintain user data stored on the smart card, in accordance with embodiments of the present invention. The structures and methods of FIGS. 44 and 45 combine the use of dynamic identifiers illustrated with respect to FIGS. 39 and 40 (to create dynamic cryptographic keys), with use of a cryptographic key as illustrated with respect to FIGS. 31 to 34.

Turning now to FIG. 44, a block diagram illustrates an apparatus for maintaining user data stored on a smart card where maintenance of the user data is controlled by an authenticated data maintenance request and a dynamic key, and where use of the user data is controlled by a personal identification number (PIN), in accordance with one embodiment of the present invention. As shown in FIG. 44, a home terminal 4405 includes home terminal processor 4425 and a memory 4465 for storing an encrypted end key and a last key.

Home terminal processor 4425 is further adapted to (i) receive a data request including a password, e.g., either data maintenance request 4455 including a passphrase, or data use request 4415 including a PIN; (ii) if data maintenance request 4455 is received: (a) determine a memory 4465 storing the encrypted end key and the last key and retrieve the two keys 4470, 4475; (b) use the passphrase to decrypt the encrypted end key to obtain an end key; and (c) authenticate the data maintenance request using a next key generated from the end key and last key 4475; and (iii) forward a data request including a password to a smart card 3910, e.g., either authenticated data maintenance request 4460 or data use request 4420 including the PIN.

Still referring to FIG. 44, smart card 4410 includes a smart card processor 4430 and a memory 4435. Memory 4435 is for storing data including a PIN, an end key, a last key, and user data.

According to one embodiment of the present invention, smart card processor 4430 includes one or more rights flags 4480 for indicating whether end-user 4400 has use rights with respect to the user data stored in memory 4435. According to one embodiment of the present invention, the one or more rights flags 4480 are stored in a transient memory area, sometimes call an impersistent memory area. Each of the one or more rights flags 4480 describes one or more rights end-user 4400 has to the user data stored in memory 4435.

Smart card processor 4430 is adapted to recognize the data request including a password, e.g., either authenticated data maintenance request 4460, or data use request 4420 including the PIN, sent from home terminal 4405. Next key unit 4492 of smart card processor 4430 is adapted to generate a next key based at least in part on end key and last key 4462 stored in memory 4435. Verification unit 4485 of smart card processor 4430 is adapted to use the next key generated by the next key unit 4492 to verify received authenticated data maintenance request 4460. Smart card processor 4430 is further adapted to allow data maintenance and use 4464 if the received authenticated data maintenance request 4460 is verified. Smart card processor 4430 is further adapted to allow requested use of the data 4466 if the received password matches a PIN 4445 stored in memory 4435 of smart card 4410.

Key generator 4488 of smart card processor 4430 is adapted to issue a new end key and a new last key 4440 for storage in memory 4435 after key generator 4488 has determined that a pool of available dynamic keys should be replenished. Encryptor 4486 is adapted to encrypt the new end key generated by key generator 4488. Smart card processor 4410 is further adapted to issue encrypted new end key 4495 and new last key 4496 for storage in memory 4465 of home terminal 4405.

According to one embodiment of the present invention, smart card processor 4430 includes optional one or more rights flags 4480 for indicating whether end-user 4400 has maintenance rights or use rights with respect to user data stored in memory 4435. One of one or more rights flag 4480 is configured the first time a data use request including a PIN or an authenticated data maintenance request is received in a session for an application and at least that PIN is associated with user rights 4450 for data stored in memory 4435 or the received authenticated maintenance request is received and verification unit 4485 configures a rights flag upon verifying the maintenance request. For subsequent data requests that do not include a password, processor 4430 references one or more rights flag 4480 to determine whether the data request should be allowed.

According to one embodiment of the present invention, a PIN is used in a challenge-response protocol initiated by smart card 4410. According to another embodiment of the present invention, a password includes a picture PIN.

As shown in FIG. 44, home terminal 4405 includes memory 4465. According to another embodiment of the present invention, memory 4465 resides on a remote network device (not shown in FIG. 44) coupled to home terminal 4405. A cryptographic protocol between home terminal 4405 and the remote network device may be used to protect integrity of the data stored in memory 4465.

Turning now to FIG. 45, a flow diagram illustrates a method for maintaining user data stored on a smart card where maintenance of the user data is controlled by a passphrase and a dynamic key, and where use of the user data is controlled by a personal identification number (PIN), in accordance with one embodiment of the present invention. In one embodiment, the process illustrated in FIG. 45 is implemented using the elements of FIG. 44. The processes illustrated in FIG. 45 may be implemented using hardware, software, firmware, or a combination thereof.

In process 4515, an end-user 4400 presents a smart card 4410 to a terminal 4405. In process 4525 on terminal 4405, terminal 4405 recognizes data contained on smart card 4410.

In process 4520, end-user 4400 issues a data request including a password, e.g., one of a passphrase and a PIN. The data request is issued using terminal 4405 in one embodiment.

Data maintenance request check process 4530 on terminal 4405 receives the data request sent from process 4520, and determines whether the data request is a data maintenance request where the password includes a passphrase. If the received data request is a data maintenance request, process 4535 generates a next key, as explained more completely below. Following completion of process 4535, process 4538 uses the next key to authenticate the data maintenance request. Process 4540 on terminal 4405 issues authenticated data maintenance request 4460 to smart card 4410.

If check process 4530 determines that the received data request is not a data maintenance request, the data request is a data use request including a PIN. Thus, check process 4530 transfers to process 4545 on terminal 4405. Process 4545, in turn, issues data use request 4420 including the PIN to smart card 4410.

According to one embodiment of the present invention, end-user 4400 explicitly requests use or maintenance of the data. According to another embodiment of the present invention, end-user 4400 implicitly requests use or maintenance of the data as a result of interaction with terminal 4405. By way of example, the interaction of end-user 4400 with terminal 4405 may trigger a request for use or maintenance of data on smart card 4410, which in turn triggers a request to end-user 4400 for a PIN or passphrase that controls the data stored on smart card 4410.

Still referring to FIG. 45, process 4560 on smart card 4410 recognizes a data request from terminal 4405, e.g., a data request is received and recognized. Check process 4565 on smart card 4410 determines whether the received data request includes an authenticated data maintenance request, or a data use request including a PIN.

If the received data request includes an authenticated data maintenance request, process 4570 on smart card 4410 generates a next key. Check process 4575 uses the next key to verify the received authenticated data maintenance request. If the verification is successful, check process 4575 transfers to process 4580 and otherwise processing on smart card 4410 ends. Process 4580 on smart card 4510 allows maintenance and use of the data 4464.

Since a dynamic key has been used, process 4580 transfers to time to replenish dynamic keys check operation 4585. Check operation 4585 determine whether a pool of available dynamic keys needs replenishment. When check operation 4585 determines the pool of available dynamic keys need replenishment, processing transfers to process 4590 on smart card 4410 and otherwise processing on smart card 4410 ends.

In process 4590, smart card 4410 issues a new end key and a new last key to terminal 4405 and updates memory 4435 with the new end key and new last key for subsequent use. The new end key and new last key replace the end key and last key, respectively, stored in memory 4435.

Terminal 4405 receives the new end key and the new last key in process 4550. Process 4555 on terminal 4505 stores the new end key and the new last key for subsequent use, replacing the previous ones and processing on terminal 4405 ends.

If the received data request on smart card 4410 does not includes an authenticated data maintenance request, check process 4565 transfers processing to check process 4595. Check process 4595 determines whether the received password matches a PIN stored on smart card 4410. If the received password matches a PIN stored on smart card 4410, check process 4595 transfers to process 4598 and otherwise processing ends on smart card 4410. Process 4598 allows use of the data 4462 and then processing on smart card 4410 ends.

According to one embodiment of the present invention, dynamic keys are created by repeatedly applying a cryptographic one-way function to create a chain of keys. Each application of the cryptographic one-way function uses the result of the previous cryptographic one-way function as an input. An end key is described as the first key (the first input to a cryptographic one-way function). Dynamic keys are allocated in reverse order of creation.

Figure 46:
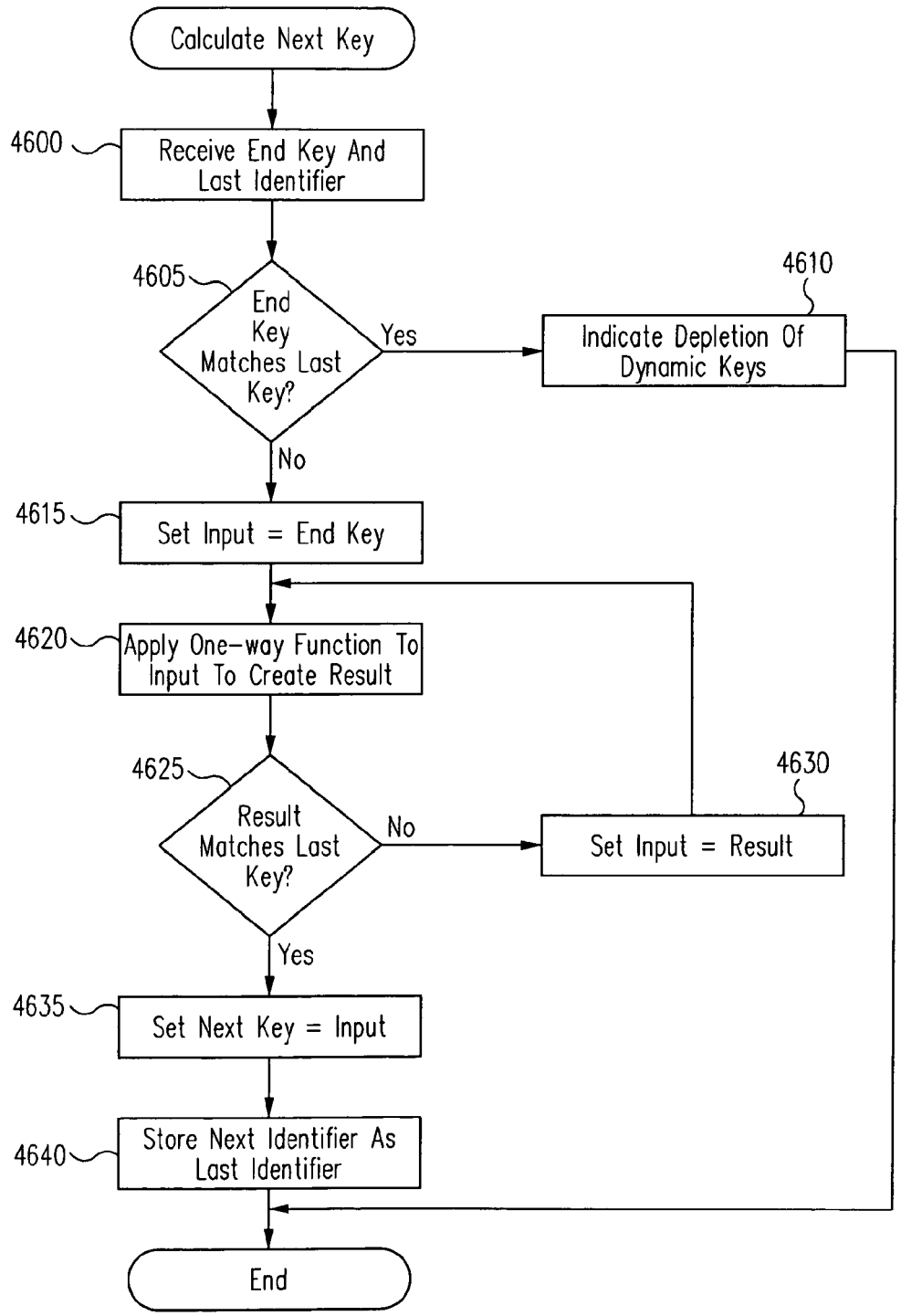
FIG. 46 is a flow diagram that illustrates a method for calculating a next key in accordance with one embodiment of the present invention.

Turning now to FIG. 46, a flow diagram illustrates a method for calculating a next key in accordance with one embodiment of the present invention. FIG. 46 provides more detail for one embodiment of processes 4535 and 4570 of FIG. 45. The processes illustrated in FIG. 46 may be implemented using hardware, software, firmware, or a combination thereof. FIG. 46 is similar to FIG. 41, except FIG. 46 illustrates the creation of dynamic cryptographic keys whereas FIG. 41 illustrates the creation of dynamic identifiers.

Beginning with an end key as an input, a cryptographic one-way function is repeatedly applied to the previous cryptographic one-way function result until the result of the cryptographic one-way function matches the last key. The input to the cryptographic one-way function that produced the result is set as the next key.

In more detail, process 4600 receives an end key and a last key retrieved from memory and transfers to process 4605. Process 4605 determines whether the end key matches the last key. If the end key matches the last key, check operation 4605 transfers to process 4610, which in turn generates an indication that the pool of dynamic keys has been depleted and next key generation processing ends.

Conversely, if the end key does not match the last key, check process 4605 transfers to process 4615. Process 4615 sets an input value to the value of the end key. Next, process 4620 applies a cryptographic one-way function to the input to create a result.

Check operation 4625 determines whether the result matches the last key. If the result does not match the last key, check operation 4625 transfers to process 4630. Process 4630 sets the input to the value of the result and transfers back to process 4620. Processing transfers through processes 4625, 4630 and 4620 until in check process 4625 the result matches the last key. When check process 4625 detects a match processing transfers to process 4635. Process 4635 sets the next key to the input and transfers to process 4640. Process 4640 overwrites the last key stored in memory with the next key so that the new next key becomes the last key and processing to generate the next key ends.

According to one embodiment of the present invention, another determination whether the end key matches the last key (as in process 4605) is made after setting the new input value in process 4630. If the end key matches the last key, depletion of dynamic keys is indicated as in process 4610. If the end key does not match the last key, computation of the next result is performed at process 4620.

Figure 47:
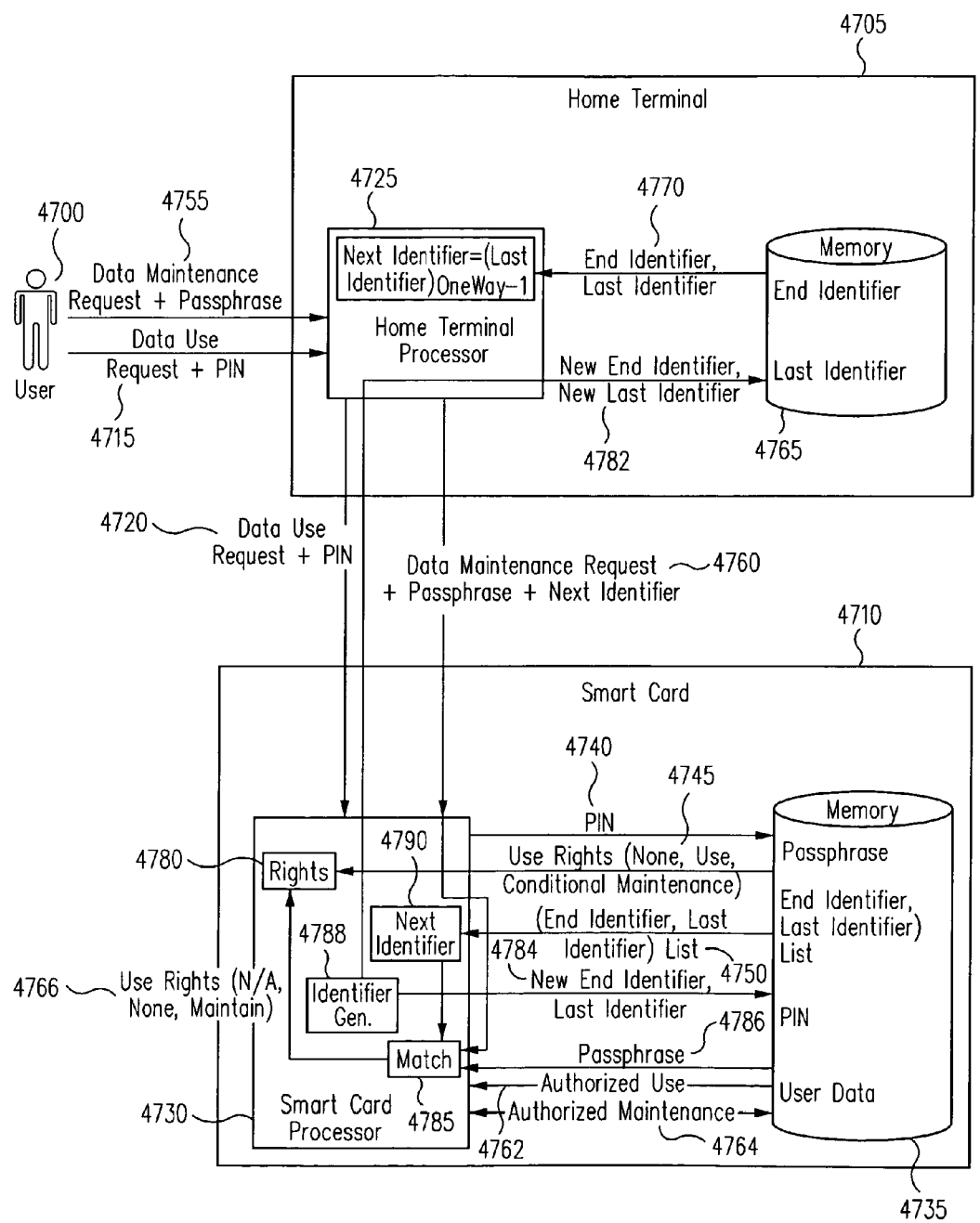
FIG. 47 is a block diagram that illustrates an apparatus for maintaining user data stored on a smart card where maintenance of the user data is controlled by a passphrase and a dynamic identifier unique to one of a plurality of terminals, and where use of the user data is controlled by a personal identification number (PIN), in accordance with one embodiment of the present invention.
Figure 48:
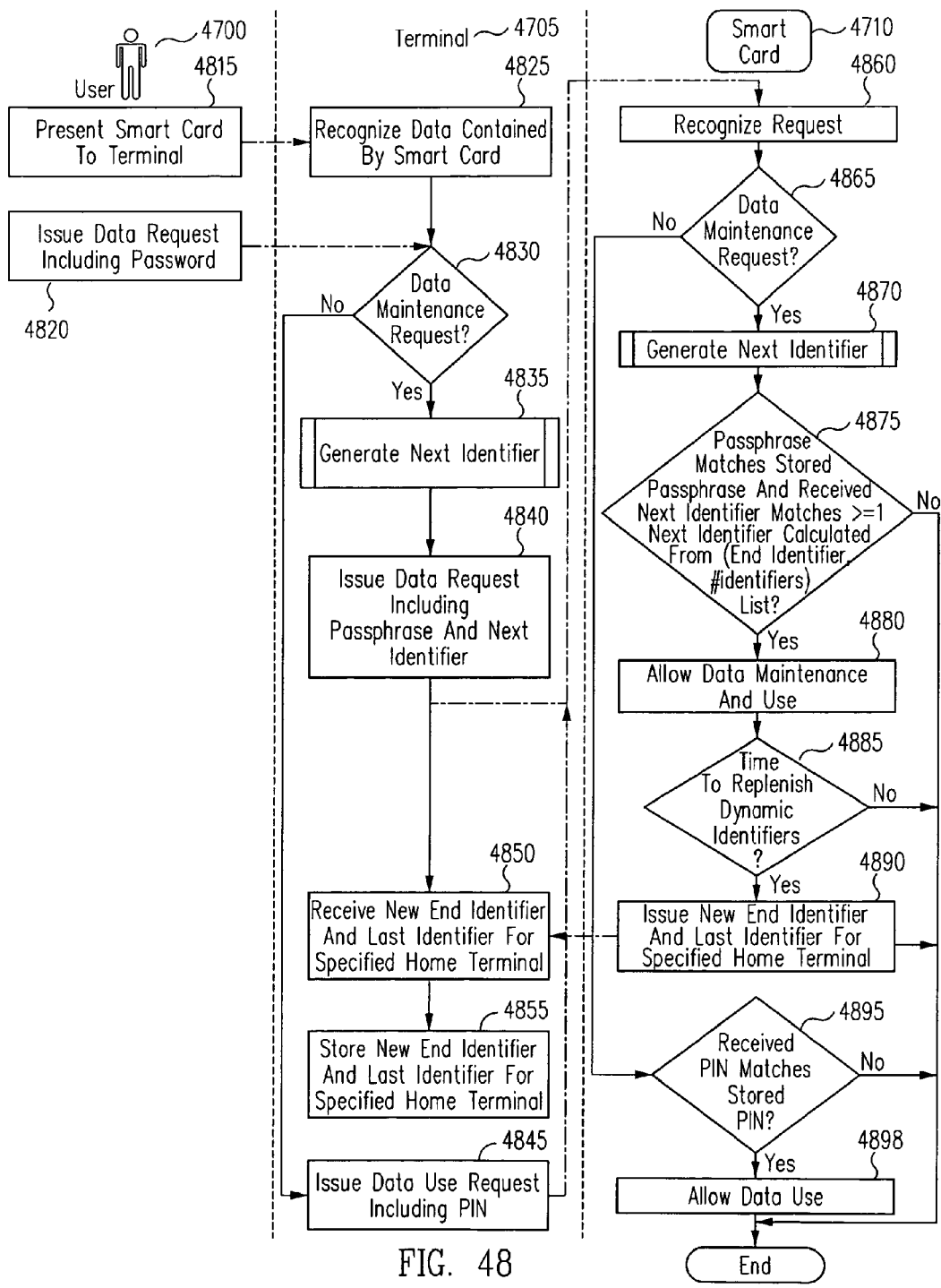
FIG. 48 is a flow diagram that illustrates a method for maintaining user data stored on a smart card where maintenance of the user data is controlled by a passphrase and a dynamic identifier unique to one of a plurality of terminals, and where use of the user data is controlled by a personal identification number (PIN), in accordance with one embodiment of the present invention.

FIGS. 47 and 48 illustrate using a passphrase and a dynamic identifier unique to one of multiple terminals and shared by a smart card to maintain user data stored on a smart card, in accordance with embodiments of the present invention. FIGS. 47 and 48 are similar to FIGS. 39 and 40, except that embodiments illustrated by FIGS. 47 and 48 support multiple home terminals, each with possibly different identifiers, while embodiments illustrated by FIGS. 39 and 40 support a single home terminal. Thus in embodiments illustrated in FIGS. 47 and 48, a smart card maintains a list of (end identifier, last identifier) pairs corresponding to home terminals, and a next identifier received with a data maintenance request is matched against next identifiers computed from the (end identifier, last identifier) pairs in the list.

Turning now to FIG. 47, a block diagram illustrates an apparatus for maintaining user data stored on a smart card where maintenance of the user data is controlled by a passphrase and a dynamic identifier unique to one of a plurality of terminals, and where use of the user data is controlled by a personal identification number (PIN), in accordance with one embodiment of the present invention. As shown in FIG. 47, a home terminal 4705 includes home terminal processor 4725 and a memory 4765 for storing an end identifier and a last identifier.

Home terminal processor 4725 is further adapted to (i) receive a data request including a password, e.g., either data maintenance request 4755 including a passphrase, or data use request 4715 including a PIN; (ii) determine a memory 4765 storing the end identifier and the last identifier if the data request includes a data maintenance request 4755; and (iii) forward a data request including a password to a smart card 4710, e.g., either data maintenance request 4760 including the passphrase and a next identifier generated using the stored end identifier and last identifier, or data use request 4720 including the PIN.

Still referring to FIG. 47, smart card 4710 includes a smart card processor 4730 and a memory 4735. Memory 4735 is for storing data including a passphrase, a PIN, a list of end identifiers and their associated last identifiers, and user data.

According to one embodiment of the present invention, smart card processor 4730 includes one or more rights flags 4780 for indicating whether end-user 4700 has use rights with respect to the user data stored in memory 4735. According to one embodiment of the present invention, one or more rights flags 4780 are stored in a transient memory area, sometimes called an impersistent memory area. Each of the one or more rights flags 4780 describes one or more rights end-user 4700 has to the user data stored in memory 4735.

Smart card processor 4730 is adapted to recognize a data request including a password, e.g., either data maintenance request 4760 including the passphrase and next identifier, or data use request 4720 including the PIN, sent from home terminal 4705. Next identifier unit 4790 of smart card processor 4730 is adapted to generate one or more next identifiers based at least in part on the list of end identifiers and their associated last identifiers as stored in memory 4735. Match unit 4785 of smart card processor 4730 is adapted to determine (i) whether the received password matches a passphrase 4786 stored in memory 4735 and (ii) whether the received next identifier matches one of the one or more next identifiers generated by next identifier unit 4790 using the list of end identifiers and last identifiers 4750 stored in memory 4735. In one embodiment, match unit 4785 configures a rights flag to a state that corresponds with user rights 4766 determined by match unit 4785. Smart card processor 4730 is further adapted to allow data maintenance 4764 and use 4762 if the received password matches passphrase 4786 and if the received next identifier matches one of the one or more next identifiers generated by next identifier unit 4790.

Smart card processor 4730 is further adapted to allow the requested use 4762 of the user data if the received password matches a PIN 4740 stored in memory 4735 of smart card 4710. In one embodiment, if the PINs match, a rights flag is configured to correspond to rights 4745 associated with stored PIN 4740.

Identifier generator 4788 of smart card processor 4730 is adapted to issue a new end identifier and a new last identifier after determining a pool of available dynamic identifiers needs replenishment. New end identifier and new last identifier 4782 are sent to home terminal 4705 for storage in memory 4735. New end identifier and new last identifier 4784 are stored in the list in memory 4735 replacing the corresponding old identifiers in the list. New end identifier and new last identifier 4782 and new end identifier and new last identifier 4784 are the same new end identifier and last identifier.

As indicated above, according to one embodiment of the present invention, smart card processor 4730 includes optional one or more rights flags 4780 for indicating whether end-user 4700 has maintenance rights or use rights with respect to user data stored in memory 4735. One of one or more rights flag 4780 is configured the first time a data request including a password is received in a session for an application and at least that password is associated with rights for data stored in memory 4735. Note that for maintenance, the next identifier must also match for configuration of a rights flag. For subsequent data requests that do not include a password, processor 4730 references one or more rights flag 4780 to determine whether the data request should be allowed.

According to one embodiment of the present invention, a PIN is used in a challenge-response protocol initiated by smart card 4710. According to another embodiment of the present invention, a password includes a picture PIN.

As shown in FIG. 47, home terminal 4705 includes memory 4765. According to another embodiment of the present invention, memory 4765 resides on a remote network device (not shown in FIG. 47) coupled to home terminal 4705. A cryptographic protocol between home terminal 4705 and the remote network device may be used to protect integrity of the data stored in memory 4765.

Turning now to FIG. 48, a flow diagram illustrates a method for maintaining user data stored on a smart card where maintenance of the user data is controlled by a passphrase and a dynamic identifier unique to one of a plurality of terminals, and where use of the user data is controlled by a personal identification number (PIN), in accordance with one embodiment of the present invention. In one embodiment, the process illustrated in FIG. 48 is implemented using the elements of FIG. 47. The processes illustrated in FIG. 48 may be implemented using hardware, software, firmware, or a combination thereof.

In process 4815, an end-user 4700 presents a smart card 4710 to a terminal 4705. In process 4825 on terminal 4705, terminal 4705 recognizes data contained on smart card 4710.

In process 4820, end-user 4700 issues a data request including a password, e.g., one of a passphrase and a PIN. The data request is issued using terminal 4705 in one embodiment.

Data maintenance request check process 4830 on terminal 4705 receives the data request sent from process 4820, and determines whether the data request is a data maintenance request where the password includes a passphrase. If the received data request is a data maintenance request, process 4835 determines a next identifier, as explained above, using end identifier and last identifier 4770 retrieved from memory 4765. Process 4840 on terminal 4705 issues data maintenance request 4760 including the passphrase and the next identifier to smart card 4710.

If check process 4830 determines that the received data request is not a data maintenance request, the data request is a data use request including a PIN. Thus, check process 4830 transfers to process 4845 on terminal 4705. Process 4845, in turn, issues data use request 4720 including the PIN to smart card 4710.

According to one embodiment of the present invention, end-user 4700 explicitly requests use or maintenance of the data. According to another embodiment of the present invention, end-user 4700 implicitly requests use or maintenance of the data as a result of interaction with terminal 4705. By way of example, the interaction of end-user 4700 with terminal 4705 may trigger a request for use or maintenance of data on smart card 4710, which in turn triggers a request to end-user 4700 for a PIN or passphrase that controls the data stored on smart card 4710.

Still referring to FIG. 48, process 4860 on smart card 4710 recognizes a data request from terminal 4705, e.g., a data request is received and recognized. Check process 4865 on smart card 4710 determines whether the received data request includes a data maintenance request including a passphrase and a next identifier, or a data use request including a PIN.

If the received data request includes a data maintenance request including a passphrase and a next identifier, process 4870 on smart card 4710 generates a next identifier for each pair of end identifier and last identifier in the list. Check process 4875 determines (i) whether the received passphrase matches a passphrase stored on smart card 4710, and (ii) whether at least one of the one or more generated next identifiers matches the received next identifier. If the received passphrase matches a passphrase stored on smart card 4710, and if the received next identifier matches at least one of the one or more generated next identifiers, process 4880 on smart card 4810 allows maintenance and use of the data.

Since a dynamic identifier has been used, process 4880 transfers to time to replenish dynamic identifiers check operation 4885. Recall that as described above if the last identifier equals the end identifier in the generation of the next identifier, depletion of the pool of dynamic identifiers is indicated. Check operation 4885 determine whether a pool of available dynamic identifiers needs replenishment. When check operation 4885 determines the pool of available dynamic identifiers need replenishment, processing transfers to process 4890 on smart card 4710 and otherwise processing on smart card 4710 ends.

In process 4890, smart card 4710 issues a new end identifier and a new last identifier to terminal 4705 and updates the list in memory 4735 with the new end identifier and corresponding new last identifier. Terminal 4705 receives the new end identifier and the new last identifier in process 4850. Process 4855 on terminal 4805 stores the new end identifier and the new last identifier for subsequent use, replacing the previous ones, and processing on smart card 4710 ends.

If the received data request on smart card 4710 does not includes a data maintenance request, check process 4865 transfers processing to check process 4895. Check process 4895 determines whether the received password matches a PIN stored on smart card 4710. If the received password matches a PIN stored on smart card 4710, process 4898 allows use of the data and them processing on smart card 4710 ends.

Figure 49:
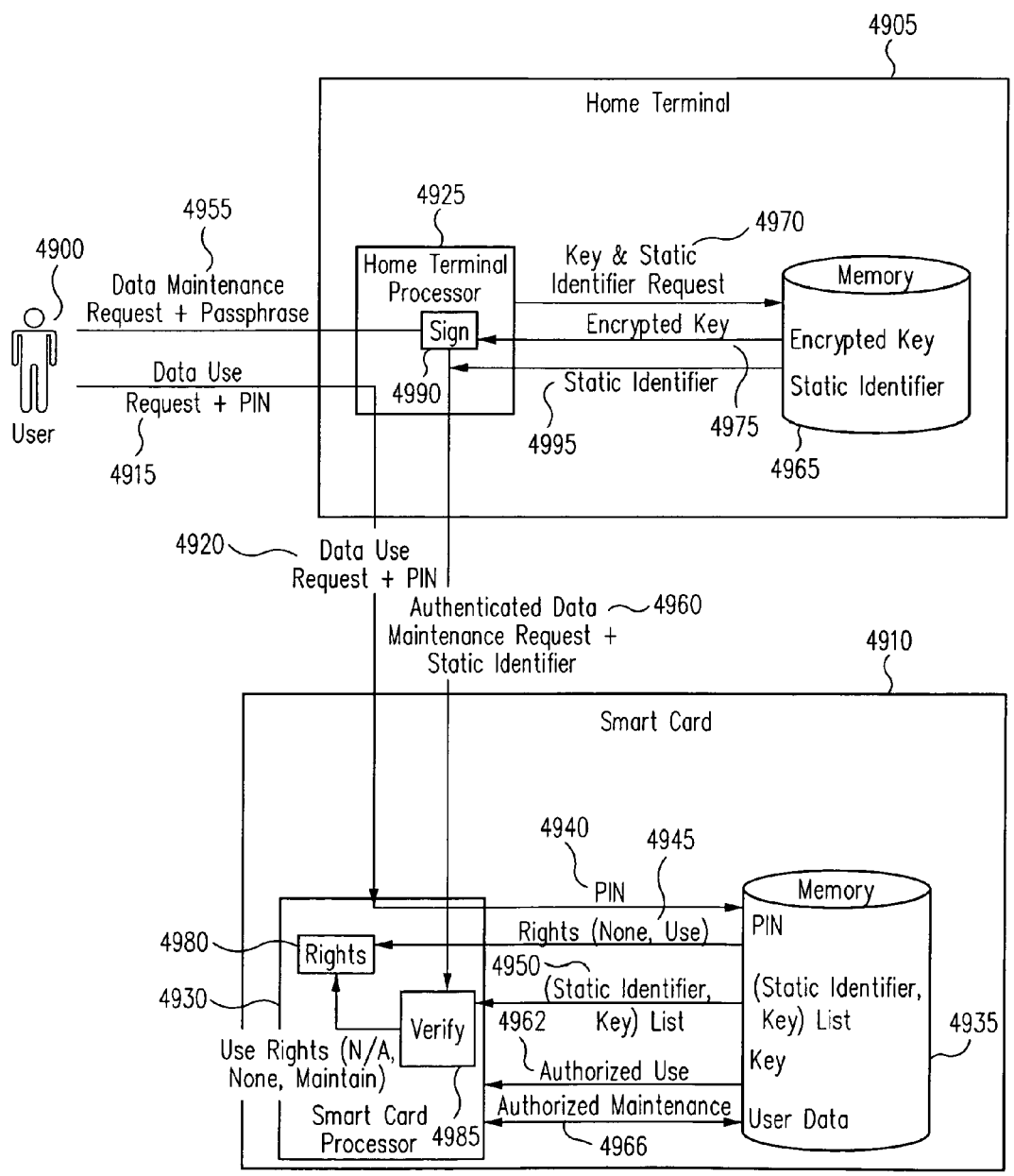
FIG. 49 is a block diagram that illustrates an apparatus for maintaining user data stored on a smart card where maintenance of the user data is controlled by an authenticated data maintenance request and a static identifier unique to one of a plurality of terminals, and where use of the user data is controlled by a personal identification number (PIN), in accordance with one embodiment of the present invention.
Figure 50:
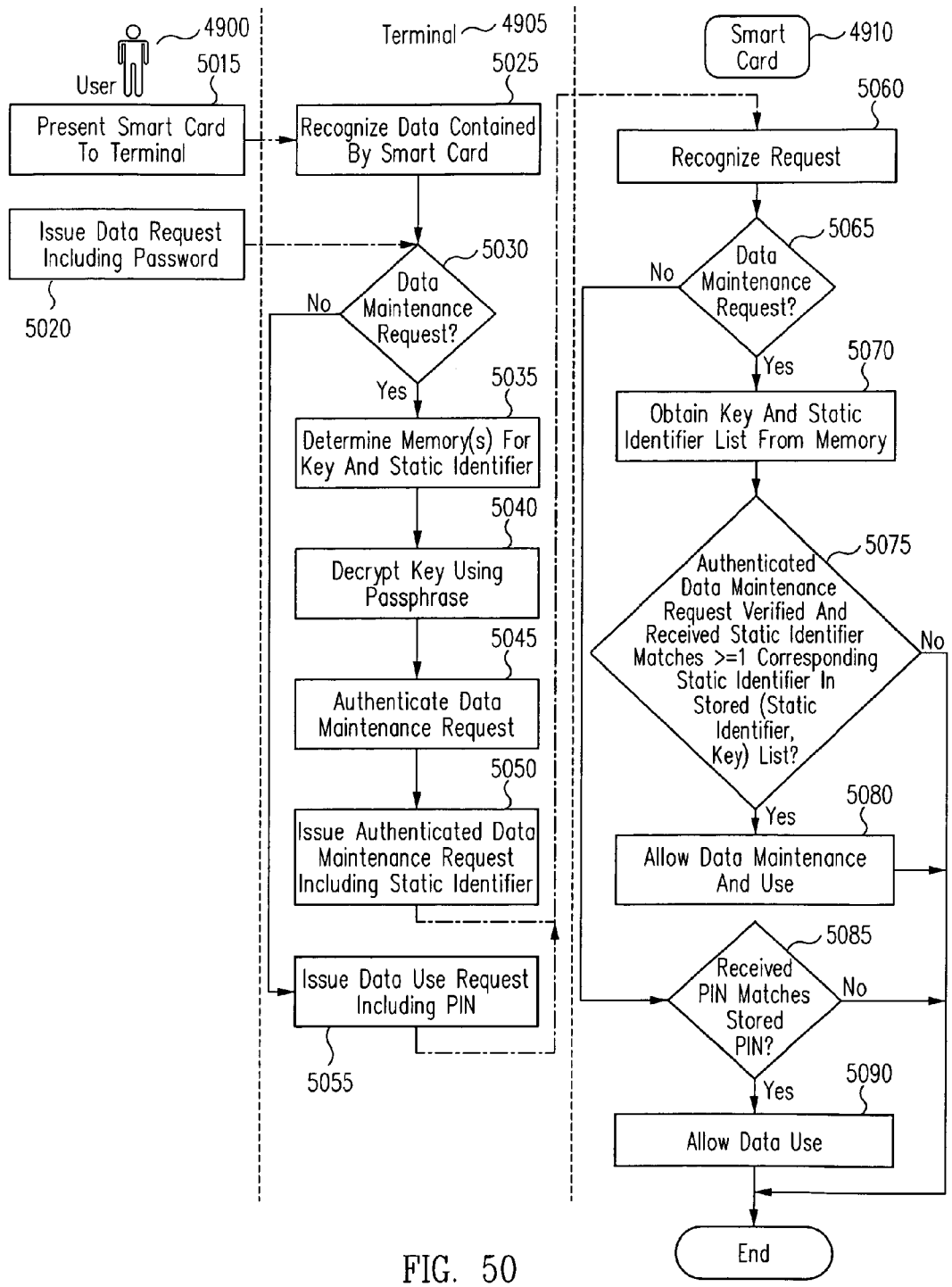
FIG. 50 is a flow diagram that illustrates a method for maintaining user data stored on a smart card where maintenance of the user data is controlled by an authenticated data maintenance request and a static identifier unique to one of a plurality of terminals, and where use of the user data is controlled by a personal identification number (PIN), in accordance with one embodiment of the present invention.

FIGS. 49 and 50 illustrate using an authenticated data maintenance request and a static identifier unique to one of multiple terminals and shared by a smart card to maintain user data stored on a smart card, in accordance with embodiments of the present invention. FIGS. 49 and 50 are similar to FIGS. 42 and 43, except that embodiments illustrated in FIGS. 49 and 50 support multiple home terminals, each with possibly different static identifiers, while embodiments illustrated by FIGS. 42 and 43 support a single home terminal or multiple home terminals with the same static identifier. Thus in embodiments illustrated by FIGS. 49 and 50, a smart card maintains a list of (static identifier, cryptographic key) pairs corresponding to home terminals, and a data maintenance request is allowed if the corresponding authenticated data maintenance request is verified using a cryptographic key in the list and if the cryptographic key's corresponding static identifier matches a static identifier received with the authenticated data maintenance request.

Turning now to FIG. 49, a block diagram illustrates an apparatus for maintaining user data stored on a smart card where maintenance of the user data is controlled by an authenticated data maintenance request, and where use of the user data is controlled by a personal identification number (PIN), in accordance with one embodiment of the present invention. As shown in FIG. 49, a home terminal 4905 includes home terminal processor 4925 and a memory 4965 storing an encrypted key and a static identifier.

Home terminal processor 4925 is adapted to receive a data request including a password, e.g., data maintenance request 4955 including a passphrase or data use request 4915 including a PIN. If the data request includes data maintenance request 4955, home terminal processor 4925 is further adapted to retrieve the encrypted key 4975 and static identifier 4995 from a memory 4965 storing the encrypted key and the static identifier, use the passphrase to decrypt the encrypted key, use the key to authenticate the data maintenance request, and forward the authenticated data maintenance request with the static identifier 4960 to smart card 4910, as described more completely below. If the data request includes data use request 4915, home terminal processor 4925 is further adapted to forward a data use request 4920 including a PIN to smart card 4910.

Still referring to FIG. 49, smart card 4910 includes a smart card processor 4930 and a memory 4935. Memory 4935 stores data including a PIN, a list of keys and their associated static identifiers, and user data. According to one embodiment of the present invention, smart card processor 4930 includes optional one or more rights flags 4980 for indicating whether end-user 4900 has use rights with respect to the user data stored in memory 4935. For example, received PIN 4940 is used to retrieve use rights 4945 associated with PIN 4940 from memory 4935, and a rights flag is configured based on the use rights, if the use rights are other than none.

According to one embodiment of the present invention, the one or more rights flags 4980 are stored in a transient memory area. The use of one or more rights flags 4980 is optional. Each of the one or more rights flags 4980 describes one or more rights end-user 4900 has to the user data stored in memory 4935.

Smart card processor 4930 is adapted to recognize the data request including a password, either request 4920 or request 4960, received from home terminal 4905. Verification unit 4985 of smart card processor 4930, in one embodiment, is adapted to use the list of keys and their associated static identifiers in memory 4935, e.g., retrieve list 4950, to verify the authenticated data maintenance request 4960 and static identifier received from home terminal 4905.

Smart card processor 4930 is further adapted to allow authenticated data maintenance 4966 and use 4962 if the received authenticated data maintenance request 4960 is verified, and if the received static identifier matches the static identifier associated with the key used to verify the received authenticated data maintenance request. Optionally, verification unit 4985 configures one of one or more rights flags 4980 to represent the rights of end-user 4900. Smart card processor 4930 is further adapted to allow the requested use 4962 of the data if the received password matches the PIN stored in memory 4935.

According to one embodiment of the present invention, as indicated above, smart card processor 4930 includes one or more rights flags 4980 for indicating whether end-user 4900 has maintenance rights, use rights, or both with respect to user data stored in memory 4935. One of the one or more rights flag 4980 is set the first time a data request including a password is received in a session for an application and that password is associated with rights for data stored in memory 4935. For subsequent data requests that do not include a password, processor 4930 references one or more rights flag 4980 to determine whether the data request should be allowed.

According to one embodiment of the present invention, a PIN is used in a challenge-response protocol initiated by a smart card. According to another embodiment of the present invention, a password includes a picture PIN.

As shown in FIG. 49, authenticated data maintenance request 4960 produced by signature unit 4990 is not based on static identifier 4995. According to another embodiment of the present invention, authenticated data maintenance request 4960 produced by signature unit 4990 is based at least in part on static identifier 4995

As shown in FIG. 49, home terminal 4905 includes memory 4965. According to another embodiment of the present invention, memory 4965 resides on a remote network device (not shown in FIG. 49) coupled to processor 4925. A cryptographic protocol between home terminal 4905 and the remote network device may be used to protect integrity of the data stored in memory 4965.

Turning now to FIG. 50, a flow diagram illustrates a method for maintaining user data stored on a smart card where maintenance of the user data is controlled by an authenticated data maintenance request and a static identifier unique to one of a plurality of terminals, and where use of the user data is controlled by a personal identification number (PIN), in accordance with one embodiment of the present invention. In one embodiment, the process illustrated in FIG. 50 is implemented using the elements of FIG. 49. The processes illustrated in FIG. 50 may be implemented using hardware, software, firmware, or a combination thereof.

In process 5015, end-user 4900 presents a smart card 4910 to terminal 4905. In process 5025, terminal 4905 recognizes data contained on smart card 4910.

In process 5020, end-user 4900 issues a data request including a password, e.g., one of data maintenance request plus a passphrase 4955 and data use request and a PIN 4915, to terminal 4905. Terminal 4905 receives the data request in check process 5030, and determines whether the data request is a data maintenance request where the password includes a passphrase.

If the received data request is a data maintenance request, process 5035 on terminal 4905 obtains a stored key and a stored static identifier from a memory 4965, e.g., issues key and static identifier request 4970 to memory 4965 and in response receives encrypted key 4975 and static identifier 4995. In process 5040, encrypted key 4975 is decrypted using the passphrase to generate a key. See FIGS. 32 and 33, for example. In process 5045, the key is used to authenticate the received data maintenance request. For example, a signature module 4990 uses the key to sign the received data maintenance request. Process 5050 issues authenticated data maintenance request including the static identifier 4960 to smart card 4910.

If check process 5030 determines that the received data request is not a data maintenance request, the data request is a data use request including a PIN and check process 5030 transfers to process 5055 on terminal 4905. Process 5055 issues data use request including the PIN 4915 to smart card 4910.

According to one embodiment of the present invention, end-user 4900 explicitly requests use or maintenance of the data. According to another embodiment of the present invention, end-user 4900 implicitly requests use or maintenance of the data as a result of interaction with terminal 4905. By way of example, the interaction of end-user 4900 with terminal 4905 may trigger a request for use or maintenance of data on smart card 4910, which in turn triggers a request to end-user 4900 for a PIN or passphrase that controls the data stored on smart card 4910.

Still referring to FIG. 50, in process 5060 smart card 4910 recognizes that a data request was received from terminal 4905. In check process 5065, smart card 4910 determines whether the received data request includes an authenticated data maintenance request with a static identifier or a data use request including a PIN.

If the received data request includes an authenticated data maintenance request with a static identifier, process 5070 retrieves key and static identifier list 4950 from a memory 4935 on smart card 4910.

Check process 5075 verifies the authenticated data maintenance request using the retrieved key and determines whether the received static identifier matches one or more static identifiers associated with the key in list 4950. If both the authenticated data maintenance request is verified and the received static identifier matches one or more static identifiers associated with the key in list 4950, check process 5075 transfers to allow data maintenance and use process 5080 and otherwise processing ends. Use and maintenance of the data 4962, 4966 is allowed by process 5080.

If check process 5065 determined that the data request does not include an authenticated data maintenance request, processing transfers to check process 5085. Check process 5085 determines whether the received password matches a PIN stored on smart card 4910. If the received password matches a PIN stored on smart card 4910, check process 5085 transfers to allow data use process 5090 and otherwise processing ends. Authorized use of the data 4962 is allowed in process 5090.

Figure 51:
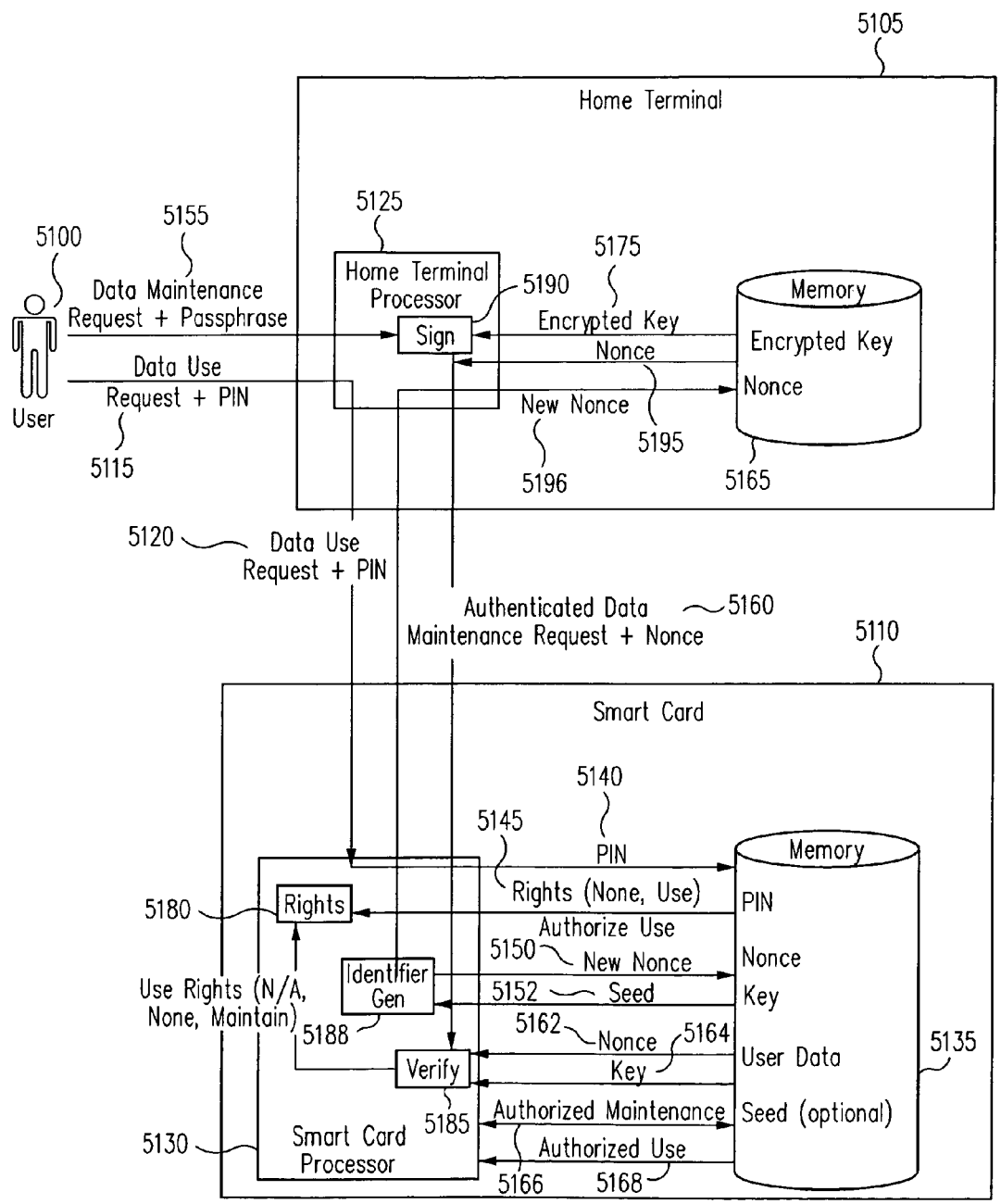
FIG. 51 is a block diagram that illustrates an apparatus for maintaining user data stored on a smart card where maintenance of the user data is controlled by an authenticated data maintenance request and nonce, and where use of the user data is controlled by a personal identification number (PIN), in accordance with one embodiment of the present invention.
Figure 52:
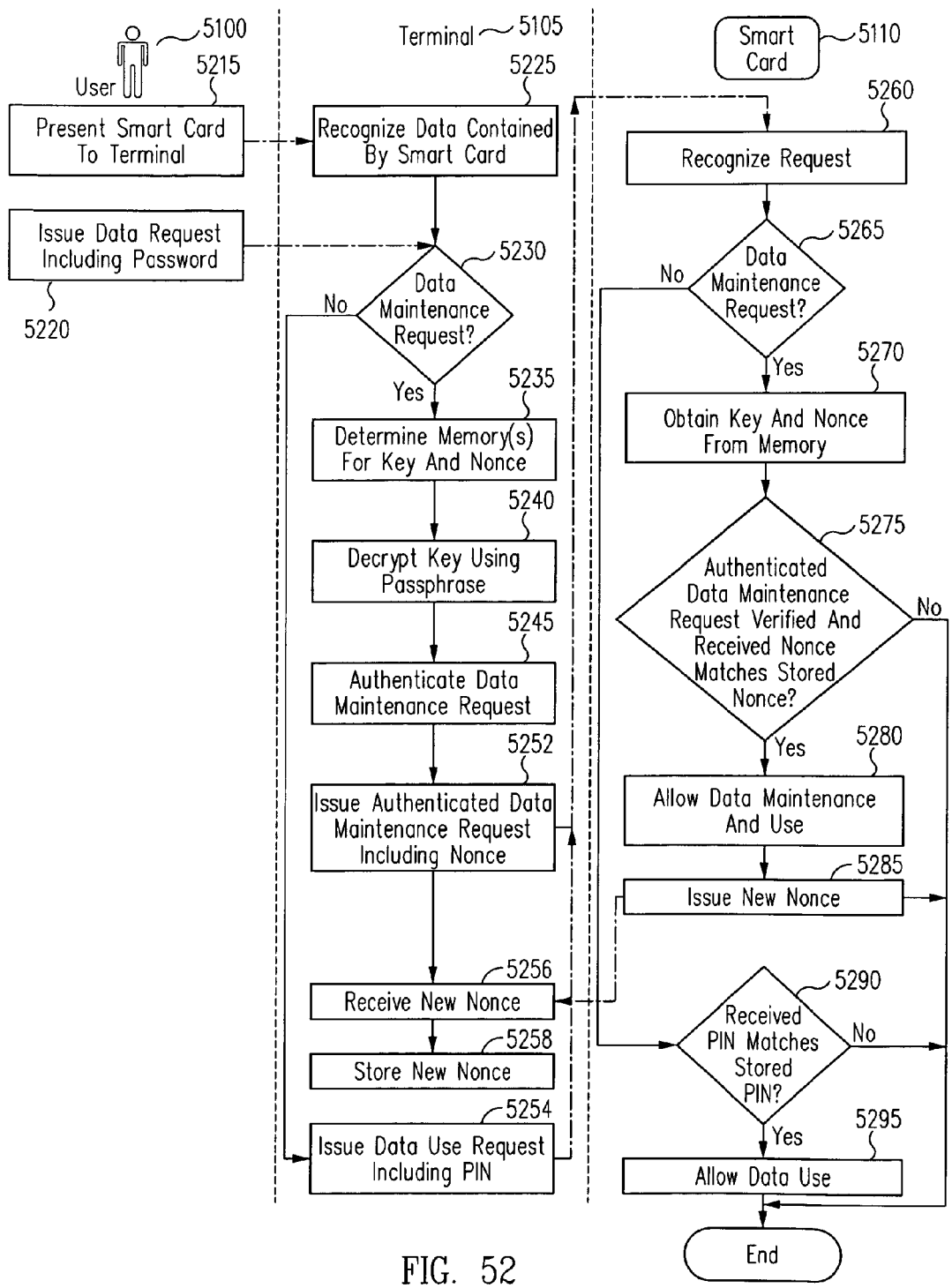
FIG. 52 is a flow diagram that illustrates a method for maintaining user data stored on a smart card where maintenance of the user data is controlled by an authenticated data maintenance request and nonce, and where use of the user data is controlled by a personal identification number (PIN), in accordance with one embodiment of the present invention.

FIGS. 51 and 52 illustrate using an authenticated maintenance request created using a static key and a dynamic identifier unique to one of a plurality of terminals and shared by a smart card to maintain user data stored on a smart card, in accordance with embodiments of the present invention. FIGS. 51 and 52 combine use of a static key as illustrated with respect to FIGS. 31 to 34, with use of a dynamic identifier as illustrated with respect to FIGS. 37 to 40.

Turning now to FIG. 51, a block diagram illustrates an apparatus for maintaining user data stored on a smart card where maintenance of the user data is controlled by an authenticated data maintenance request and a nonce, and where use of the user data is controlled by a personal identification number (PIN), in accordance with one embodiment of the present invention. As shown in FIG. 51, a home terminal 5105 includes home terminal processor 5125 and a memory 5165 for storing an encrypted key and a nonce.

Home terminal processor 5125 is further adapted to (i) receive a data request including a password, e.g., data maintenance request 5155 including a passphrase or data use request 5115 including a PIN; (ii) if the data request is data maintenance request 5155: (a) determine a memory 5165 storing the encrypted key and the nonce and retrieve nonce 5195 and encrypted key 5175; and (b) use the passphrase to decrypt the encrypted key, use the key to authenticate the data maintenance request; and (iii) forward a data request including a password to a smart card 5110, e.g., authenticated data maintenance request 5160 including nonce 5195, or data use request 5120 including the PIN.

Still referring to FIG. 51, smart card 5110 includes a smart card processor 5130 and a memory 5135. Memory 5135 is for storing data including a PIN, an optional seed, a nonce, a key, and user data.

According to one embodiment of the present invention, smart card processor 5130 includes one or more rights flags 5180 for indicating whether end-user 5100 has use rights with respect to user data stored in memory 5135. According to one embodiment of the present invention, the one or more rights flags 5180 are stored in a transient, sometimes called impersistent, memory area. Each of the one or more rights flags 5180 describes one or more rights end-user 5100 has to the user data stored in memory 5135.

Smart card processor 5130 is adapted to recognize a data request including a password, e.g., authenticated data maintenance request 5160 including nonce 5195, or data use request 5120 including the PIN, sent from home terminal 5105. Verification unit 5185 of smart card processor 5130 is adapted to use key 5164 in memory 5135 of smart card 5110 to verify the authenticated data maintenance request 5160 received from home terminal 5105, and whether the received nonce matches a nonce 5162 stored in memory 5135 of smart card 5110. In one embodiment, verification unit 5185 configures a rights flag to correspond the rights determined by verification unit 5185. Smart card processor 5130 is further adapted to allow data maintenance 5166 and use 5168 if authenticated data maintenance request 5160 received from home terminal 5105 is verified and if the received nonce matches nonce 5162.

Smart card processor 5130 is further adapted to allow requested use 5168 of the user data if the received password matches a PIN 5140 stored in memory 5135 of smart card 5110. In one embodiment, if the PINs match, a rights flag is configured to correspond to rights 5145 associated with the stored PIN.

Identifier generator 5188 of smart card processor 5130 is adapted to issue a new nonce 5150 for storage in memory 5135 of smart card 5110 and memory 5165 of home terminal 5105 after using a nonce to determine whether a data maintenance request should be allowed.

According to one embodiment of the present invention, smart card processor 5130 includes one or more rights flags 5180 for indicating whether end-user 5100 has maintenance rights or use rights with respect to user data stored in memory 5135. One of one or more rights flag 5180 is configured the first time a data request including a password is received in a session for an application and at least that password is associated with rights for data stored in memory 5135. Note that for maintenance, the nonce must also match for configuration of a rights flag. For subsequent data requests that do not include a password, processor 5130 references one or more rights flag 5180 to determine whether the data request should be allowed.

As shown in FIG. 51, authenticated data maintenance request 5160 produced by signature unit 5190 is not based on nonce 5195. According to another embodiment of the present invention, authenticated data maintenance request 5160 produced by signature unit 5190 is based at least in part on nonce 5195.

According to one embodiment of the present invention, a PIN is used in a challenge-response protocol initiated by smart card 5110. According to another embodiment of the present invention, a password includes a picture PIN.

As shown in FIG. 51, home terminal 5105 includes memory 5165. According to another embodiment of the present invention, memory 5165 resides on a remote network device (not shown in FIG. 51) coupled to home terminal 5105. A cryptographic protocol between home terminal 5105 and the remote network device may be used to protect integrity of the data stored in memory 5165.

Turning now to FIG. 52, a flow diagram illustrates a method for maintaining user data stored on a smart card where maintenance of the user data is controlled by an authenticated data maintenance request and a nonce, and where use of the user data is controlled by a personal identification number (PIN), in accordance with one embodiment of the present invention. In one embodiment, the process illustrated in FIG. 52 is implemented using the elements of FIG. 51. The processes illustrated in FIG. 52 may be implemented using hardware, software, firmware, or a combination thereof.

In process 5215, an end-user 5100 presents a smart card 5110 to a terminal 5105. In process 5225, terminal 5105 recognizes data contained on smart card 5110.

In process 5220, end-user 5100 issues a data request including a password, e.g., one of a passphrase and a PIN. The data request is issued using terminal 5105 in one embodiment.

Data maintenance request check process 5230 on terminal 5105 receives the data request sent from process 5220, and determines whether the data request is a data maintenance request where the password includes a passphrase. If the received data request is a data maintenance request, process

5235 determines a memory storing encrypted key 5175 and nonce 5195 and retrieves encrypted key 5175 and nonce 5195 from that memory. In process 5240, encrypted key 5175 is decrypted using the passphrase to generate a key.

In process 5245, the key is used to authenticate the received data maintenance request. For example, a signature module 5190 uses the key to sign the received data maintenance request. Process 5252 on terminal 5105 issues authenticated data maintenance request 5160 including the nonce to smart card 5110.

If check process 5230 determines that the received data request is not a data maintenance request, the data request is a data use request including a PIN. Thus, check process 5230 transfers to process 5254 on terminal 5105. Process 5254, in turn, issues data use request 5120 including the PIN to smart card 5110.

According to one embodiment of the present invention, end-user 5100 explicitly requests use or maintenance of the data. According to another embodiment of the present invention, end-user 5100 implicitly requests use or maintenance of the data as a result of interaction with terminal 5105. By way of example, the interaction of end-user 5100 with terminal 5105 may trigger a request for use or maintenance of data on smart card 5110, which in turn triggers a request to end-user 5100 for a PIN or passphrase that controls the data stored on smart card 5110.

Still referring to FIG. 52, process 5260 on smart card 5110 recognizes a data request from terminal 5105, e.g., a data request is received and recognized. Check process 5265 on smart card 5110 determines whether the received data request includes an authenticated data maintenance request including a nonce, or a data use request including a PIN.

If the received data request includes an authenticated data maintenance request including a nonce, process 5270 on smart card 5110 obtains a nonce and a key from a memory on smart card 5110. Check process 5275 uses the retrieved key to verify the authenticated data maintenance request and determines whether the received nonce matches the nonce stored on smart card 5110. The use of the key to verify a signed data maintenance request is known to those of skill in the art. If the authenticated data maintenance request is verified, and if the received nonce matches the stored nonce, process 5280 allows maintenance and use of the data.

Since the nonce has been used, process 5280 transfers to issue new nonce process 5285. Process 5285 issues a new nonce and stores the new nonce in a memory on smart card 5110 and sends the new nonce to terminal 5105. In one embodiment, process 5285 uses optional seed 5152 to generate the initial nonce at the start of a session.

Receive new nonce process 5256 on terminal 5105 receives the new nonce from process 5285. Process 5258 stores new nonce 5196, replacing the previous nonce, in a memory accessible by terminal 5105.

If the received data request on smart card 5110 does not includes a data maintenance request, check process 5265 transfers processing to check process 5290. Check process 5290 determines whether the received password matches a PIN stored on smart card 5110. If the received password matches a PIN stored on smart card 5110, process 5295 allows use of the data.

Figure 53:
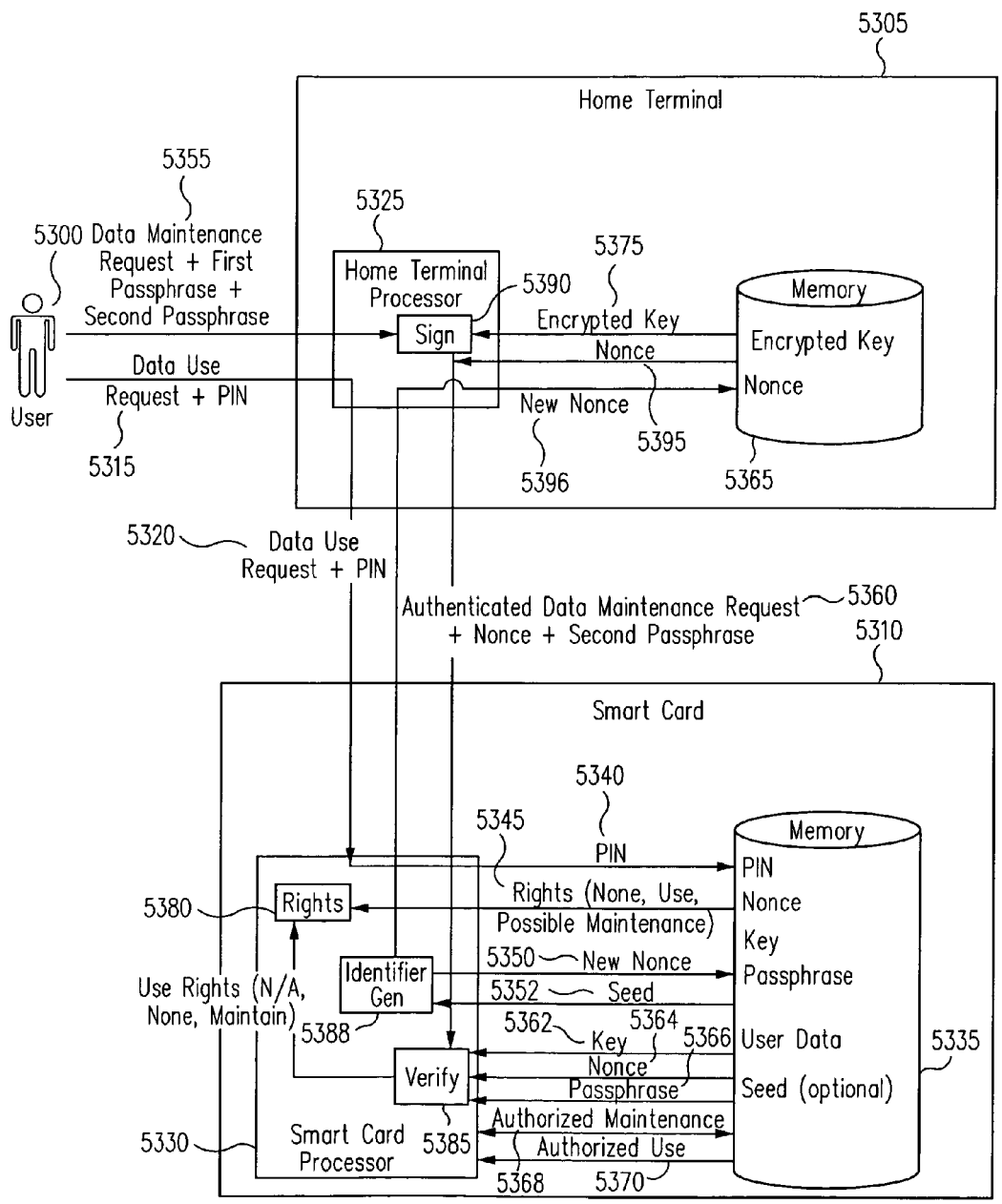
FIG. 53 is a block diagram that illustrates an apparatus for maintaining user data stored on a smart card where maintenance of the user data is controlled by an authenticated data maintenance request, a nonce, and a passphrase, and where use of the user data is controlled by a personal identification number (PIN), in accordance with one embodiment of the present invention.
Figure 54:
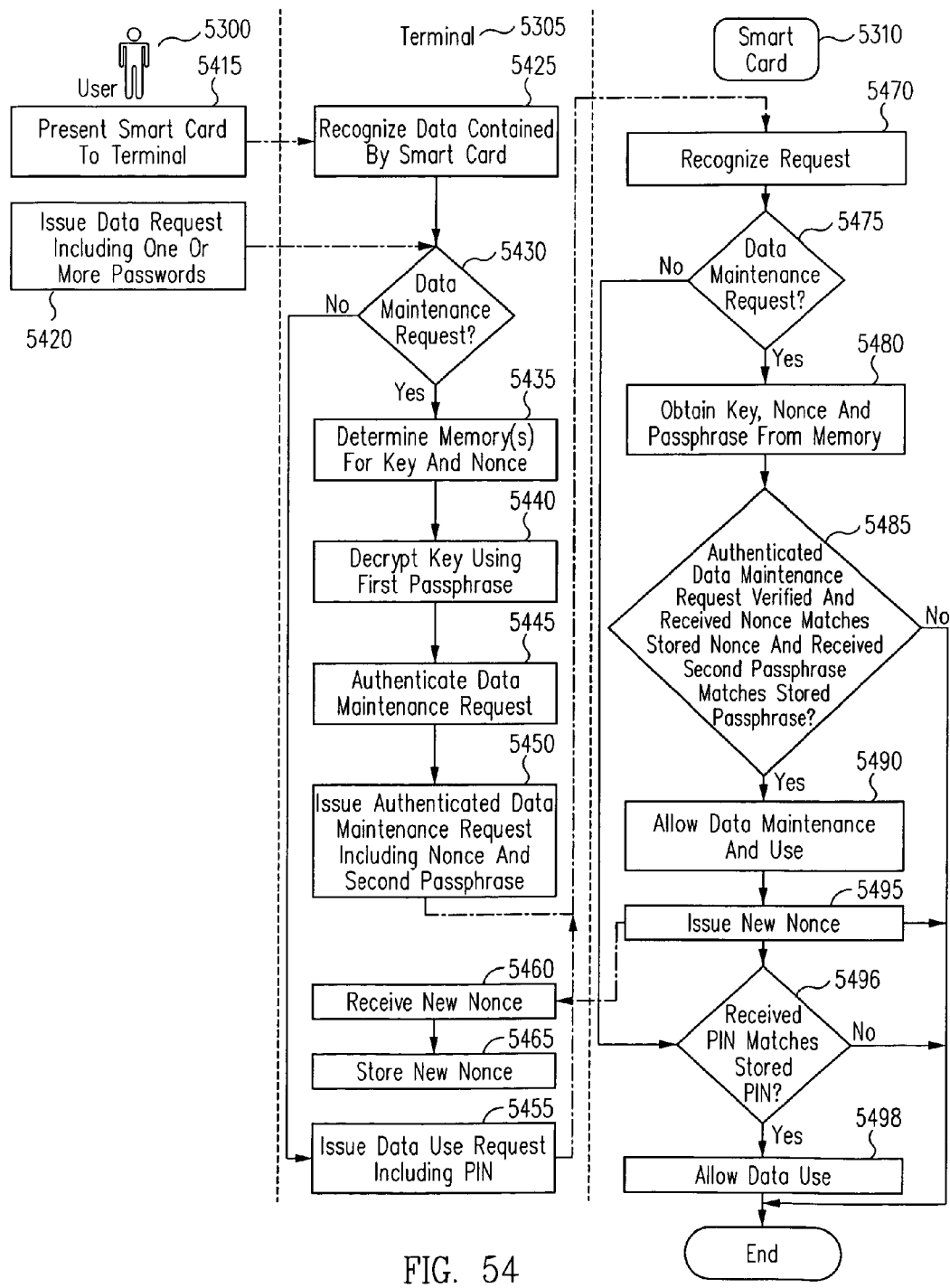
FIG. 54 is a flow diagram that illustrates a method for maintaining user data stored on a smart card where maintenance of the user data is controlled by an authenticated data maintenance request, a nonce, and a passphrase, and where use of the user data is controlled by a personal identification number (PIN), in accordance with one embodiment of the present invention.

FIGS. 53 and 54 illustrate using a dynamic identifier unique to one of multiple terminals, a second passphrase, and an authenticated maintenance request created using a static key to maintain user data stored on a smart card, in accordance with embodiments of the present invention. FIGS. 53 and 54 are similar to FIGS. 51 and 52, except FIGS. 53 and 54 illustrate a passphrase checking function performed by both a home terminal and a smart card, while the passphrase checking function in FIGS. 51 and 52 is performed exclusively by a home terminal. In both FIGS. 51 and 52 and FIGS. 53 and 54, a first passphrase is used to decrypt an encrypted key to create a decrypted key, which is used to create an authenticated data maintenance request sent to a smart card. In FIGS. 53 and 54, a second passphrase entered by the end-user is passed through the home terminal and with the authenticated data maintenance request to the smart card, and the smart card compares the sent passphrase with a stored passphrase.

Turning now to FIG. 53, a block diagram illustrates an apparatus for maintaining user data stored on a smart card where maintenance of the user data is controlled by an authenticated data maintenance request, a nonce and a passphrase, and where use of the user data is controlled by a personal identification number (PIN), in accordance with one embodiment of the present invention. As shown in FIG. 53, a home terminal 5305 includes home terminal processor 5325 and a memory 5365 for storing an encrypted key and a nonce.

Home terminal processor 5325 is further adapted to (i) receive a data request including a password, e.g., data maintenance request 5355 including a first passphrase and a second passphrase, or data use request 5315 including a PIN; (ii) if the data request is data maintenance request 5355: (a) determine a memory 5365 storing the encrypted key and the nonce and retrieve nonce 5395 and encrypted key 5375; and (b) use the first passphrase to decrypt the encrypted key, use the key to authenticate the data maintenance request; and (iii) forward a data request including a password to a smart card 5310, e.g., authenticated data maintenance request 5360 including nonce 5395 and the second passphrase, or data use request 5320 including the PIN.

Still referring to FIG. 53, smart card 5310 includes a smart card processor 5330 and a memory 5335. Memory 5335 is for storing data including a PIN, an optional seed, a nonce, a key, a passphrase, and user data.

According to one embodiment of the present invention, smart card processor 5330 includes one or more rights flags 5380 for indicating whether end-user 5300 has use rights with respect to user data stored in memory 5335. According to one embodiment of the present invention, the one or more rights flags 5380 are stored in a transient, sometimes called impersistent, memory area. Each of the one or more rights flags 5380 describes one or more rights end-user 5300 has to the user data stored in memory 5335.

Smart card processor 5330 is adapted to recognize a data request including a password, e.g., authenticated data maintenance request 5360 including nonce 5395 and the second passphrase, or data use request 5320 including the PIN, sent from home terminal 5305. Verification unit 5385 of smart card processor 5330 is adapted to use key 5362 in memory 5335 of smart card 5310 to verify the authenticated data maintenance request 5360 received from home terminal 5305, whether the received nonce matches a nonce 5364 stored in memory 5335 of smart card 5310 and whether the received second passphrase matches a passphrase 5366 stored in memory 5335. In one embodiment, verification unit 5385 configures a rights flag to correspond the rights determined by verification unit 5385. Smart card processor 5330 is further adapted to allow data maintenance 5368 and use 5370 if authenticated data maintenance request 5360 received from home terminal 5305 is verified, if the received nonce matches nonce 5362 and the received second passphrase matches passphrase 5366.

Smart card processor 5330 is further adapted to allow requested use 5370 of the user data if the received password matches a PIN 5340 stored in memory 5335 of smart card 5310. In one embodiment, if the PINs match, a rights flag is configured to correspond to rights 5345 associated with the stored PIN.

Identifier generator 5388 of smart card processor 5330 is adapted to issue a new nonce 5350 for storage in memory 5335 of smart card 5310 and memory 5365 of home terminal 5305 after using a nonce to determine whether a data maintenance request should be allowed. The new nonce replaces those previously stored in the memories.

According to one embodiment of the present invention, smart card processor 5330 includes one or more rights flags 5380 for indicating whether end-user 5300 has maintenance rights or use rights with respect to user data stored in memory 5335. One of one or more rights flag 5380 is configured the first time a data request including a password is received in a session for an application and at least that password is associated with rights for data stored in memory 5335. Note that for maintenance, the nonce and the second passphrase must also match for configuration of a rights flag. For subsequent data requests that do not include a password, processor 5330 references one or more rights flag 5380 to determine whether the data request should be allowed.

As shown in FIG. 53, authenticated data maintenance request 5360 produced by signature unit 5390 is not based on nonce 5395. According to another embodiment of the present invention, authenticated data maintenance request 5360 produced by signature unit 5390 is based at least in part on nonce 5395.

According to one embodiment of the present invention, a PIN is used in a challenge-response protocol initiated by smart card 5310. According to another embodiment of the present invention, a password includes a picture PIN.

As shown in FIG. 53, home terminal 5305 includes memory 5365. According to another embodiment of the present invention, memory 5365 resides on a remote network device (not shown in FIG. 53) coupled to home terminal 5305. A cryptographic protocol between home terminal 5305 and the remote network device may be used to protect integrity of the data stored in memory 5365.

Turning now to FIG. 54, a flow diagram illustrates a method for maintaining user data stored on a smart card where maintenance of the user data is controlled by an authenticated data maintenance request a nonce and a passphrase, and where use of the user data is controlled by a personal identification number (PIN), in accordance with one embodiment of the present invention. In one embodiment, the process illustrated in FIG. 54 is implemented using the elements of FIG. 53. The processes illustrated in FIG. 54 may be implemented using hardware, software, firmware, or a combination thereof.

In process 5415, an end-user 5300 presents a smart card 5310 to a terminal 5305. In process 5425, terminal 5305 recognizes data contained on smart card 5310.

In process 5420, end-user 5300 issues a data request including one or more passwords, e.g., one of two passphrases and a PIN. The data request is issued using terminal 5305 in one embodiment.

Data maintenance request check process 5430 on terminal 5305 receives the data request sent from process 5420, and determines whether the data request is a data maintenance request where the password includes a first passphrase and a second passphrase. If the received data request is a data maintenance request, process 5435 determines a memory storing encrypted key 5375 and nonce 5395 and retrieves encrypted key 5375 and nonce 5395 from that memory. In process 5440, encrypted key 5375 is decrypted using the first passphrase to generate a key.

In process 5445, the key is used to authenticate the received data maintenance request. For example, a signature module 5390 uses the key to sign the received data maintenance request. Process 5450 on terminal 5305 issues authenticated data maintenance request 5360 including the nonce and the second passphrase to smart card 5310.

If check process 5430 determines that the received data request is not a data maintenance request, the data request is a data use request including a PIN. Thus, check process 5430 transfers to process 5455 on terminal 5305. Process 5455, in turn, issues data use request 5320 including the PIN to smart card 5310.

According to one embodiment of the present invention, end-user 5300 explicitly requests use or maintenance of the data. According to another embodiment of the present invention, end-user 5300 implicitly requests use or maintenance of the data as a result of interaction with terminal 5305. By way of example, the interaction of end-user 5300 with terminal 5305 may trigger a request for use or maintenance of data on smart card 5310, which in turn triggers a request to end-user 5300 for a PIN or passphrases that control the data stored on smart card 5310.

Still referring to FIG. 54, process 5470 on smart card 5310 recognizes a data request from terminal 5305, e.g., a data request is received and recognized. Check process 5475 on smart card 5310 determines whether the received data request includes an authenticated data maintenance request including a nonce and a passphrase, or a data use request including a PIN.

If the received data request includes an authenticated data maintenance request including a nonce and the second passphrase, process 5480 on smart card 5310 obtains a passphrase, a nonce and a key from a memory on smart card 5310. Check process 5485 uses the retrieved key to verify the authenticated data maintenance request; determines whether the received nonce matches the nonce stored on smart card 5310; and determines whether the received second passphrase matches the passphrase stored on smart card 5310. If the authenticated data maintenance request is verified, if the received nonce matches the stored nonce, and if the received second passphrase matches the stored passphrase, process 5490 allows maintenance and use of the data.

Since the nonce has been used, process 5490 transfers to issue new nonce process 5495. Process 5495 issues a new nonce and stores the new nonce in a memory on smart card 5310 and sends the new nonce to terminal 5305. The new nonce replaces the nonce stored in the smart card memory. In one embodiment, process 5485 uses optional seed 5352 to generate the initial nonce.

Receive new nonce process 5460 on terminal 5305 receives the new nonce from process 5495. Process 5465 stores new nonce 5396, replacing the previous nonce, in a memory accessible by terminal 5305.

If the received data request on smart card 5310 does not includes a data maintenance request, check process 5475 transfers processing to check process 5496. Check process 5496 determines whether the received password matches a PIN stored on smart card 5310. If the received password matches a PIN stored on smart card 5310, process 5498 allows use of the data.

Embodiments of the present invention are described herein in the context of personalizing multi-application smart cards. Those of ordinary skill in the art will realize that the detailed description of the present invention is illustrative only and is not intended to be in any way limiting. Other embodiments of the present invention will readily suggest themselves to such skilled persons having the benefit of this disclosure.

In the interest of clarity, not all of the routine features of the implementations described herein are shown and described. It will, of course, be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as (a) instructions executed by such hardware, (b) hardware alone, or (c) any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented using a data processing computer such as a personal computer, workstation computer, mainframe computer, or high performance server running an operating system such as Solaris® available from Sun Microsystems, Inc. of Santa Clara, Calif., Microsoft® Windows® XP and Windows® 2000, available form Microsoft Corporation of Redmond, Wash., or various versions of the Unix operating system such as Linux available from a number of vendors. The method may also be implemented using a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

I claim:

1. A method for using and maintaining user data stored on a multi-application smart card comprising a memory, the method comprising:

storing in the memory of said multi-application smart card a first application comprising first executable code, wherein said first application is associated with first user data and a first data use password and a first data maintenance password stored in the memory;

storing in the memory of said multi-application smart card a second application comprising second executable code, wherein said second application is associated with second user data and a second data use password and a second data maintenance password stored in the memory;

receiving, on said smart card, a user data request wherein said data request includes a received password;

determining, on said smart card, whether said user data request is a data maintenance request or a data use request, wherein a data maintenance request is for modifying user data stored on said smart card, and a data use request is for read only access to user data stored on said smart card;

comparing, on said smart card, the received password with the first data use password stored in the memory, and authorizing read only access to the first user data if the received password matches the first data use password;

comparing, on said smart card, the received password with the second data use password stored in the memory, and authorizing read only access to the second user data if the received password matches the second data use password;

comparing, on said smart card, the received password with the first data maintenance password stored in the memory, and authorizing read and write access to the first user data if the received password matches the first data maintenance password; and comparing, on said smart card, the received password with the second data maintenance password stored in the memory, and authorizing read and write access to the second user data if the received password matches the second data maintenance password.

2. The method of claim 1 wherein said first data maintenance password comprises a first stored passphrase and said second data maintenance password comprises a second stored passphrase.

3. The method of claim 1 wherein said first data maintenance password comprises a first stored personal identification number (PIN) and said second data maintenance password comprises a second stored PIN.

4. The method of claim 1 wherein said data request includes a received identifier wherein said received identifier comprises a static identifier associated with a home terminal and said static identifier does not change with each user data request received by said smart card from said home terminal, and further wherein, said method further comprises:

comparing said received identifier with a static identifier stored in the memory on said smart card; and preventing write access to at least one of the first user data and second user data if the received identifier does not match the static identifier stored in the memory on said smart card.

5. The method of claim 4 wherein said static identifier stored in the memory on said smart card is stored in a list of static identifiers stored on said smart card.

6. The method of claim 1 wherein said user data request includes a received identifier wherein said received identifier comprises a dynamic identifier associated with a home terminal and said dynamic identifier is different in each data maintenance request received by said smart card from said home terminal, and further wherein, said first process further comprises:
- comparing said received identifier with a dynamic identifier stored on said smart card; and
- preventing write access to at least one of the first user data and second user data if the received identifier does not match the dynamic identifier stored on said smart card.

7. The method of claim 6 wherein said dynamic identifier comprises a next identifier generated using an end identifier and a last identifier in a one way function.

8. The method of claim 1, wherein said first application is associated with a different commercial entity than said second application.

9. The method of claim 1 wherein said user data request comprises an authenticated data maintenance request including a received identifier wherein said received identifier comprises a static identifier associated with a home terminal and said static identifier does not change with each data maintenance request received by said smart card from said home terminal, and further wherein, said first process comprises:
- using a key stored on said smart card to verify said authenticated data maintenance request;
- comparing said received identifier with a stored static identifier stored on said smart card; and
- allowing said data maintenance request upon said authenticated data maintenance request being verified and said received identifier matching said stored static identifier.

10. The method of claim 9 wherein said stored static identifier is stored in a list of static identifiers stored on said smart card.

11. A non-transitory computer readable medium including instructions stored thereon for supporting using and maintaining user data stored on a multi-application smart card comprising a memory, which instructions, when executed, cause the multi-application smart card to perform steps comprising:
- storing in the memory of said multi-application smart card a first application comprising first executable code, and storing in said memory a first user data, a first data use password, and a first data maintenance password associated with said first application;
- storing in the memory of said multi-application smart card a second application comprising second executable code, and storing in said memory a second user data, a second data use password, and a second data maintenance password associated with said second application;
- receiving, on said smart card, a user data request wherein said data request includes a received password;
- determining, on said smart card, whether said user data request is a data maintenance request or a data use request, wherein a data maintenance request is for modifying user data stored on said smart card, and a data use request is for read only access to user data stored on said smart card;
- comparing, on said smart card, the received password with the first data use password stored in the memory, and authorizing read only access to the first user data if the received password matches the first data use password;
- comparing, on said smart card, the received password with the second data use password stored in the memory, and authorizing read only access to the second user data if the received password matches the second data use password;
- comparing, on said smart card, the received password with the first data maintenance password stored in the memory, and authorizing read and write access to the first user data if the received password matches the first data maintenance password; and
- comparing, on said smart card, the received password with the second data maintenance password stored in the memory, and authorizing read and write access to the second user data if the received password matches the second data maintenance password.

12. A multi-application smart card comprising:
a processor and a memory;
wherein the multi-application smart card is configured to perform steps comprising:
- storing in the memory of said multi-application smart card a first application comprising first executable code, and storing in said memory a first user data, a first data use password, and a first data maintenance password associated with said first application;
- storing in the memory of said multi-application smart card a second application comprising second executable code, and storing in said memory a second user data, a second data use password, and a second data maintenance password associated with said second application;
- receiving, on said smart card, a user data request wherein said data request includes a received password;
- determining, on said smart card, whether said user data request is a data maintenance request or a data use request, wherein a data maintenance request is for modifying user data stored on said smart card, and a data use request is for read only access to user data stored on said smart card;
- comparing, on said smart card, the received password with the first data use password stored in the memory, and authorizing read only access to the first user data if the received password matches the first data use password;
- comparing, on said smart card, the received password with the second data use password stored in the memory, and authorizing read only access to the second user data if the received password matches the second data use password;
- comparing, on said smart card, the received password with the first data maintenance password stored in the memory, and authorizing read and write access to the first user data if the received password matches the first data maintenance password; and
- comparing, on said smart card, the received password with the second data maintenance password stored in the memory, and authorizing read and write access to the second user data if the received password matches the second data maintenance password.

13. The multi-application smart card of claim 12, wherein said first data maintenance password comprises a first stored passphrase and said second data maintenance password comprises a second stored passphrase.

14. The multi-application smart card of claim 12, wherein said first data maintenance password comprises a first stored personal identification number (PIN) and said second data maintenance password comprises a second stored PIN.

15. The multi-application smart card of claim 12, wherein said user data request includes a received identifier wherein said received identifier comprises a static identifier associated with a home terminal and said static identifier does not change with each data maintenance request received by said smart card from said home terminal, and further wherein, said first process further comprises:

comparing said received identifier with a static identifier stored in the memory on said smart card; and preventing write access to at least one of the first user data and second user data if the received identifier does not match the static identifier stored in the memory on said smart card.

16. The multi-application smart card of claim 15, wherein said static identifier stored in the memory on said smart card is stored in a list of static identifiers stored on said smart card.

17. The multi-application smart card of claim 12, wherein said user data request includes a received identifier wherein said received identifier comprises a dynamic identifier associated with a home terminal and said dynamic identifier is different in each data maintenance request received by said smart card from said home terminal, and further wherein, said first process further comprises:

comparing said received identifier with a dynamic identifier on said smart card; and preventing write access to at least one of the first user data and second user data if the received identifier does not match the dynamic identifier on said smart card.

18. The multi-application smart card of claim 17, wherein said dynamic identifier comprises a next identifier generated using an end identifier and a last identifier in a one way function.

19. The multi-application smart card of claim 12, wherein said first application is associated with a different commercial entity than said second application.

20. The multi-application smart card of claim 12, wherein said user data request comprises an authenticated data maintenance request including a received identifier wherein said received identifier comprises a static identifier associated with a home terminal and said static identifier does not change with each data maintenance request received by said smart card from said home terminal, and further wherein, said first process comprises:

using a key stored on said smart card to verify said authenticated data maintenance request;

comparing said received identifier with a static identifier stored in the memory on said smart card; and preventing write access to at least one of the first user data and second user data if the received identifier does not match the dynamic identifier on said smart card or the authenticated data maintenance request is not verified by said key.

* * * * *

UNITED STATES PATENT AND TRADEMARK OFFICE
CERTIFICATE OF CORRECTION

PATENT NO. : 9,769,162 B2  
APPLICATION NO. : 14/330672  
DATED : September 19, 2017  
INVENTOR(S) : De Jong Page 1 of 1

It is certified that error appears in the above-identified patent and that said Letters Patent is hereby corrected as shown below:

In the Drawings

On sheet 18 of 54, in FIG. 18, under Reference Numeral 1845, Line 1, delete "Identtifier" and insert -- Identifier --, therefor.

On sheet 28 of 54, in FIG. 28, under Reference Numeral 2820, Line 2, delete "Incluing" and insert -- Including --, therefor.

In the Specification

In Column 3, Line 1, delete "be come" and insert -- become --, therefor.

In Column 10, Lines 44-45, delete "Algorigth-1" and insert -- Algorithm-1 --, therefor.

In Column 14, Line 34, delete "Part" and insert -- Part: --, therefor.

In Column 46, Line 30, after "4295" insert -- . --.

In Column 55, Line 58, after "4995" insert -- . --.

In Column 63, Line 46, delete "form" and insert -- from --, therefor.

Signed and Sealed this  
Twenty-sixth Day of June, 2018

Andrei Iancu  
*Director of the United States Patent and Trademark Office*